(12) United States Patent
Bayliss

(10) Patent No.: US 7,720,846 B1
(45) Date of Patent: May 18, 2010

(54) SYSTEM AND METHOD OF USING GHOST IDENTIFIERS IN A DATABASE

(75) Inventor: David Bayliss, Delray Beach, FL (US)

(73) Assignee: LexisNexis Risk Data Management, Inc., Baco Raton, FL (US)

( * ) Notice: Subject to any disclaimer, the term of this patent is extended or adjusted under 35 U.S.C. 154(b) by 451 days.

(21) Appl. No.: 10/357,484

(22) Filed: Feb. 4, 2003

(51) Int. Cl.
    *G06F 7/00* (2006.01)
(52) U.S. Cl. ....................................... 707/736
(58) Field of Classification Search ........................ None
    See application file for complete search history.

(56) References Cited

U.S. PATENT DOCUMENTS

| | | | |
|---|---|---|---|
| 4,543,630 A | 9/1985 | Neches | |
| 4,860,201 A | 8/1989 | Stolfo et al. | |
| 4,870,568 A | 9/1989 | Kahle et al. | |
| 4,925,311 A | 5/1990 | Neches et al. | |
| 5,006,978 A | 4/1991 | Neches | |
| 5,276,899 A | 1/1994 | Neches | |
| 5,303,383 A | 4/1994 | Neches et al. | |
| 5,423,037 A | 6/1995 | Hvasshovd | |
| 5,471,622 A | 11/1995 | Eadline | |
| 5,495,606 A | 2/1996 | Borden et al. | |
| 5,551,027 A | 8/1996 | Choy et al. | |
| 5,555,404 A | 9/1996 | Torbjørnsen et al. | |
| 5,655,080 A | 8/1997 | Dias et al. | |
| 5,732,400 A | 3/1998 | Mandler et al. | |
| 5,745,746 A | 4/1998 | Jhingran et al. | |
| 5,878,408 A | 3/1999 | Van Huben et al. | |
| 5,884,299 A | 3/1999 | Ramesh et al. | |
| 5,897,638 A | 4/1999 | Lasser et al. | |
| 5,983,228 A | 11/1999 | Kobayashi et al. | |
| 6,006,249 A | 12/1999 | Leong | |
| 6,026,394 A | 2/2000 | Tsuchida et al. | |
| 6,026,398 A * | 2/2000 | Brown et al. | 707/5 |
| 6,081,801 A | 6/2000 | Cochrane et al. | |
| 6,266,804 B1 | 7/2001 | Isman | |
| 6,311,169 B2 | 10/2001 | Duhon | |

(Continued)

OTHER PUBLICATIONS

Eike Schallehn et al., "Advanced Grouping and Aggregation for Data Integration," Department of Computer Science, Paper ID: 222, pp. 1-16.

(Continued)

*Primary Examiner*—Kavita Padmanabhan
(74) *Attorney, Agent, or Firm*—Hunton & Williams LLP

(57) ABSTRACT

Various exemplary systems and methods for linking entity references and identifying associations are presented. In particular, a method for linking a plurality of entity references to at least one entity using one or more constructed ghost entity references is provided. The method comprises the steps of identifying, for one or more common data fields, at least one unique field value from one or more entity references linked to a given entity and constructing, for the given entity, at least one ghost entity reference including the at least one unique field value, wherein the at least one ghost entity reference represents at least one potential entity reference for the given entity. The method further comprises linking at least one of the plurality of entity references to the given entity when a match probability between the at least one entity reference and the ghost entity reference is greater than a defined threshold.

16 Claims, 31 Drawing Sheets

U.S. PATENT DOCUMENTS

| | | | |
|---|---|---|---|
| 6,427,148 B1 | 7/2002 | Cossock | |
| 2002/0073099 A1* | 6/2002 | Gilbert et al. | 707/104.1 |
| 2002/0184222 A1* | 12/2002 | Kohut et al. | 707/10 |
| 2003/0167253 A1* | 9/2003 | Meinig | 707/1 |
| 2004/0088322 A1* | 5/2004 | Elder et al. | 707/103 Y |

OTHER PUBLICATIONS

Vincent Coppola, "Killer APP," Men's Journal, vol. 12, No. 3, Apr. 2003, pp. 86-90.

Eike Schallehn et al., "Extensible and Similarity-based Grouping for Data Integration," Department of Computer Science, pp. 1-17, 2002.

Rohit Ananthakrishna et al., "Eliminating Fuzzy Duplicates in Data Warehouses," 12 pages, 2002.

Peter Christen et al., "Parallel Computing Techniques for High-Performance Probabilistic Record Linkage," Data Mining Group, Australian National University, Epidemiology and Surveillance Branch, Project web page: http://datamining.anu.edu.au/linkage.html, 2002, pp. 1-11.

Peter Christen et al., "Parallel Techniques for High-Performance Record Linkage (Data Matching)," Data Mining Group, Australian National University, Epidemiology and Surveillance Branch, Project web page: http://datamining.anu.edu.au/linkage.html, 2002, pp. 1-27.

Peter Christen et al., "High-Performance Computing Techniques for Record Linkage," Data Mining Group, Australian National University, Epidemiology and Surveillance Branch, Project web page: http://datamining.anu.edu.au/linkage.html, 2002, pp. 1-14.

William E. Winkler, "Matching And Record Linkage," U.S. Bureau of the Census, pp. 1-38.

Peter Christen et al., "High-Performance Computing Techniques for Record Linkage," ANU Data Mining Group, Australian National University, Epidemiology and Surveillance Branch, Project web page: http://datamining.anu.edu.au/linkage.html, pp. 1-11.

William E. Winkler, "The State of Record Linkage and Current Research Problems," U.S. Bureau of the Census, 15 pages.

William E. Winkler, "Advanced Methods For Record Linkage," Bureau of the Census, pp. 1-21.

William E. Winkler, Frequency-Based Matching in Fellegi-Sunter Model of Record Linkage, Bureau Of The Census Statistical Research Division, Oct. 4, 2000, 14 pages.

William E. Winkler, "State of Statistical Data Editing And Current Research Problems," Bureau Of The Census Statistical Research Division, 10 pages.

The First Open ETL/EAI Software For The Real-Time Enterprise, Sunopsis, A New Generation ETL Tool, "Sunopsis™ v3 expedites integration between heterogeneous systems for Data Warehouse, Data Mining, Business Intelligence, and OLAP projects," <www.suopsis.com>, 6 pages.

Alan Dumas, "The ETL Market and Sunopsis™ v3 Business Intelligence, Data Warehouse & Datamart Projects," 2002, Sunopsis, pp. 1-7.

Teradata Warehouse Solutions, "Teradata Database Technical Overview," 2002, pp. 1-7.

WhiteCross White Paper, May 25, 2000, "wx/des-Technical Information," pp. 1-36.

Teradata Alliance Solutions, "Teradata and Ab Initio," pp. 1-2, 2001.

Peter Christen et al., The Australian National University, "Febrl—Freely extensible biomedical record linkage," Oct. 2002, pp. 1-67.

William E. Winkler, "Using the EM Algorithim for Weight Computation in the Fellegi-Sunter Model of Record Linkage," Bureau Of The Census Statistical Research Division, Oct. 4, 2000, 12 pages.

William E. Winkler et al., "An Application of the Fellegi-Sunter Model Of Record Linkage To The 1990 U.S. Decennial Census," U.S. Bureau of the Census, pp. 1-22.

William E. Winkler, "Improved Decision Rules In The Fellegi-Sunter Model Of Record Linkage," Bureau of the Census, pp. 1-13.

Fritz Scheuren et al., "Recursive Merging and Analysis of Administrative Lists and Data," U.S. Bureau of the Census, 9 pages.

William E. Winkler, "Record Linkage Software and Methods for Merging Administrative Lists," U.S. Bureau of the Census, Jul. 7, 2001, 11 pages.

Enterprises, Publishing and Broadcasting Limited, Acxiom-Abilitec, pp. 44-45.

TransUnion, Credit Reporting System, Oct. 9, 2002, 4 pages, A<http://www.transunion.com/content/page.jsp?id=/transunion/general/data/business/BusCre...>.

TransUnion, ID Verification & Fraud Detection, Account Acquisition, Account Management, Collection & Location Services, Employment Screening, Risk Management, Automotive, Banking-Savings & Loan, Credit Card Providers, Credit Unions, Energy & Utilities, Healthcare, Insurance, Investment, Real Estate, Telecommunications, Oct. 9, 2002, 46 pages, <http://www.transunion.com>.

White Paper An Introduction to OLAP Multidimensional Terminology and Technology, 20 pages.

* cited by examiner

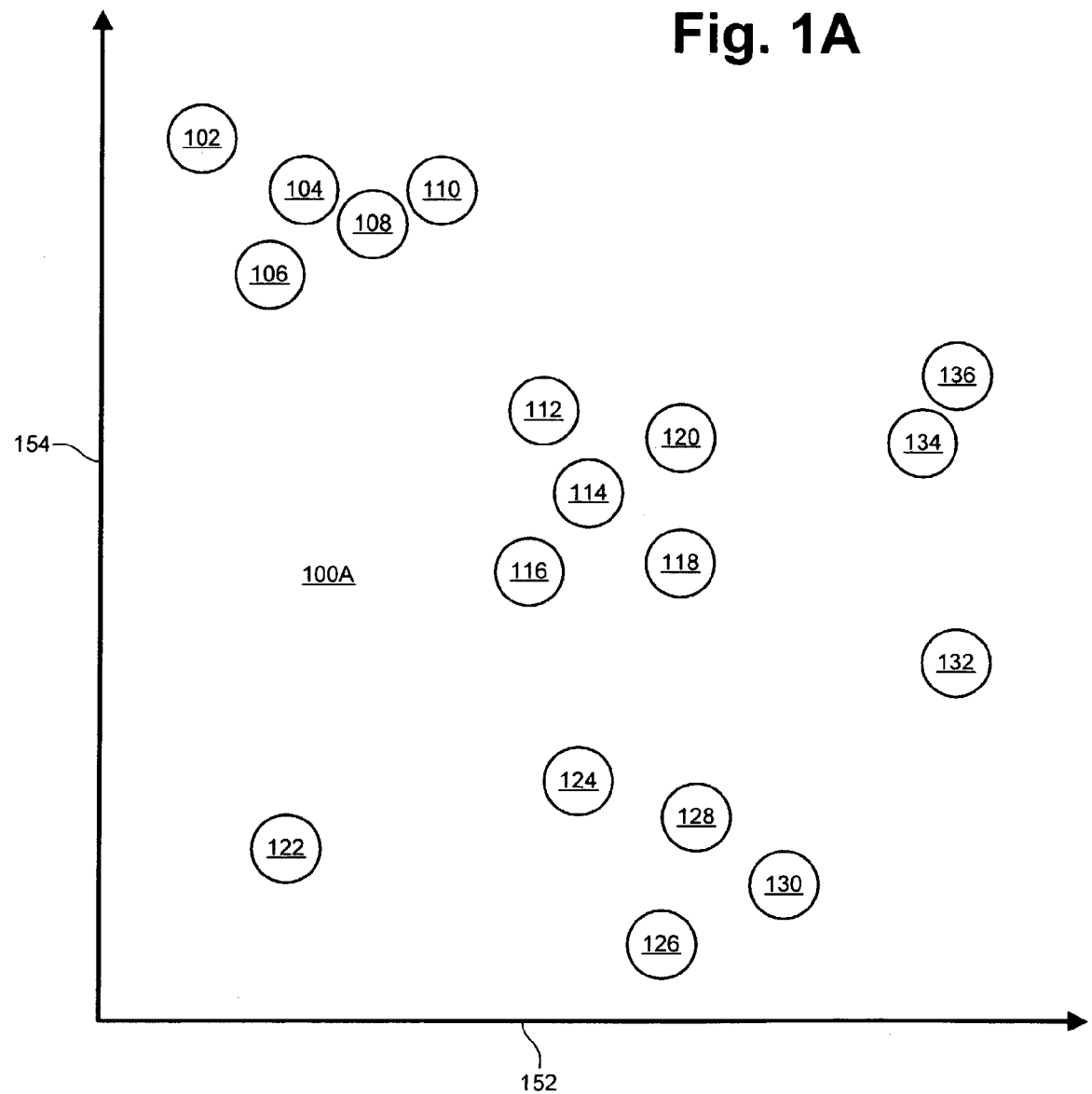

410

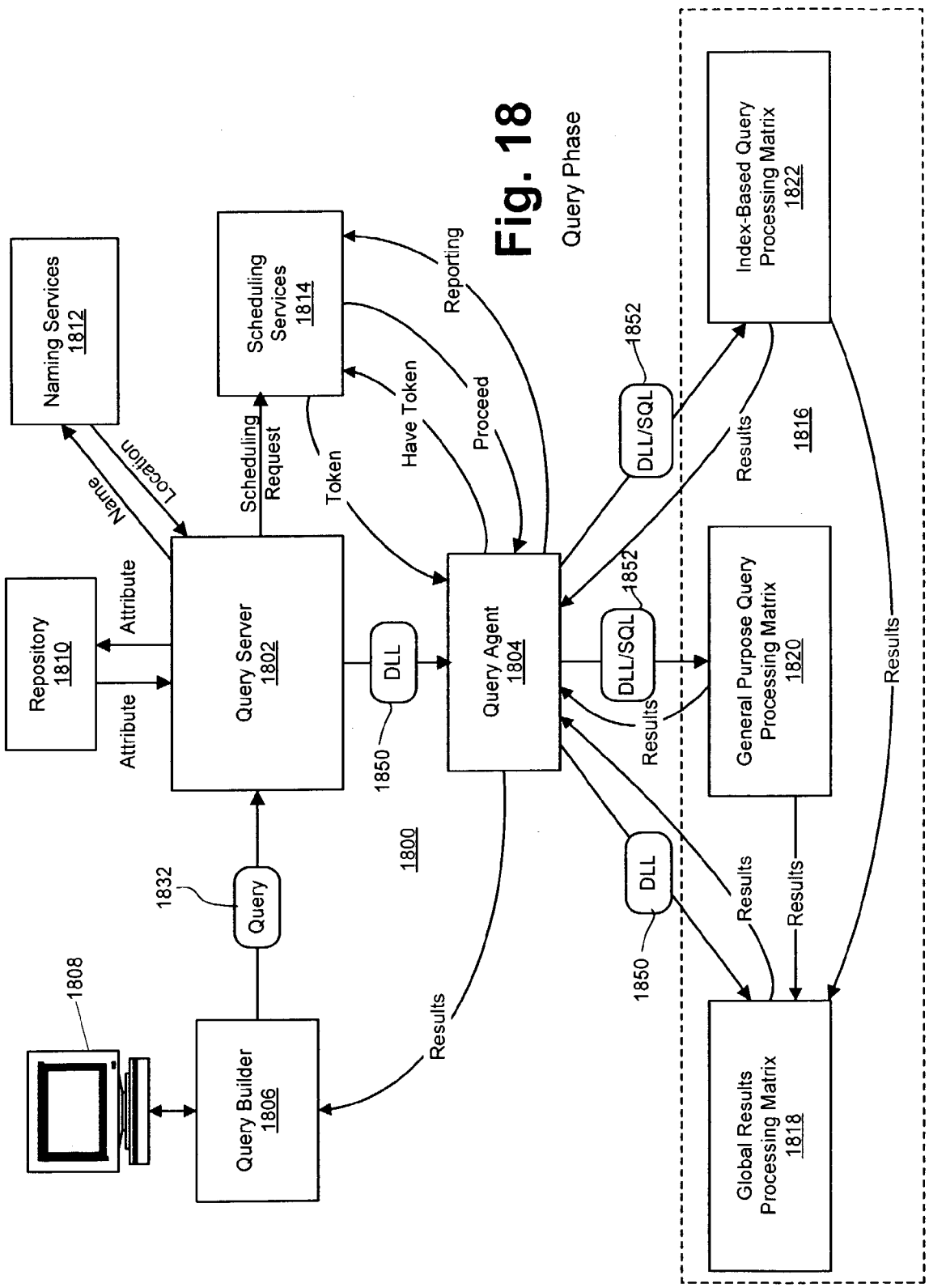

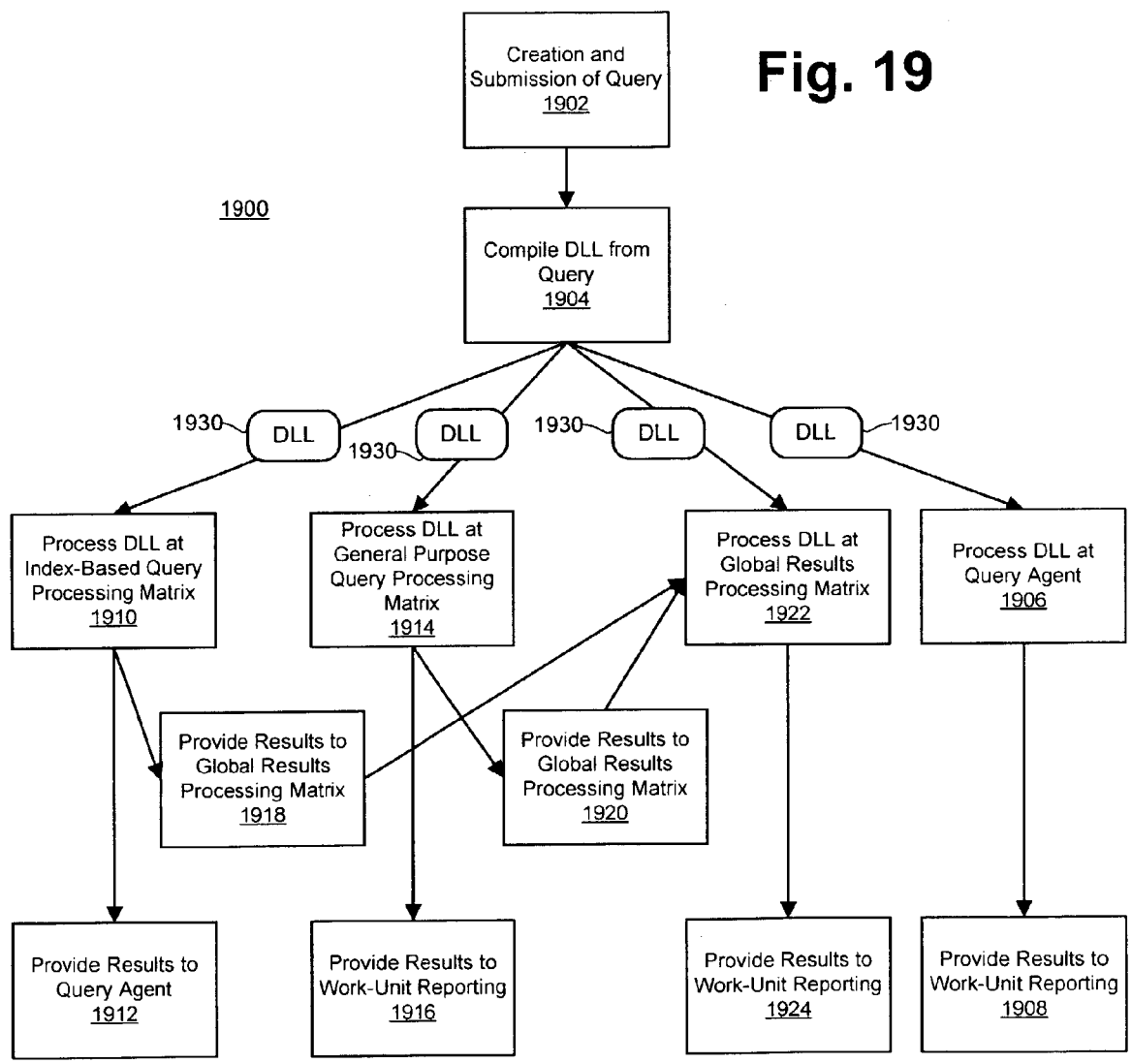

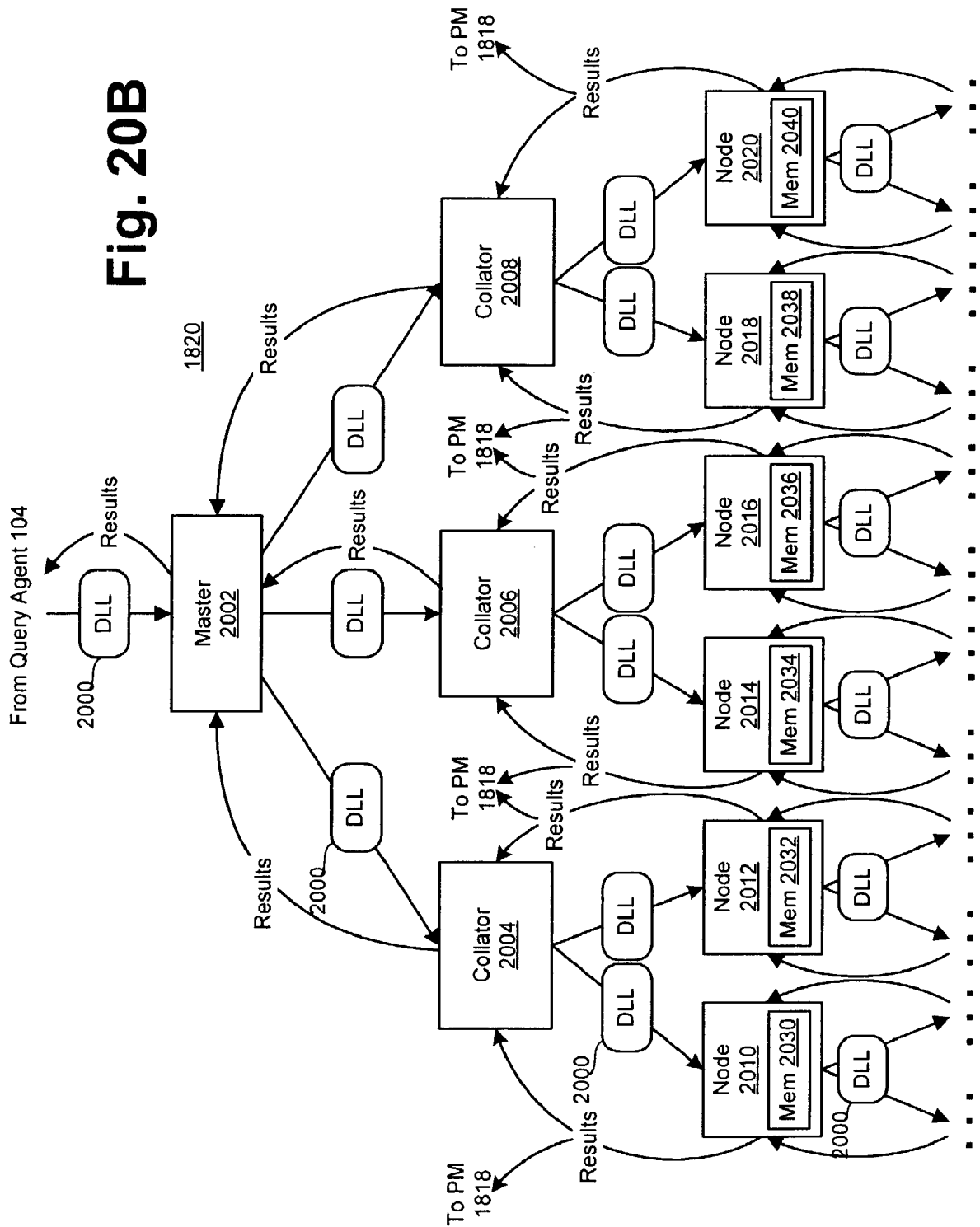

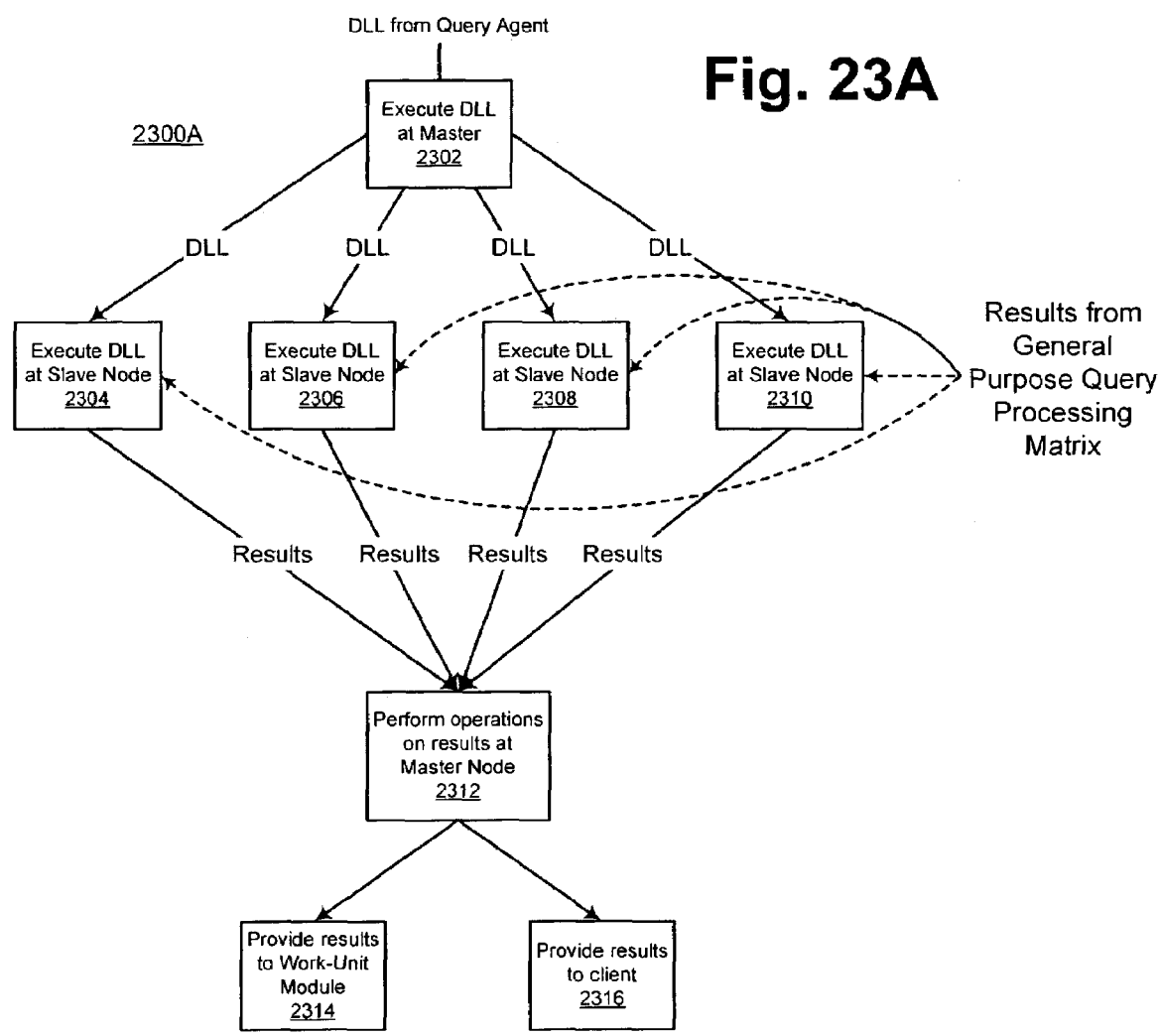

Production Phase

SYSTEM AND METHOD OF USING GHOST IDENTIFIERS IN A DATABASE

RELATED APPLICATIONS

Reference is directed to the following U.S. Patent Application, the entire disclosure of which is hereby incorporated herein by reference, U.S. patent application Ser. No. 10/293,490 in the name of David Bayliss et al. and entitled "Method And System For Parallel Processing Of Database Queries," filed Nov. 12, 2002, which describes details of hardware, software, and processes for implementing queries on a database using parallel processing architecture.

FIELD OF THE PRESENT INVENTION

The present invention relates generally to database and information management. More particularly, the present invention relates to systems and methods for accessing data from one or more sources, processing such data, and linking, matching or associating or disassociating data and reporting the same.

BACKGROUND

Increasingly, commercial, governmental, institutional and other entities collect vast amounts of data related to a variety of subjects, activities and pursuits. Society's appreciation for and use of information technology and management to analyze such data is now well ensconced in everyday life. For example, collected data may be examined for historical, trending, predictive, preventive, profiling, and many other useful purposes. Although the technology for collecting and storing such vast amounts of data is in place, efficient and effective technology for accessing, processing, verifying, analyzing and decisioning relating to such vast amounts of data is presently lacking or at the least in need of improvement. There exists broad and eager anticipation for unleashing the potential associated with such vast amounts of data and expanding the power that intelligent business solutions brings to commercial, governmental, and other societal pursuits. There exists a need and desire for intelligent solutions to realize this potential.

Applications for exploiting collected data include, but are not limited to: national security; law enforcement; immigration and border control; locating missing persons and property; firearms tracking; civil and criminal investigations; person and property location and verification; governmental and agency record handling; entity searching and location; package delivery; telecommunications; consumer related applications; credit reporting, scoring, and/or evaluating; debt collection; entity identification verification; account establishment, scoring and monitoring; fraud detection; health industry (patient record maintenance); biometric and other forms of authentication; insurance and risk management; marketing, including direct to consumer marketing; human resources/employment; and financial/banking industries. The applications may span an enterprise or agency or extend across multiple agencies, businesses, industries, etc.

One technique for using data to achieve a useful purpose is record linkage or matching. Record linkage generally is a process for linking, matching or associating data records and typically is used to provide insight and effective analysis of data contained in data records. Data records, which may include one or more discrete data fields containing data, may be derived from one or more sources and may be linked or matched, for example, based on: identifying data (e.g., social security number, tax number, employee number, telephone number, etc.); exact matching based on entity identification; and statistical matching based on one or more similar characteristics (e.g., name, geography, product type, sales data, age, gender, occupation, license data, etc.) shared by or in common with records of one or more entities.

Record linkage or matching involves accessing data records, such as commonly stored in a database or data warehouse, and performing user definable operations on accessed data records to harvest or assemble data sets for presentation to and use by an end user. As a prelude or adjunct to record linkage, processes such as editing, removing contradictory data, cleansing, de-duping (i.e., reducing or eliminating duplicate records), and imputing (i.e., filling in missing or erroneous data or data fields) are performed on the data records to better analyze and present the data for consumption and use by an end user. This has been referred to as statistical data editing (SDE). One category of statistical processes that has been discussed, but not widely implemented, for use in performing SDE is sometimes referred to as "classical probabilistic record linkage" theory and in large part derives from the works of I. P. Fellegi, D. Holt and A. Sunter. Such models generally employ algorithms that are applied against data tables. More widely adopted general models, such as if-then-else rules, for SDE have the disadvantage of being difficult to implement in computer code and difficult to modify or update. This typically requires developers to create custom software to implement complex if-then-else and other rules. This process is error-prone, costly, inflexible, time-intensive and generally requires customized software for each solution.

Although record linkage may be conducted by unaided human efforts, such efforts, even for the most elementary linkage operation, are time intensive and impractical for record sets or collections of even modest size. Also, such activity may be considered tedious and unappealing to workers and would be prohibitively expensive from an operations standpoint. Accordingly, computers are increasingly utilized to process and link records. However, the extensive amount of data collected that must be processed has outpaced the ability of even computerized record linkage systems to efficiently and quickly process such large volumes of data to satisfy the needs of users. Speed of processing data records and generating useful results is critical in most applications. The veracity of data records may be the most critical factor in some applications. There is a constant balance between the speed of processing and compiling data, the level of veracity of composite data records linked and presented, and the flexibility of the processing system for user customizable searching and reporting. Even with applications where speed of results generation is not critical, it is always desired. Most present day record linkage systems are OLAP, OLTP, RDBMS based systems using query languages such as SQL. There are many drawbacks associated with this technology, which has not effectively met or balanced the competing interests of speed, veracity and flexibility. Such systems are limited as to the complexity of the processes, such as deterministic, probabilistic and other statistical processes, that may be effectively performed on databases or data farms or warehouses.

SUMMARY OF THE PRESENT INVENTION

The present invention expands and improves on prior techniques and mitigates or solves many of the limitations affecting known attempts at mining, interpreting and understanding data. The methods and systems of the present invention employ novel techniques to access and analyze large amounts of data to generate useful results, decisions, conclusions, and reports and to provide users with results or intermediate results that enable further analysis and decisioning. Often, the goal may be not to arrive at a definitive answer, but rather to process huge amounts of data to narrow the data to a manageable number of the most relevant records. So narrowed, a user then may effectively examine and consider the reduced data set in a productive manner. The system does not necessarily "find the needle in the haystack", although that possibility is certainly contemplated by and falls within the present invention, but may be of extreme value in reducing the haystack to a hay pile or handful, with the needle still residing therein. Critically, it makes the user's task in arriving at a definitive answer or goal realistically obtainable.

The present invention may use a system such as described above to receive data records from one or more data sources and in one or more formats and process such received data. For instance, the data may be processed by applying probability based decisioning logic to interpret the data to effect a useful purpose, such as to identify, link, condense, or cleanse relevant data records. In one manner, a system utilizing the present invention will match, link or associate certain data records with one or more identifiers or virtual entities. One or more processes may be performed on the data, such as content-weighting, field weighting, gender-based distinction, age-based distinction, culture-based distinction, and other techniques. In one application of the present invention, a virtual entity may represent an actual person, such as "John Smith", and may be assigned a unique identifier. Some records may be "linked" to the entity in a direct manner, such as belonging to that individual, or may be more generally associated with the entity in a less direct manner. For example, a record linked to a first virtual entity, representing the son of John Smith, may be associated with a second entity, John Smith, the father. There may be a plurality of defined levels of association or relatedness and searching and results may be at least in part predicated or narrowed based on such levels of relatedness. Moreover, in one manner, the present invention may enable a user to, on-the-fly or in essentially real time fashion, adjust one or more search parameters to narrow, broaden or otherwise adjust the search criteria to attempt to refine the results to hone in on the most effective information to help achieve a desired purpose.

In a database with a large volume of records, each record may contain a plurality of data fields that describe a data entity. Such entity may be, for example, a person, a business, or a motor vehicle. Data fields within a record may include a person's social security number (SSN), date of birth (DOB), first name (FNAME), last name (LNAME), etc., if the entity described is a person. Alternatively, data fields within a record may include a business's tax identification number, owner's first name and last name, mailing address, etc., if the entity described is a business.

One aspect of the present invention enables the ability to link records (i.e., entity references) to a provisional identifier until a greater confidence can be determined. Provisional identifiers, referred to herein as ghost identifiers (or ghost DIDs), may serve to provide as an identifier of one or more entity references when a calculated confidence level for matching data within entity reference is not strong enough to warrant linking the records, but is not low enough to ignore a potential linkage.

One advantage in using ghost DIDs is the ability to make provisional associations and linkages, while awaiting additional information. Initial associations and linkages can be determined and investigated. Additional information from the investigation, or other sources, can then input, and new associations and linkages may be calculated. Provisional associations and linkages may provide an indication as to what further information may be necessary.

An additional feature of the present invention provides the ability to provide blocking information to prevent one or more records from being associated or linked with one or more other records, discrete identifiers and/or provisional identifiers. Blocking associations and/or links may enable a different perspective to be explored for the results from a query, as the blocking information provides different information with which to evaluate and compare data within records. Blocking associations and/or links may also prevent erroneous associations or links from being made, thus preventing potentially misleading information from being generated.

Accordingly, the present invention is directed to a system and method for association of data sets.

In accordance with one embodiment of the present invention, a method for linking a plurality of entity references to at least one entity using one or more constructed ghost entity references is provided. The method comprises the steps of identifying, for one or more common data fields, at least one unique field value from one or more entity references linked to a given entity and constructing, for the given entity, at least one ghost entity reference including the at least one unique field value, wherein the at least one ghost entity reference represents at least one potential entity reference for the given entity. The method further comprises linking at least one of the plurality of entity references to the given entity when a match probability between the at least one entity reference and the ghost entity reference is greater than a defined threshold.

In accordance with another embodiment of the present invention, a method for linking one or more entity references to at least one entity using one or more constructed entity references is provided. The method comprises the step of generating, for one or more common data fields of a plurality of entity references, a unique value table, each record of the unique value table having a unique combination of a field value from an entity reference and a Definitive Identifier (DID) associated with the entity reference. The method further comprises generating a ghost table from a cross-product of the one or more unique value tables, the ghost table including one or more of the plurality of entity references in addition to at least one additional ghost entity reference constructed from the cross-product of the one or more unique value tables.

In a database comprising a plurality of records representing information about at least one person, the records having one or more common data fields, a method for linking records to at least one person is provided. The method comprises the steps of identifying, for the one or more common data fields, at least one unique field value from one or more records linked to a given person, generating at least one ghost record for the given person using the unique field values, wherein the at least one ghost record represents a potential record for the given person and linking at least one of the plurality of records to the given person when a probability of a match between the record and a ghost record is greater than a defined threshold.

In accordance with yet another embodiment of the present invention, a computer readable medium comprising a set of executable instructions is provided. The set of executable instructions is adapted to manipulate a processor to identify, for one or more common data fields, at least one unique field value from one or more entity references linked to a given entity and construct, for the given entity, at least one ghost entity reference including the at least one unique field value, wherein the at least one ghost entity reference represents at least one potential entity reference for the given entity. The set of executable instructions is further adapted to manipulate the processor to link at least one of the plurality of entity references to the given entity when a match probability between the at least one entity reference and the ghost entity reference is greater than a defined threshold.

In accordance with another embodiment of the present invention, a system for linking a plurality of entity references to at least one entity using one or more constructed ghost entity references is provided. The system comprises memory, a processor operably connected to the memory and a set of executable instructions stored in the memory. The set of executable instructions is adapted to manipulate the processor to identify, for one or more common data fields, at least one unique field value from one or more entity references linked to a given entity and construct, for the given entity, at least one ghost entity reference including the at least one unique field value, wherein the at least one ghost entity reference represents at least one potential entity reference for the given entity. The set of executable instructions is further adapted to manipulate the processor to link at least one of the plurality of entity references to the given entity when a match probability between the at least one entity reference and the ghost entity reference is greater than a defined threshold.

Additional features and advantages of the present invention will be set forth in the description which follows, and in part will be apparent from the description, or may be learned by practice of the present invention. The objectives and other advantages of the present invention will be realized and attained by the structure particularly pointed out in the written description and claims hereof as well as the appended drawings.

BRIEF DESCRIPTION OF DRAWINGS

The purpose and advantages of the present invention will be apparent to those of ordinary skill in the art from the following detailed description in conjunction with the appended drawings in which like reference characters are used to indicate like elements, and in which:

FIGS. 1A and 1B are graphs illustrating graphical representations of entity references in accordance with at least one embodiment of the present invention.

FIG. 18 is a schematic diagram illustrating an exemplary parallel-processing database management system in accordance with at least one embodiment of the present invention.

FIG. 19 is a flow diagram illustrating an exemplary method for performing one or more database operations using the system of FIG. 18 in accordance with at least one embodiment of the present invention.

FIGS. 20A and 20B are schematic diagrams illustrating an exemplary general-purpose query processing matrix of the system of FIG. 18 in accordance with at least one embodiment of the present invention.

FIGS. 23A and 23B are flow diagram illustrating exemplary operations of the global-results processing matrix of the system of FIG. 22 in accordance with at least one embodiment of the present invention.

DETAILED DESCRIPTION OF THE PRESENT INVENTION

Figure 1B:
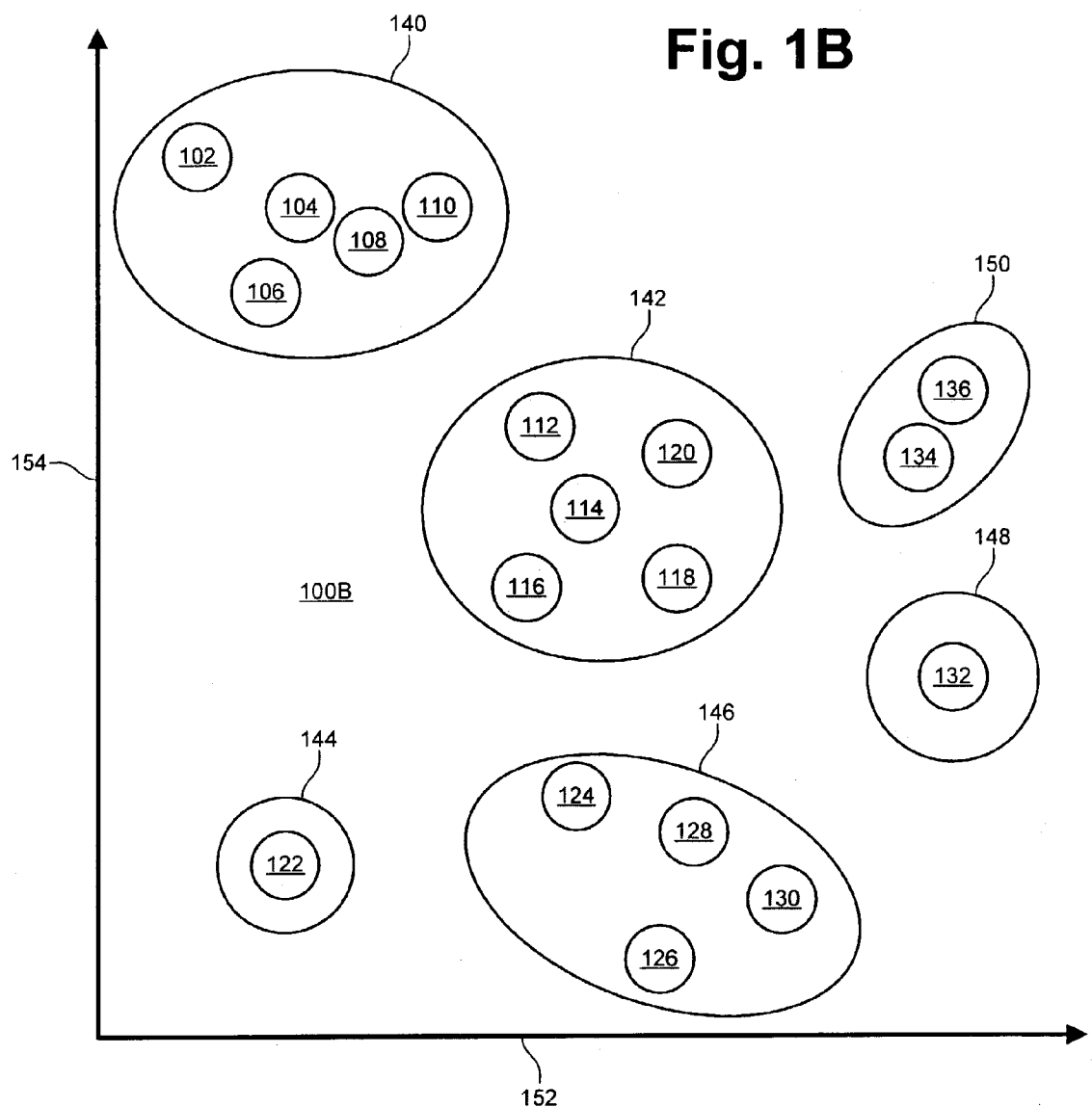

The following description is intended to convey a thorough understanding of the present invention by providing a number of specific embodiments and details involving processing data to determine links between entity references to a particular entity and associations among entities. It is understood, however, that the present invention is not limited to these specific embodiments and details, which are exemplary only. It is further understood that one possessing ordinary skill in the art, in light of known systems and methods, would appreciate the use of the present invention for its intended purposes and benefits in any number of alternative embodiments, depending upon specific design and other needs.

At least one embodiment of the present invention may be employed in systems designed to provide, for example, database searches for finding people, businesses, and assets. The results of the system query operations may be presented to users in any of a number of useful ways, such as in a report that may be printed or displayed on a computer. The system may include user interface tools, such as graphical user interfaces (GUIs) and the like, to help users structure a preferred search, presentation and report. In one exemplary embodiment, the system may be configured to generate reports concerning one or more of the following types of searches: people; businesses; driver's licenses; bankruptcy; tax liens and judgments; governmental agency registrations; court, legal or administrative proceedings; motor vehicles; merchant vehicles; property assessments, deeds or ownerships; corporate filings; UCC filings; and directory assistance.

An example of one type of useful report generated from a person-type search in accordance with one implementation of the present invention may include one or more of the following data items: report type; date of report; report processed by; report legend; subject information (name, date of birth "DOB", social security number "SSN" with state and date issued, age, gender, race, citizenship); names of others associated with subject's SSN; names associated with or used by the subject; others associated with subject's SSN; entities associated with the subject, such as partnerships, and the names of others associated with such entities, such as partners; bankruptcies; tax liens and judgments; corporate affiliations; industry affiliations; employee information; driver and other types of licenses; address(es) found (# verified and # non-verified found); list of properties owned or possibly owned by subject; motor vehicles (possibly) owned or registered; merchant vessels owned or registered; possible associates of the subject; possible relatives of the subject (by degree of relatedness, # found for each degree); neighbors of the subject; neighborhoods (# neighbors found for each neighborhood). Based at least in part on information contained in the data records ("entity references") linked to the subject or on the data record source, the system can determine the subject's active address(es) and for each such address may provide a listing including one or more of the following data items related to the one or more active addresses: current and/or past phone numbers associated with each address; property ownership information for each address; and for each property—parcel number, lot number, name owner 1, name owner 2, owner(s)'s address(es), land usage, subdivision name, total value, land value, improvement value, land size, year built, sale date, sale price, name of seller, legal description, etc.

In addition, the system may be adapted to provide similar such data for one or more previous and non-verified addresses of the subject. For entity references for which a lesser or intermediate threshold level of linkage or association is determined, the report may include similar information for "possible" properties owned by the subject. For each relative or possible relative or associate or possible associate, the system may provide one or more of the following data items: DOB; age; whole or partial SSN and state/date issued; names associated with associate or relative (including AKAs); active address(es) of the associate or relative; previous and non-verified address(es) of the associate or relative. In addition, the system may provide detailed information regarding the neighborhood(s) in which the subject resides and/or has resided, including data items such as: identify the neighborhood with each subject address; names of neighbors; neighbor address and/or phone number information. In addition, all or some of the data items presented in the report may include or be represented by "hot links" to enable the user to easily initiate additional searching and navigate cleanly through the system to most effectively utilize the data available.

In one manner, at least one embodiment of the present invention may be used in a people-search application used for locating people, confirming identities, confirming educational history and/or finances, obtaining contact information, associate and/or relative information, background data, etc. A database management system incorporating the present invention may combine data from numerous sources comprising an effectively comprehensive collection of personal information. Such a database may represent personal information concerning a non-specific or non-related collection of personal data records or it may concern a reasonably defined collection of personal data records, such as for people common to a city, a state, a region, a country, a continent, a company, a profession, a commercial network, a compilation of one or more of such affiliations, or any other type of affiliation.

In one manner, a person locator search may be initiated based on inputting one or more of the subject's Social Security Number (SSN), Last Name, First Name, State, City, phone number or portions of such information. In addition, the search may use information in the form of a range, or a more general characteristic or the like, e.g., age range, SSN range, zip code, state, nationality, country of origin, places traveled, gender, hair color, eye color, height, weight, other profile data or other distinguishing information.

Because not all data records contain the same data fields or types and often data records contain erroneous data in some fields, it may be desired to input one or more pieces of information concerning an entity or a distinguishing characteristic. To aid the user, the system may employ functionality to provide on-the-fly search refinement techniques. One aspect of at least one embodiment of the present invention is to provide search results as quickly as possible in light of the application. As speed of data results return increases, it may be helpful to enable on-the-fly manipulation or refinement of search terms based in part on the nature of the results. For instance, if the search yields too much data, then a narrowing of the search parameters may be desired. On the other hand, if the search uncovers too little data, then the search parameters may be widened. One aspect of the present invention permits "on-the-fly" review of results and immediate search refinement to enable the user to craft the search parameters to better meet the needs of the given application. Adding criteria, such as first name, middle name or initial, DOB, city, state, ZIP code, or age range, refines a search.

Further, where a user is unsure of the spelling of all or part of a search subject's name, the system may employ loose phonetic or relational searching capabilities, e.g., a Soundex system (developed by the U.S. Census Bureau), metaphone, or other such tools, to facilitate the user's search. For example, the system may employ the Soundex system to arrive at possible matching variants of a surname, e.g., "Smith" shares Soundex code S530 with Schmid, Schmidt, Schmit, Schmitt, Smyth, Smythe, among other names. Accordingly, rather than the system finding absolute disagreement among entity references having Smith and Smyth, respectively, as last name data, it may assign some weighting to the entity reference to indicate a possible but not exact match. Further, the system may apply a somewhat reduced weighting for a name such as Schmidt, as representing a greater variance from "Smith" than the variance of "Smyth".

Likewise, if a user does not know a subject's city of residence or birth but knows the general vicinity, the system may include functionality to permit the user to use a radius option. For example, the user may enter a ZIP code or a nearby city or state and provide a radius (in miles) in a radius field of the search profile. In this manner, broader search terms for other fields may be employed while limiting the number of records returned based on relative high confidence of geographical location, i.e., precluding records falling outside of the radius or city or state from being returned.

Another exemplary type of searching includes bankruptcy searches, wherein the results may typically include: debtor name, SSN, address, additional debtor name/SSN/address, case number, date filed, court location, filing type, etc. A search may yield additional information, for example: date filed, disposition date, filing type, filing status, debtor name (with SSN, alias, and/or debtor address), additional debtor (with SSN and/or alias), liabilities, assets, exempt, assets available for unsecured creditors, debtor is self-represented, attorney, attorney phone number, trustee, trustee phone number, case number, court location, creditors meeting date, and creditors meeting location. A similar type of search is a tax lien search, wherein results may include defendant name, address, additional defendant, filing type, case number, and date filed. A search may also yield the following additional information: debtor's SSN, satisfaction or release date (if applicable), judgment or lien amount, plaintiff or lien holder, and court location.

Yet another type of search is a Federal Aviation Administration (FAA) search, wherein results may include: full name, address, record type, and medical certification information (e.g., class, certification date, and/or expiration date). This search may yield additional information, such as: letter, certification type, certification level, certification expiration date, and FAA certificate ratings.

Another type of search is a motor vehicles (e.g., trucks, automobiles and boats) search, wherein results will likely vary from state to state but typically may return the following information: description, record type (current/historical), tag number, VIN number, owner 1 information (name, address, SSN, and driver's license number), owner 2 information (name, address, SSN, and driver's license number), registrant 1 information (name, address, SSN, and driver's license number), and registrant 2 information (name, address, SSN, and driver's license number). The report also may display additional information, including: owner's and registrant's age, sex, and county, lien information (name, address, and lien date), vehicle information (engine type, vehicle use, mileage, and description), and other information (title number, title date, title status, decal date, expiration date, and registration status). The search results often are not limited to automobiles. Motor vehicle records also may include boats, trailers, RVs, and other assets registered with the department of motor vehicles.

Another type of search is a property assessment search, wherein results may include: owner name, second owner name (if applicable), property address, owner address, seller name, land usage, sale date, recording date, tax year, sale amount, assessed value, and parcel number. The search may yield the following additional information: county, subdivision name, year built, land value, improvement value, total value, tax amount, market land value, market improvement value, total market value, assessed year, living space (square feet), land size (square feet), number of stories, foundation, number of bedrooms, number of full baths, and number of half baths.

A property deed type search may yield the following results: property address, owner name, seller name, owner address, sale amount, mortgage amount, sale date, recording date, parcel number, document type, land usage, county, type, and loan amount.

Another type of search is a merchant vessel search, wherein results may include, for example, owner name, address, vessel name, record type, official number, vessel number, hull number, description, additional vessel information (vessel service type, self propelled, length, breadth, depth, gross tons, net tons), shipyard, year built, place built, hull builder, and hailing port.

Another type of search is a corporation filings search, wherein results may include: company name, address, address type, Federal Employer Identification Number (FEIN), charter number, state of origin, record date, and status. In one manner, if the user searches by a person's name and that person is an officer in a corporation, the officer title is also returned. Additional information may include: filing date, terms, type of corporation, registered agent information, and a list of corporate officers and directors.

Another type of search is a local or national Uniform Commercial Code (UCC) filings search, wherein results may include: debtor name, debtor address, original date, date filed, filing state, original number, document number, legal type, secured party's name, address, number of secured parties, number of debtor parties, number of filings, a list of collateral, additional debtor information, additional secured party information, collateral code, and events related to the filing.

Another type of search is a directory assistance search, wherein results may include: listing type (residence, business, or government), name, address, phone number, and caption. The caption column displays additional listing information such as the department name of a large business. This function may include the ability to perform a reverse telephone number search. Searches may include residences, businesses, organizations, or a combination thereof.

One feature of at least one embodiment of the present invention that may be particularly useful to directory assistance searches and other people-related searches, but is applicable to a wide variety of search types, provides the ability to match or associate names with common nicknames as well as recognize entries which contain only initials. For example, a search for "joseph" returns information for both "joe" and "j." For businesses, common abbreviations are searched automatically. For example, a search for "united states" will return all records containing "us" or "usa." Where a user is unsure of the exact city, the system may allow the user to supply the closest city and specify a radius (no more than 100 miles). In this manner, the system may expand the area considered to a region extending the specified number of miles from the center of that city.

The system of the present invention may also provide a batch search process to accelerate searches of the types listed above on large numbers of entity references, such as when performing, for example, a person search on a list of millions of names, SSNs, employee numbers, customer ID, etc. Batch processing may provide results in a number of user-definable report formats with user-selectable data fields. For instance, a batch process person search may include individual reports for each submitted name and each report may include subject date including: active addresses, phone numbers, historical addresses, relatives, associates, properties, bankruptcies. For ease of use, the batch process may be implemented in the form of a software module whereby a user may select not only comma delimited output but in other formats, such as rich text format (RTF), hypertext markup language (HTML), or Adobe Acrobat (PDF) output as well. The reports may be formatted as specified by the user and may be, for example, separated by page breaks or the like for desired presentation or user use. Such batch type results may be returned to users in zipped files, compact disc format, posted to a secure site, etc.

In one manner, the batch process may involve a user upload of a data set or file and may include the following steps. As an initial matter, the user selects a batch job name for identification and other purposes. Next, the system prompts the user to enter a desired source file location or filename for upload. To facilitate this step, a "Browse" function may be provided to help the user locate the file to be uploaded and searched. The user file may then be uploaded for processing. Next, the user selects or defines field labels, e.g., full name, first name, middle initial, middle name, last name, employee number, customer number, SSN, country, state, city, address line(s), zip code, gender, citizenship status, etc. The system may provide a dropdown list from which the user may choose field labels for each of the field data or values via the drop list. After defining the appropriate field labels, the user may select a desired report output format, e.g., a comma delimited file, RTF file, an HTML file, an Adobe Acrobat (PDF), and the like.

Because much of the information contained in one or more of the data sources may be highly confidential, the system may require the user to designate a proper use, before access to the data is permitted. This use may be associated with the particular user or industry class and may be part of the user profile as established through a registration process or otherwise. The system may present the user with a screen to inform the user about consumer identification information governed by the Gramm-Leach-Bliley Act (GLB). For example, a law enforcement representative, a lawyer, a collector and other types of qualified users would be required to select an appropriate permitted use before the system will access certain data.

In one embodiment, the system may be accessible over a network, such as in an online fashion over the Internet. The system may involve the downloading of an application or applet at a local user or client side computer or terminal to establish or maintain a communications link with a central server to access or invoke the query builder process of the system and to initiate or accomplish a query search. After, prior to or as part of the query process, the user may be required to complete an order or request input and the system may generate an order or request confirmation. In one manner, the confirmation may be displayed on the user's screen and may summarize the options that have been selected for the batch job or other query request and the maximum possible charge for the selected options. After reviewing the confirmation summary and before final commitment to the service and associated charge, the user may then select an "Authorize Order" button or the like to submit the request and finalize the order. The system may then present the user with an order acceptance screen. After the batch process is executed and the results generated, the results may be forwarded to the user in any of a number of desired manners, such as via an email address, street address, secure site upload, or other acceptable methods.

The term entity reference generally refers to a record of a database that includes information pertaining to a particular entity. Examples of databases that may serve as data sources include, but are not limited to: governmental, including state, city and country, records, birth records, Social Security Death Index (SSDI), census bureau records, telephone directories, court records, death records, deeds, divorce records, land records, marriage records, military records, mortality schedules, naturalization records, newspaper records, business records, obituaries, passenger lists, plat indexes, POW-MIA-KIA records, and tax and voter lists. By way of one example, each time a person applies for consumer credit, a record of this credit application could be added to a consumer credit reporting database. This record then would be an entity reference that refers to the person applying for credit. The record may include, for example, information relating to the person, such as the name, address, SSN, DOB, and the like, as well as information relating to the credit application, such as the date of application, the type of credit applied for, the amount of credit requested, whether the application was accepted or rejected, as well as other related information. As such, this record is an entity reference that refers to the person seeking credit (i.e., the entity). Accordingly, if that particular person applies for credit a number of times, a corresponding number of entity references associated with that person typically would be added to the consumer credit report database.

It will be appreciated, however, that although a subset of entity references in the database may in fact refer to the same entity, such commonality between the entity references for a given entity may not be clear due to variations in the information in the various data fields of the entity references. For example, nicknames, address changes, misspellings, transliterations and incorrect information frustrates the ability to determine conclusively that a certain subset of entity references refers to a particular entity. Likewise, such variations also make it difficult to determine conclusively that a particular entity reference is not associated with a particular entity.

To illustrate, exemplary graph 100A of FIG. 1A displays a plurality of entity references 102-136 of a database mapped in a two-dimensional Cartesian plane. The axis 152 represents the spectrum of information found in one data field common to entity references 102-136 and the axis 154 illustrates the spectrum of information found in another data field common to entity references 102-136. The distance between entity references along an axis represents variance between the information found in the corresponding data fields of the entity references. To illustrate, axis 152 could represent a spectrum of surnames found in a surname data field common to the entity references 102-136 and axis 154 could represent a spectrum of first names found in a first name data field common to the entity references 102-136. In this case, those entity references having surnames that are similar (e.g., Smith v. Smithe) will be located closer together along the axis 152 than those entity references having surnames that are relatively different (e.g., Petrovsky v. Smith). Similarly, entity references having first names that are similar (e.g., Mary v. Mari) will be located closer together along the axis 154 than those entity references having first names that are relatively different (e.g., Boris v. Mari).

Although graph 100A provides a visual reference of the variance between the entity references 102-136 for two data fields, it will be appreciated that entity references often include more than two data fields of interest. In this case, the degree of variance between entity references 102-136 would be represented by an n-degree hyperspace, where n represents the number of data fields of interest. For ease of illustration, visual representations of the entity references described herein are limited to two axes. The various techniques described herein, however, may be utilized for entity references having any number of common data fields of interest without departing from the spirit or the scope of the present invention.

Upon visual inspection, a person could reasonably identify groupings of the entity references 102-136 that have a high probability of referencing the same entity. To illustrate, due to the relatively small distance between entity references 134, 136 along axes 152, 154, a person may reasonably conclude that entity references 134, 136 reference the same entity. At the same time, the relatively great distance between entity reference 102 and entity reference 130 along axes 152, 154 may lead a person to reasonably conclude that entity references 102, 130 do not reference the same entity.

By such visual inspections, a person could predict groupings of a small number of entity references to a small number of entities with relative accuracy. It will be appreciated, however, that for a large number of entity references and/or entities, it would be prohibitively expensive or time consuming to have direct human analysis of the linkage between entity references to determine to which entity a particular entity reference refers. For example, there exist databases that include terabytes of information on a vast majority of the United States population. To accurately and completely link each entity reference in such a database to a corresponding entity by human evaluation would be unduly difficult, time consuming and excessively expensive.

However, as described herein, various implementations of the present invention incorporate techniques to accurately and completely link entity references to corresponding entities. FIG. 1B shows a graph 100B having exemplary determined groupings 140-150 of the entity references 102-136 that might result from an application of such techniques. As described in greater detail below, each grouping of entity references typically would be assigned or associated with a unique Definitive Identifier (DID). The DID of a grouping would then be appended to each entity reference in the grouping. Further, in one embodiment, each entity reference is assigned a unique Reference Identifier (RID). Consequently, each entity is assigned a unique DID and each entity reference is assigned a unique RID, but entity references may share a same DID as they both may refer to the same entity. Table 1 illustrates this concept.

TABLE 1

| Row Number | DID | RID | First Name | Last Name |
|---|---|---|---|---|
| 1 | 1 | 1 | Mary | James |
| 2 | 1 | 2 | Mari | James |
| 3 | 2 | 3 | Bob | Jameson |
| 4 | 3 | 4 | Robert | James |

In Table 1, four entity references are associated with three entities (assigned DIDs 1, 2 and 3 respectively). Each entity reference is assigned a unique RID (RID 1-4). Any number of techniques may be used to assign RIDs, such as an auto-incrementing sequence. From Table 1, the entity references having RID 1 and RID 2, respectively, share a common DID (DID 1), indicating that they reference the same entity (i.e., Mary James is determined to be the same person as Mari James in this instance). The entity references having RID 3 and RID 4, however, do not share a common DID and, therefore, are not believed to represent the same entity (i.e., Bob Jameson is not the same person as Robert James in this instance).

In certain instances it may be desirable to have more than one DID associated with a record. By way of example, a record may be a mortgage loan for a home at a particular address, where the mortgage loan has been signed by a husband and wife, e.g., "Dave Johnson" and "Kelly Johnson." In this example, "Dave Johnson" may be identified with DID 33258, while "Kelly Johnson" may be identified with DID 45237. In a credit reporting application implementing techniques described herein, the mortgage loan record then may be linked to or associated with both DID 33258 (for "Dave Johnson") and DID 45237 (for "Kelly Johnson").

According to another embodiment of the present invention, it may be desirable for a record to be linked with only one DID. By way of example, a medical record for a child may include data about the child's parent as well as the child's allergy to a certain medication. However, it may not be desirable for the child's allergy to penicillin to preclude a doctor from prescribing penicillin to treat the child's parent. Thus, in this example, only the child's DID may be linked with the medical record, with no link to other family members.

Table 1 illustrates the utility of the DID for use in queries to databases. For example, if a query requesting information about "Mary James" were submitted to a database management system having a database represented by Table 1, the database system could search for "Mary James" and find the entity reference having RID 1. The database system then would look to the DID data field of the entity reference RID 1 to identify the entity reference for "Mary James" as having DID 1. The database system then could search the database for each entity reference having DID 1, such as the entity reference having RID 2 (for "Mari James"). If the DID were not implemented, the database system likely would have to either perform a record matching process for each submitted query (a time- and effort-intensive process) or the database system would only return information that strictly matched the information submitted by the query. Accordingly, by performing the matching of entity references to a DID prior to the submission of queries, the database management system can significantly reduce the time and effort expended during a query operation.

Figure 2:
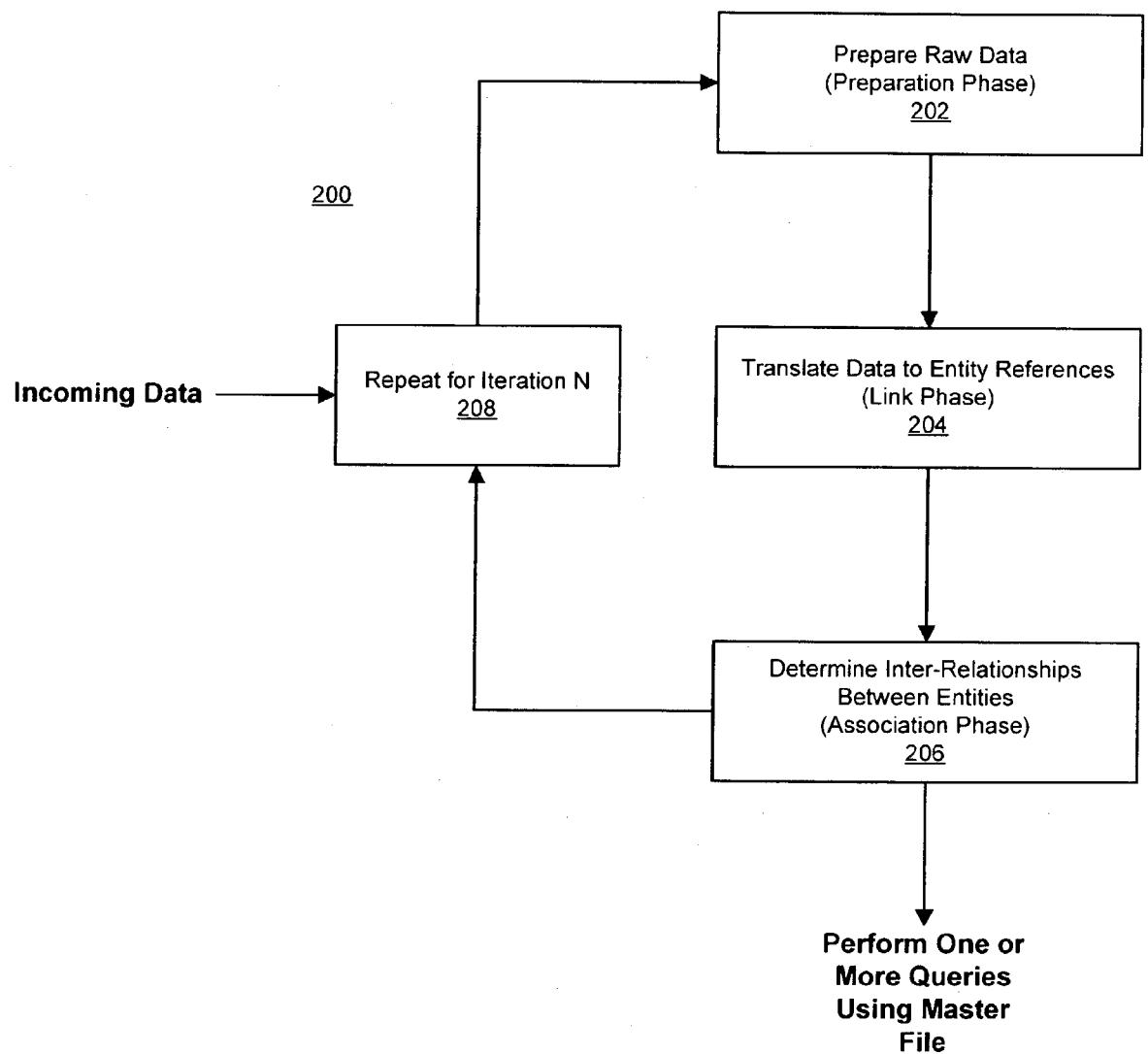
FIG. 2 is a flow chart illustrating an exemplary process for linking entity references to entities and associating entities in accordance with at least one embodiment of the present invention.

Referring now to FIG. 2, an exemplary process for incorporating raw data into a DID-based master file is illustrated in accordance with at least one embodiment of the present invention. Process 200 typically initiates at preparation phase 202, wherein incoming data is received from one or more data source and formatted to be compatible with the format of the master file, where the master file represents the database upon which queries may be performed. The incoming data can include data from any of a variety of sources and have any of a variety of heterogeneous formats. To illustrate, the incoming data could include a data set from a motor vehicle registration database, wherein the information in the data set is formatted and arranged in a proprietary way. Prior to inserting the motor vehicle registration information into the master file, the information may need to be converted to a homogenous format consistent with the information already present in the master file. Accordingly, the preparation phase 202 includes various processes to translate the incoming data into entity references for inclusion in the master file.

These processes may include, for example, deduplication ("dedup") of incoming data records, filtering of the incoming data to remove unrelated information, converting data fields from one format to another, and the like. For example, the incoming data could include a name data field having a first name followed by a surname for each record, whereas the master file could include separate first name and surname data fields. The preparation phase 202, in this case, therefore may include the step of separating the name data field of each record of the incoming data to a separate first name data field and surname data field. After formatting the data of each record, the information in the data fields of each record is used to populate a corresponding proposed entity reference. Each proposed entity reference also may be given a unique RID. The preparation phase 202 is discussed in detail with reference to FIG. 3.

During the link phase 204, the proposed entity references generated from the incoming data typically are merged into the master file. During this process, the proposed entity references may be linked to a particular entity using one or more matching techniques discussed in greater detail herein. If a proposed entity reference is associated with a pre-existing entity of the master file, the proposed entity reference may be assigned the DID of the entity. Otherwise, a new entity may be created and assigned a new, unique DID and this DID is assigned to the proposed entity reference. In the event that the incoming data represents the first information to be incorporated in the master file, each proposed entity reference may be supplied a unique DID and then a match process, as described herein, may be applied to link entity references to their corresponding entities. Further, the additional information of the incoming data may allow further adjustment of the entities, such as by associating entity references that seemed, prior to the receipt of the incoming data, to reference separate entities or by disassociating entity references from an entity based on the new information. The link phase 204 is discussed in detail with reference to FIGS. 4-13.

At this point, the master file may be beneficially used in a database management for query operations whereby information related to an entity can be readily identified by locating those entity references having the same DID as the DID of the entity. In many cases, however, further insight may be gained by analyzing the information associated with related entities. For example, in a criminal investigation context, information regarding a suspect's family, friends, and associates may assist an investigator in investigating a crime. In such instances, the database records (i.e., the entity references) corresponding to the suspect may not include such information. By comparing the information available on the suspect with information available on others in the criminal database and/or other databases, previously unknown relationships between the suspect and others may be identified. Accordingly, the process 200 may further include an association phase 206 whereby one or more association techniques, as described herein, may be implemented using the master file and/or external information to identify associations between entities. Associated entity references may be marked as such, resulting in a master file having DIDs and association information for some or all of the entity references. The association information may then be utilized during query operations on the master file. The association phase 206 is described in detail with reference to FIGS. 14-16.

After the application of phases 202-206, in one embodiment, a DID and/or RID may be appended to some or all of the entity references in the master file. These appended values may then be beneficially used by one or more database systems to rapidly locate specific information. To illustrate, when searching for all information regarding a particular entity, the database system may simply identify those entity references (i.e., records) in the master file having the DID associated with the particular entity. Further, association information may be appended to the entity references and/or stored in an associated file (herein referred to as the relatives file). Accordingly, when attempting to determine, for example, the relatives of a person represented as an entity in the master file, the database system may simply utilize the association information associated with the entity references that refer to the person to identify other entity references that refer to relatives of the person. Additional benefits of the process 200 are described in detail herein.

It will be appreciated that, in many instances, data periodically may be added to the master file for utilization in one or more queries. Accordingly, at phase 208, the preparation phase 202, the link phase 204, and/or the association phase 206 may be performed iteratively each time new data is to be added to the master file. One benefit of this iterative approach is that as the amount of data represented in the master file increases, the more likely the master file effectively represents the "universe" of information resulting in more accurate linkages of entity references to entities and the associations between entities.

Figure 3:
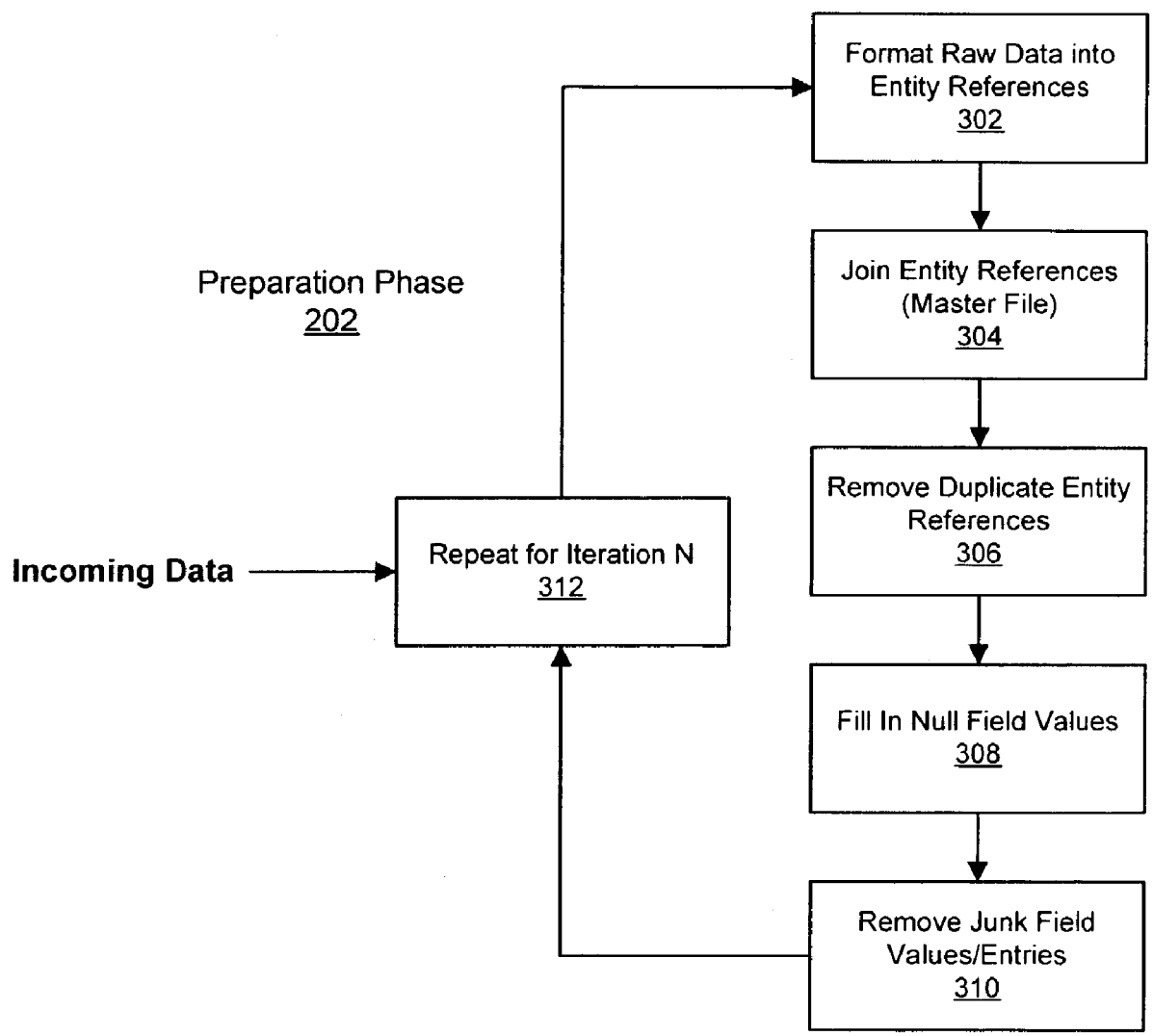
FIG. 3 is a flow chart illustrating an exemplary data preparation process of the process of FIG. 2 in accordance with at least one embodiment of the present invention.

Referring now to FIG. 3, the preparation phase 202 of process 200 (FIG. 2) is discussed in greater detail in accordance with at least one embodiment of the present invention. As illustrated, the preparation phase 202 may initiate at step 302, whereby incoming data is converted, if necessary, from its original format to a format appropriate for inclusion in the master file. This formatting typically is data-dependant. To illustrate, for data pertaining to people, the incoming data may include database records having, for example, DOB fields where the day of birth precedes the month of birth, whereas the entity references of the master file have the month of birth listed first. Step 302 could, therefore, include the step of reformatting the DOB values of the incoming database records so that the month of birth is listed first.

After converting the incoming data to the desired format, the data is added to the master file as one or more entity references at step 304. In some instances, the incoming data may be the same or substantially equivalent to the entity references already present in the master file. Accordingly, at step 306, duplicate entity references may be removed from the master file.

Because the incoming data often is provided from a plurality of data sources, each having their own data of interest, the incoming data may not include data corresponding to one or more of the data fields of the resulting entity references. To illustrate, data provided from, for example, a state motor vehicle database may not include the name of the state in its vehicle-registration records as it may be implicit. If, however, data from multiple motor vehicle databases are integrated into the master file, it typically would be beneficial to include an indication of the state from which a certain motor vehicle registration record originated. Accordingly, at step 308, the data fields of the entity references added to the master file may be filled to "complete" the entity references. The values to be added to the corresponding fields of the entity references may be determined in any of a variety of ways. Using the previous example, the name of the state may be appended to each added motor vehicle registration record (one example of an entity reference) because the source of the motor vehicle registration records (i.e., the state) would be known. Alternatively, the entity references already integrated into the master file may be used to fill-in the missing values of the entity references to be added. Further, information represented by the added entity references may be used to fill-in the missing values of the entity references already integrated.

Just as missing field values may pose problems when processing the master file, "junk" field values also may cause incorrect or improper evaluation of the data of the master file. These "junk" field values may include, for example, out of range SSNs (e.g., 123-45-6789 or 999-99-9999), unlikely names (e.g., "Mickey Mouse"), license plate numbers with too many or two few alphanumeric characters, and the like. In at least one embodiment, these "junk" field values are removed or mitigated at step 310. The "junk" field values may be identified using, for example, a table of "junk" values for a particular field or combination of fields, by employing an analysis process (e.g., detecting SSNs that are out of range), etc. Those skilled in the art may implement alternate processes to detect "junk" field values using the guidelines provided herein. After detecting a "junk" field value, the "junk" field value may be removed, replaced with substitute value or a more likely value, or the entire entity reference having the "junk" field value may be removed.

The entity references added to the master file during the preparation phase 202 then may be utilized to identify new links between entity references during the link phase 204 and/or new associations between entities during the association phase 206. As noted previously, additional data may be periodically added to the master file in many instances. Accordingly, at step 312, steps 302-310 may be repeated for each incoming set of data.

Figure 4:
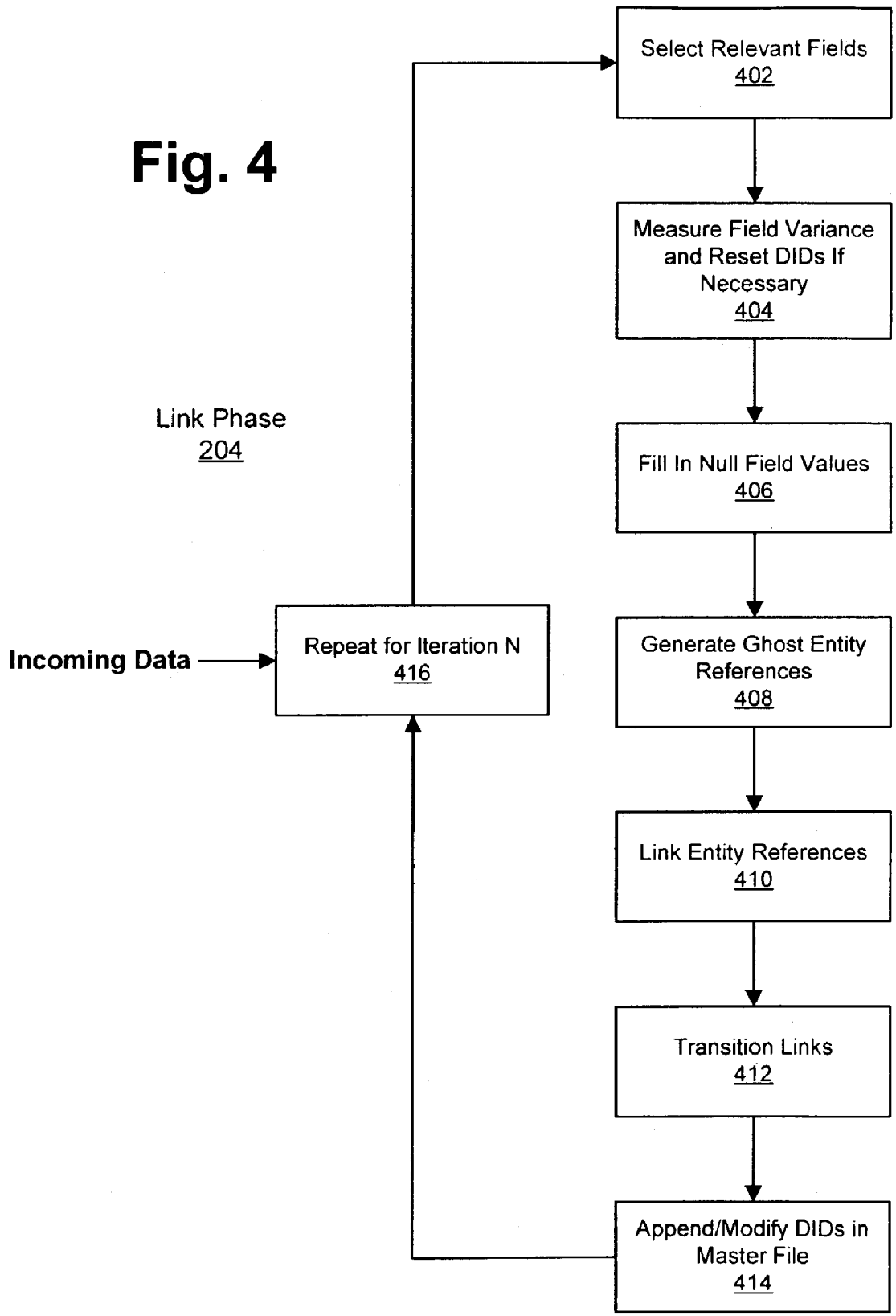
FIG. 4 is a flow chart illustrating an exemplary link phase of the process of FIG. 2 in accordance with at least one embodiment of the present invention.

Referring now to FIG. 4, an overview of one embodiment of the link phase 204 is illustrated in accordance with the present invention. During the link phase 204, entity references of the master field are linked to a particular entity. In at least one embodiment, a link to an entity is determined based on a comparison of one or more fields of one entity reference to the corresponding fields of another entity reference. If the values of one or more of the fields match or share a certain degree of closeness, relatedness or commonality, the entity references may be determined to refer to the same entity. Steps 402-414 of FIG. 4 illustrate one manner of determining the links between entity references and utilizing links between certain entity references to identify links with other entity references.

At step 402, the one or more of the data fields of the entity reference are selected as relevant to the determination of links between entity references. This subset of selected data fields typically is dependent on the data and the entities represented by the data, as well as the intended use of the data. To illustrate, the data fields for entity references pertaining to people that are relevant in determining if two entity references refer to the same person may be, for example, the SSN, DOB, name, street address, etc. These data fields typically provide a greater degree of specificity than, for example, the state of residence or eye color or type of vehicle driven (e.g., car, truck, sports-utility vehicle). Accordingly, it may be more appropriate to select, for example, the SSN and DOB data fields for use in comparing entity references than the eye color field when determining links between entity references. While it is preferable to limit the number of data fields selected to decrease the effort and time necessary to accurately determine a match, in some instances is may be advantageous to select a majority or all of the data fields of the entity references to be compared.

In the event the master file has previously undergone the link phase 204, it may be appropriate to determine if any potentially incorrect links have been identified. Accordingly, in one embodiment, the variance between one or more of the selected data fields of the entity references linked to or associated with a particular entity is measured at step 404. If the variance exceeds a particular threshold, it is possible that the entity references may be improperly linked and the links, therefore, may be "broken" by resetting the DID associated with one or more of the entity references. The determination and correction of potentially incorrect links between entity reference are discussed in detail with reference to FIGS. 12 and 13.

Some entity references may have data fields having incomplete or missing information. These data fields may be enhanced or filled at step 406. Unlike step 308 (FIG. 3) of the preparation phase 202, however, step 406 may entail filling in or enhancing data fields based on links between entity references and/or associations between entities identified during previous iterations of the link phase 204 and the association phase 206. The process of filling-in and enhancing deficient or vacant data fields is discussed in greater detail below.

As noted previously, as the data represented in the master file increases, the more closely the master file represents the "universe" of entity references pertaining to a certain set of entities and, therefore, the more accurate identified links between entity references and associations between entities may become using the techniques described herein. Until the master file is of a scope approximating the "universe," however, the master file may not contain entity references that otherwise would be expected to exist. Accordingly, at step 408, various techniques may be implemented to generate "ghost" entity references indirectly from other entity references already present in the master file. In one manner, these "ghost" entity references represent entity references that are not supplied from an external data source but would be expected to exist if the master file more closely approximated the universe of entity references. These techniques for generating "ghost" entity references are collectively referred to herein as "ghosting" and are discussed in greater detail with reference to FIG. 11.

At step 410, one or more match processes, as discussed herein, may be implemented to identify links between entity references to a particular entity. In at least one embodiment, probabilistic and statistical methods may be employed to determine the similarity between the selected fields (step 402) of the entity references, thus determining the probability that two entity references refer to the same entity. Various match processes are discussed in detail below with reference to FIGS. 5-7.

After identifying direct links between entity references (i.e., that two entity references have a degree of similarity above a certain threshold), one or more transition processes may be implemented at step 412 to identify indirect links between entity references. To illustrate, if entity reference A is linked to entity reference B and entity reference B is linked to entity reference C, then entity reference A may be linked to entity reference C using transitive closure or another transitive process, as described below with reference to FIG. 8-10.

The direct links and indirect links between entity references identified as a result of steps 402-412 then may be used to assign or modify a DID value to each entity reference at step 414, where each entity reference linked to a particular entity typically is assigned the DID associated with the particular entity. The DID may be associated with the entity reference, for example, by appending the DID as a DID data field to the record of the master file representing the entity reference, by creating a separate file having as records the RIDs of the entity references and their corresponding DIDs, and the like.

In instances where the data of the master file is periodically supplemented by incoming data, steps 402-414 may be repeated at step 416. This iterative approach, in one embodiment, results in the incremental improvement of the master file while resulting in relatively minor effort to integrate the incoming data into the master file. The addition of the incoming data may result in the identification of new direct or indirect links between entity references, the determination that entity references may be improperly linked, the identification of values for empty data fields of entity references of the master file, and the like.

Figure 5:
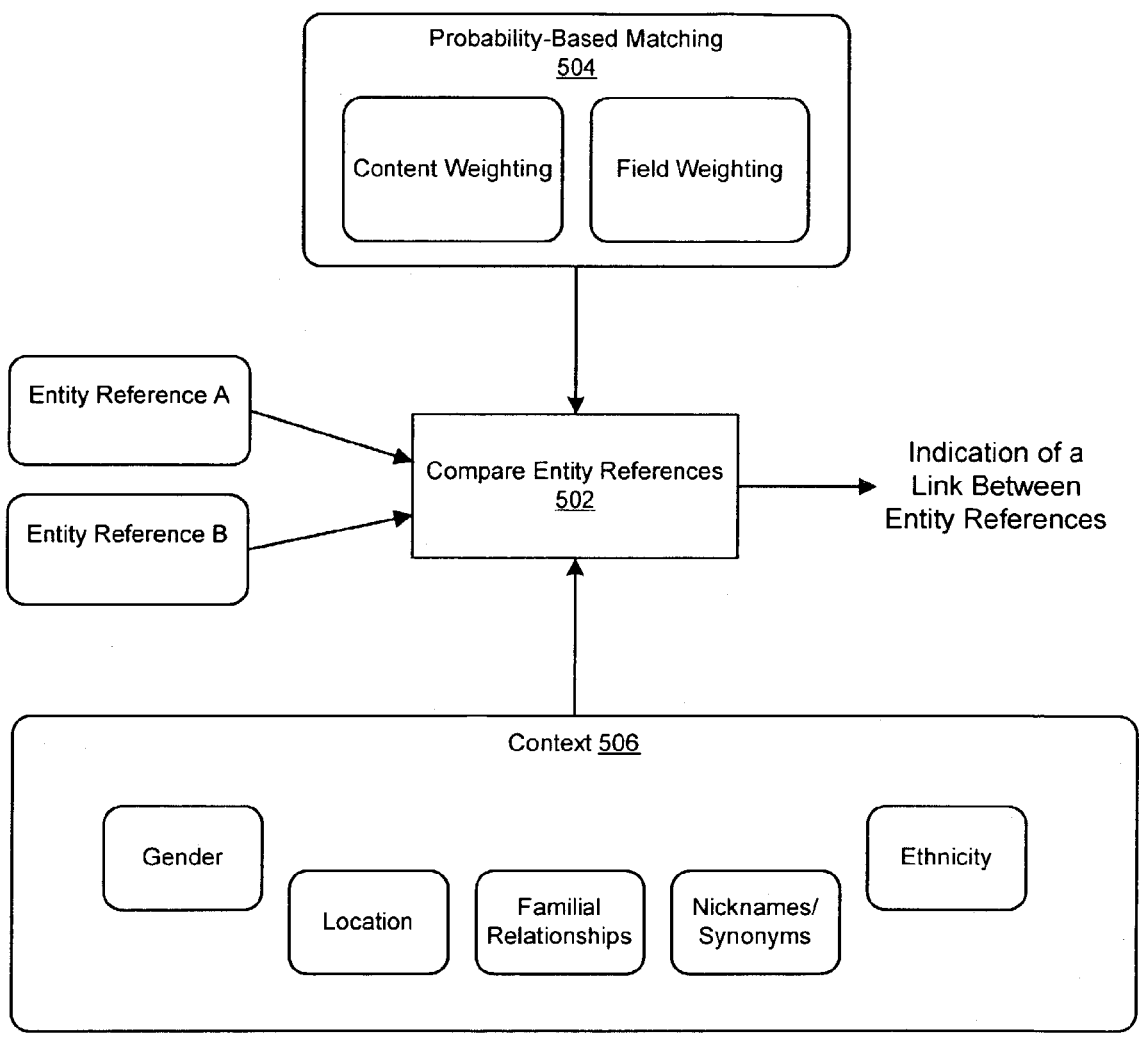
FIG. 5 is a flow chart illustrating an exemplary method for matching entity references based in part on probability and context in accordance with at least one embodiment of the present invention.

Referring now to FIG. 5, an exemplary match process for determining the possibility of a link between two entity references associated with a same entity is illustrated. In at least one embodiment, a match process 502 is utilized whereby the probability that two entity references refer to the same entity is evaluated. This probabilistic determination process 504 may be achieved by comparing the value(s) of a subset of the data fields (selected during step 402, FIG. 4) of one entity reference are compared to the value(s) of another entity reference to determine the degree of similarity between the entity references. If the degree of similarity exceeds a certain threshold, the entity reference may be identified as related to the same entity and, therefore, linked to each other.

Various methods may be utilized to determine the degree of similarity between entity references based in part on their data field values. In particular, a probablistic process whereby a confidence value is assigned to a proposed link between two entity references based on the degree that the field values match optionally adjusted by a weighting factor. The weighting factor for a given data field may be determined based on the data field type (herein referred to as field weighting), it may be based on the values within the data field under consideration (herein referred to generally as content weighting), or a combination thereof.

Generally, to arrive at a confidence level for a comparison between the field values of two entity references, the probability that the two values of a particular data field match is adjusted by a weighting factor particular to the data field. The confidence level for the comparison then may reflect the adjusted probability for each data field under consideration. To illustrate, the Fellegi-Sunter model suggests an equation for record matching, the equation given approximately as:

$$P(r_1=r_2)=p_1 * w_{f,1} + p_2 * w_{f,2} + \ldots + p_n * w_{f,n}$$ EQ. 1 where $P(r_i=r_2)$ is the probability that record $r_1$ and record $r_2$ reference the same identity, $p_n$ is the probability that data field i of record $r_1$ is equal to data field i of record $r_2$, and $w_{f,i}$ is the probability that the records $r_1$, $r_2$ reference the same entity given their data fields i are equal. The weights $w_{f,i}$ can be thought of as a measure of the specificity of the data field i. For example, that two records having the same zip code data field typically does not imply that the two records belong to the same person, business, or other entity. Conversely, two records having, for example, the same social security number in the respective SSN fields may be a strong implication that the two records reference the same person (or at least indicate some association).

While the Felligi equation (EQ. 1) provides a reasonable estimation of the confidence level that two entity references may refer to the same entity in some instances, it is also flawed in others. It often is beneficial to implement a weighting factor that is not simply determined by the particular field, but also by the field values (i.e., the contents). To illustrate, that two surname data fields containing "Smith" are equivalent is far less indicative than two data fields containing "Polatskygorsekov." To this end, at least one embodiment of the present invention implements the following equation (EQ. 2) to determine a probability match value based on content weighting:

$$P(r_1=r_2)=w_{C,1}*p_1 + W_{C,2}*p_2 + \ldots + w_{C,n}*p_n$$ EQ. 2 where $p_i$ is the probability that data field i of record $r_1$ is equal to data field i of record $r_2$, $w_{C,i}$ is a content weight value for data field i that is a function of the contents of the data field i. Accordingly, to determine the probability P, the weights $w_{C,i}$ for each data field of interest are computed, used to adjust the probabilities $p_i$, and the adjusted probabilities are then combined (e.g., summed). An exemplary implementation of the content weight technique is described in detail with reference to FIG. 6.

In one embodiment, the probability $p_i$ that the field value of one entity reference matches the corresponding field value of another entity reference may be set to a first constant (e.g., one) if the field values are an exact match (i.e., are equivalent) or set to a second constant (e.g., zero) if they differ. This technique for determining the probability of a match between field values typically requires a relatively less significant expenditure of time and effort. It also, however, fails to take into account the possibility that although two field values may not be exact matches, they may be variants of the same information. To illustrate, the names "Maryanne Lewis" and "Mary Anne Lewis" may not be exact equivalents, but a person could reasonably conclude that they are essentially equivalent for various intents and purposes. Accordingly, in at least one embodiment, the probability $p_i$ that two field values match may be based in part on the degree to which the field values are similar and/or the degree to which the field values differ or to the extent adjacent or related (e.g., first, middle, last name) fields, when considered collectively, contain closely matching data.

Any number of techniques for determining the degree to which two field values are likely to refer to the same information may be utilized. These techniques often are related to the type of field values being compared. For example, processes may be used to analyze how closely two different SSNs resemble each other, taking into account accidentally transposed numbers, SSNs that are out of range, and the like. Addresses may be analyzed, for example, by considering common misspellings of street names, city names, and the like. Such techniques may be applied to a wide range of data types. Exemplary techniques may include phonetic and edit techniques, such as Jaro and Soundex techniques.

In many instances, the context (figure element 506) of the field values may be taken into consideration when evaluating the confidence level of a link between two entity references. This context may be used to adjust the probability $p_i$ of two field values matching, the weighting factor associated with the field or field values, and/or the overall confidence value P to more accurately reflect the true probability. To illustrate using information related to people, gender often provides meaningful perspective in determining the significance of the relationship between two entity references. To illustrate, the first name "Mary" may be commonplace for females but rare for males. Two entity references relating to a male that are found to have the name "Mary" in their respective first name fields may prove to be a greater indicator of a match than, for example, both entity references having the name "John" in their respective first name fields.

Another consideration may be the locations associated with the entity references and expected or calculated prevalence of field values. For example, two "John Smiths" entity references occurring in the same zipcode may be a greater indication that they refer to the same person than if they occurred in different states. Likewise, the occurrence of two entity references for "Jose Martinez" in Boise, Id. may have a greater statistical significance than two entity references for "Jose Martinez" in Los Angeles, Calif.

In a similar manner, ethnicity and/or national origin may be used to adjust a given probability of a match between entity references. Ethnicity or national origin may play a role in the statistical significance of a variety of possible data fields, such as names, location of domicile, types of vehicle driven, types of employment, and the like. To illustrate, people of Central and South American decent are more likely to name their male children "Jesus" than people of Asian decent and, therefore, two entity references to, for example, Chinese citizens named "Jesus" may be statistically more significant than two entity references to, for example, Panamanian citizens named "Jesus." Likewise, familial relationships may play a role in considering the probability of two entity references referring to a same entity. For example, sons often are given their father's or grandfathers name. Similarly, married women often take their husband's last name and may revert back to their maiden names after a divorce.

The possible occurrence of synonyms in the data fields often is particularly significant when determining the probability that two entity references refer to the same entity. In many instances, the same information may have any number of valid representations. For example, streets may have multiple acceptable names, first names may have shortened versions or "nicknames," acronyms may be used to represent common concepts, and the like. Accordingly, when comparing entity references, it often proves beneficial to consider the presence of variations of the information under consideration. In the event that a field value is a probable synonym of another field value, the synonym can replace the original value and/or be used to increase the probability of a match between the two field values. This may be accomplished by, for example, maintaining one or more files or tables having the variations of a common piece of information. When one of these variations is encountered, one or more alternate variations may be substituted to determine if a stronger probability of a match exists using the alternate variation(s). Alternatively, if two field values occur a relatively large number of times in the same data field in relation to a particular entity, these field values may be considered to be probable synonyms. The link process may be repeated for one or more of the variations to identify a link, if any, between the entity references. Other techniques may be used in accordance with the present invention.

Familial relationships also may provide the context by which to judge the strength of a link between two entity references. To illustrate: spouses may use each other's SSN; children may use their parent's SSN or address; sons may be named after a father or grandfather; etc. These familial relationships often affect the nature and frequency of matching or linking entity references using family-related information. Example of context may include, but are not limited to, race, ethnicity, geographic location, geographic proximity, social proximity, familial relationships, gender, nation of origin, age, education, employment, and religion.

Although a number of factors pertaining to the evaluation of potential links between entity references that represent people have been described, those skilled in the art may utilize additional or different contextual factors without departing from the spirit or the scope of the present invention. Likewise, using the guidelines provided herein, those skilled in the art may implement contextual factors pertaining to entity references that relate to entities other than people.

Figure 6:
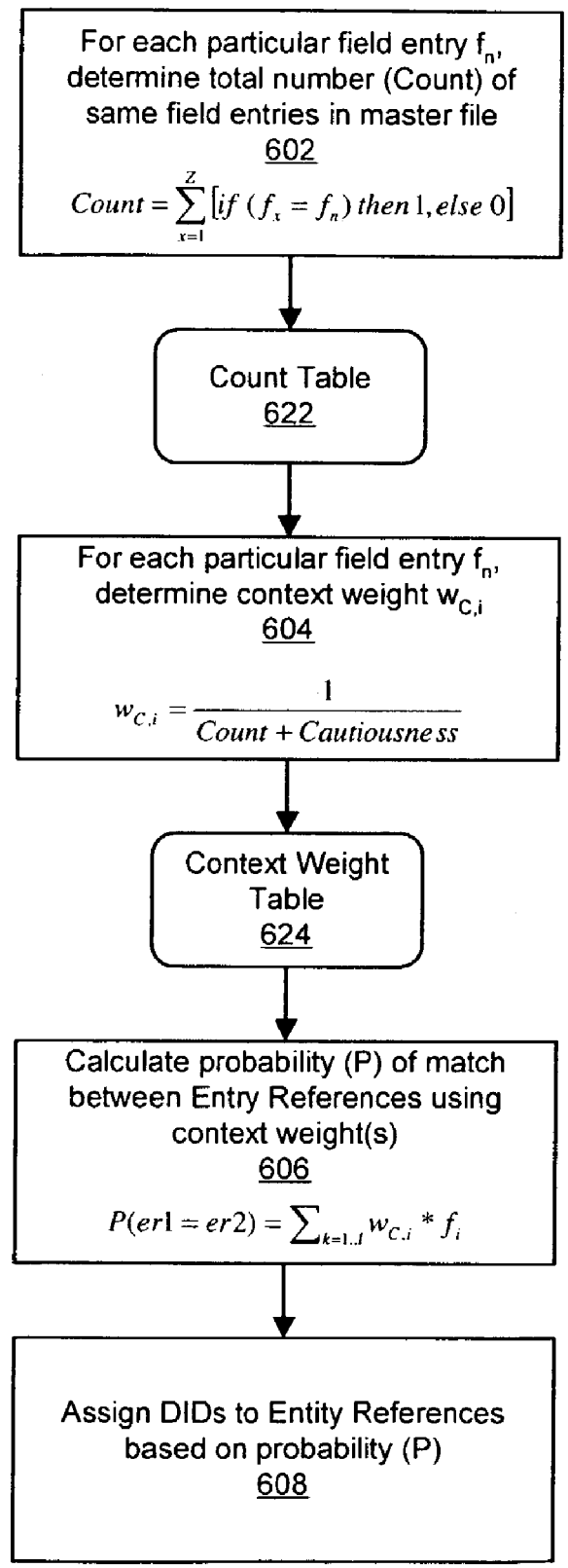
FIG. 6 is a flow chart illustrating an exemplary method for linking entity references to Definitive Identifiers (DIDs) based in part on a content weighting of the data fields of the entity references in accordance with at least one embodiment of the present invention.

Referring now to FIG. 6, an exemplary implementation of step 410 of link phase 204 (FIG. 4) is illustrated in accordance with at least one embodiment of the present invention. In the above discussion, the entity references often are discussed in the context of two data fields (i.e., two axes) of interest for matching purposes. In such cases, the decision as to whether or not the entity references refer to the same entity often may be trivial. In many implementations, however, there may be tens or hundreds of data fields to compare and a number of them will have missing and/or incorrect data. The decision as to whether or not two entity references should be associated with the same entity is thus complex even once after a variance metric for each data field (axis) has been defined.

As discussed above with reference to EQ. 2, the confidence level, or probability, of a link between two entity references to a same entity may be determined by utilizing content weighting, whereby the probability of a match of a certain data field of the entity references is adjusted based in part on the frequency of occurrence of the value(s) in the data field. In one manner, the weights $w_{C,i}$ are computed based on an assumption that the master file is of a size such that the master file approximates the universe of entities and entity references. That is, it is assumed, in this case, that the iteration n of the step 410 has produced a result that is good enough to define authoritative weights for iteration n+1. The computation of the weights $w_{C,i}$ typically will get closer and closer to a perfect solution as time progresses, particularly if the error is conservative. Steps 602-608 illustrate an exemplary implementation of this concept during step 410 of process 200.

At step 602, a count of occurrences of each data field value is determined for each of the data fields of interest of the entity references of the master file. As used herein, the term field value generally refers to means and manners used to represent information and is certainly not limited to numerical "values" but, for instance, may include other types of data "values" comprising one or more character types or combination of character types. Table 2 represents an exemplary "mini" master file (i.e., the universe of people) with entity references having a first name (Fname) data field and a last name (Lname) data field:

TABLE 2

| Row Number | DID | Fname | Lname |
| --- | --- | --- | --- |
| 1 | 1 | Mary | James |
| 2 | 1 | Mari | James |
| 3 | 1 | Mary | Jameson |
| 4 | 2 | Maryanne | Jomesonville |
| 5 | 3 | Mary | Jones |
| 6 | 3 | Mari | Jones |
| 7 | 4 | Bob | Jones |
| 8 | 5 | Fred | Jones |
| 9 | 5 | Francis | Jones |

At step 602, the total number of occurrences of each unique first name in Table 2 would be tallied, as would the total number of occurrences of each unique last name to generate a count table 622 for each data field of interest. In one embodiment, those names in the master file that are recognized to be nicknames or abbreviated versions of full names may be used to increase the count of the total number of occurrences of the unique full name. For example, "Jack" is generally recognized as a nickname for "John." In this manner, the count representing the total number of occurrences of the first name "John" may be increased for each occurrence of the name "Jack." Table 3 illustrates the count table 622 for the unique data field entries for the Fname data field. Table 4 illustrates the count table 622 for the unique data field entries for the Lname data field.

TABLE 3

| Row Number | Fname | Count |
|---|---|---|
| 1 | Mari | 2 |
| 2 | Mary | 3 |
| 3 | Maryanne | 1 |
| 4 | Bob | 1 |
| 5 | Fred | 1 |
| 6 | Francis | 1 |

TABLE 4

| Row Number | Lname | Count |
|---|---|---|
| 1 | James | 2 |
| 2 | Jameson | 1 |
| 3 | Jomesonville | 1 |
| 4 | Jones | 5 |

As Table 3 demonstrates, the first name "Mari" occurs in two entity references, "Mary" occurs in three entity references, and the first names "Maryanne," "Bob," "Fred" and "Francis" each only occur once. This implies that a match between two entity references having a Fname data field value of "Mary," in this example, would be less statistically significant than a match between two entity references having a Fname data field value of "Francis" since "Mary" is more prevalent than "Francis" in the master file. Likewise, Table 4 indicates that "Jones" is much more common than "James," "Jameson" or "Jomesonville" so a match with "Jones" is less statistically significant than a match with James. Accordingly, in at least one embodiment, the weight $w_{C,i}$ given to a particular data field value match is inversely related to the total frequency of occurrences of the data field value in the master file, or:

$$w_{c,i} = \frac{1}{\text{Count}(f_i)} \quad \text{EQ. 3}$$

It will be appreciated, however, that that as the number of entity references in the master file increases, the more closely the master file may approach and represent the universe of entities and the more accurately the count of data field value occurrences may represent the true frequency of occurrences. It follows that the fewer the number of entity references in the master file, the less likely that the count of data field value occurrences represents the true frequency of occurrence.

Accordingly, in at least one embodiment, a cautiousness value may be utilized to adjust the calculation of the weight $w_{C,i}$ given to a particular data field value match by the relative size of the master file. In this instance, the weight $w_{C,i}$ given to a particular data field value match is inversely related or inversely related to the sum of the total number of occurrences and the cautiousness value, or:

$$w_{c,i} = \frac{1}{\text{Count}(f_i) + \text{Cautiousness}} \quad \text{EQ. 4}$$

where "Cautiousness" in EQ. 4 represents the specified cautiousness value greater than or equal to zero. In one embodiment, the cautiousness value is adjusted by a factor that is approximately inversely related to the size, or number of entity references, of the master file to reflect the degree to which the master file accurately reflects the universe at any given iteration. Because the first iteration of the generation of the master file often will involve a relatively small data set, the cautiousness level may be set at a relatively high value to prevent a disproportionate weight for a given data field value match resulting from a small data set.

At step 604, EQ. 4 and the count table 622 may be utilized to calculate the content weight $w_{C,i}$ for each unique data field value to generate a content weight table 624 of the unique data field entries and their corresponding content weight. Table 5 illustrates the application of step 604 to Table 3 using a cautiousness value of two. Table 6 illustrates the application of step 604 to Table 4 using the same cautiousness value.

TABLE 5

| Row Number | Fname | Count | Weight |
|---|---|---|---|
| 1 | Mari | 2 | 0.25 |
| 2 | Mary | 3 | 0.20 |
| 3 | Maryanne | 1 | 0.33 |
| 4 | Bob | 1 | 0.33 |
| 5 | Fred | 1 | 0.33 |
| 6 | Francis | 1 | 0.33 |

TABLE 6

| Row Number | Lname | Count | Weight |
|---|---|---|---|
| 1 | James | 2 | 0.25 |
| 2 | Jameson | 1 | 0.33 |
| 3 | Jomesonville | 1 | 0.33 |
| 4 | Jones | 5 | 0.143 |

As Table 5 demonstrates, "Mary" is given a content weight of 0.20 while "Francis" is given a content weight of 0.33, indicating that, in this example, two entity references having the Fname data field value "Mary" is less statistically significant than two entity references having the Fname data field value "Francis." Table 6 demonstrates that "Jones" is given a content weight of 0.143 whereas "Jameson" and "Jomesonville" are given a higher content weight of 0.33.

At step 606, the probability (P) of a match between two entity references may be calculated based in part on EQ. 2 and the content weight tables 324 for each of the data fields of interest. Recall that, in one embodiment, the probability f of a match between two data field values is assigned a value of one if the field values are exact matches and a value of zero if they are not exact matches. In this manner, using Tables 5 and 6, a match between two entity references having "Mary Jones" will have a probability value of 0.343 ($w_{C,Fname}$("MarY")*f("Mary")+$w_{C,Lname}$("Jones")*f("Jones")=0.20*1+0.143*1), a match between two entity references having "Fred Jones" will have a probability value of 0.473 (0.33*1+0.143*1) and a match between two entity references having "Mary Jameson" will have a probability value of 0.53 (0.20*1+0.33*1). In another embodiment, the probability f of a match between two data field values is related to the degree of similarity between the data field values. To illustrate, the probability f of a match between "James" and "Jameson" may be assigned a higher value than the probability f of a match between "James" and "Jomesonville" as "James" and "Jameson" have a higher degree of similarity than the degree of similarity between "James" and "Jomesonville." Any of a variety of evaluation process may be used to determine the degree of similarity between two field values. In many instances, the evaluation process utilized may be dependent on the type and context of the data field, as discussed above with reference to FIG. 6. For example, Jaro, methaphone, double metaphone, Soundex or New York State Identification Intelligence System (NYSIIS) techniques may be used.

At step 608, the probability f of a given match and its associated content weight $w_{C,i}$ may be used to determine a link between the entity references to a same entity. In at least one embodiment, the confidence level P of a link between the entity references may be related to a sum of the probabilities f of the selected data fields adjusted by the corresponding content weight $w_{C,i}$. The resulting confidence level P then may be applied to one or more confidence thresholds to determine whether a linking of the entity references into a same DID is appropriate. Table 7 illustrates a table having exemplary confidence thresholds.

TABLE 7

| Row Number | Threshold | Relationship |
|---|---|---|
| 1 | P > 0.75 | Strong |
| 2 | 0.5 < P <= 0.75 | Medium |
| 3 | 0.25 < P <= 0.5 | Weak |
| 4 | 0 <= P <= 0.25 | None |

Using Table 7 as an example, those entity references having a probability match of less or equal to 0.25 may be considered non-matches, those with a probability match of greater than 0.75 may be considered strong matches, and so forth. Accordingly, those probability matches having a relationship strength of, for example, at least "Medium" may be assigned or associated with the same DID. In one manner, when two entity references having been previously assigned separate DIDS are found to match, the entity reference having the higher DID, for example, assumes the DID of the other entity reference. Additionally, an indicator of the probability match strength can be appended to each of the entity references being considered. In at least one embodiment, steps 606-608 may be repeated for some or all entity reference pairs in the master file.

Steps 602-608 demonstrate that, in at least one embodiment, the statistical significance of a match between data fields of two entity references can be accurately determined without resorting to cumbersome and oftentimes inaccurate variance algorithms that measure the variance between specific field value values to determine a match. The accuracy of the above-discussed probability matching process can be made more accurate, as set forth below.

There is a limitation in the match process described above. In certain instances, every record is compared to every other record to see if they match enough to merge their DIDs. On large data sets, this could result in an extensive number of comparisons. For instance, a data set having 40+ billion records would require approximately 1.6 trillion comparisons. This number of comparisons would severely tax even the most powerful of supercomputers.

It will be appreciated that, in many instances, only a portion of the data fields of the entity references are significant for matching purposes. For example, for information pertaining to people, the following data fields have been found to be significant: SSN; first/middle/last name; street address, street name and state; vendor supplied IDs (i.e., IDs supplied by the data source). Similar significant data fields are often found in other types of databases.

Figure 7:
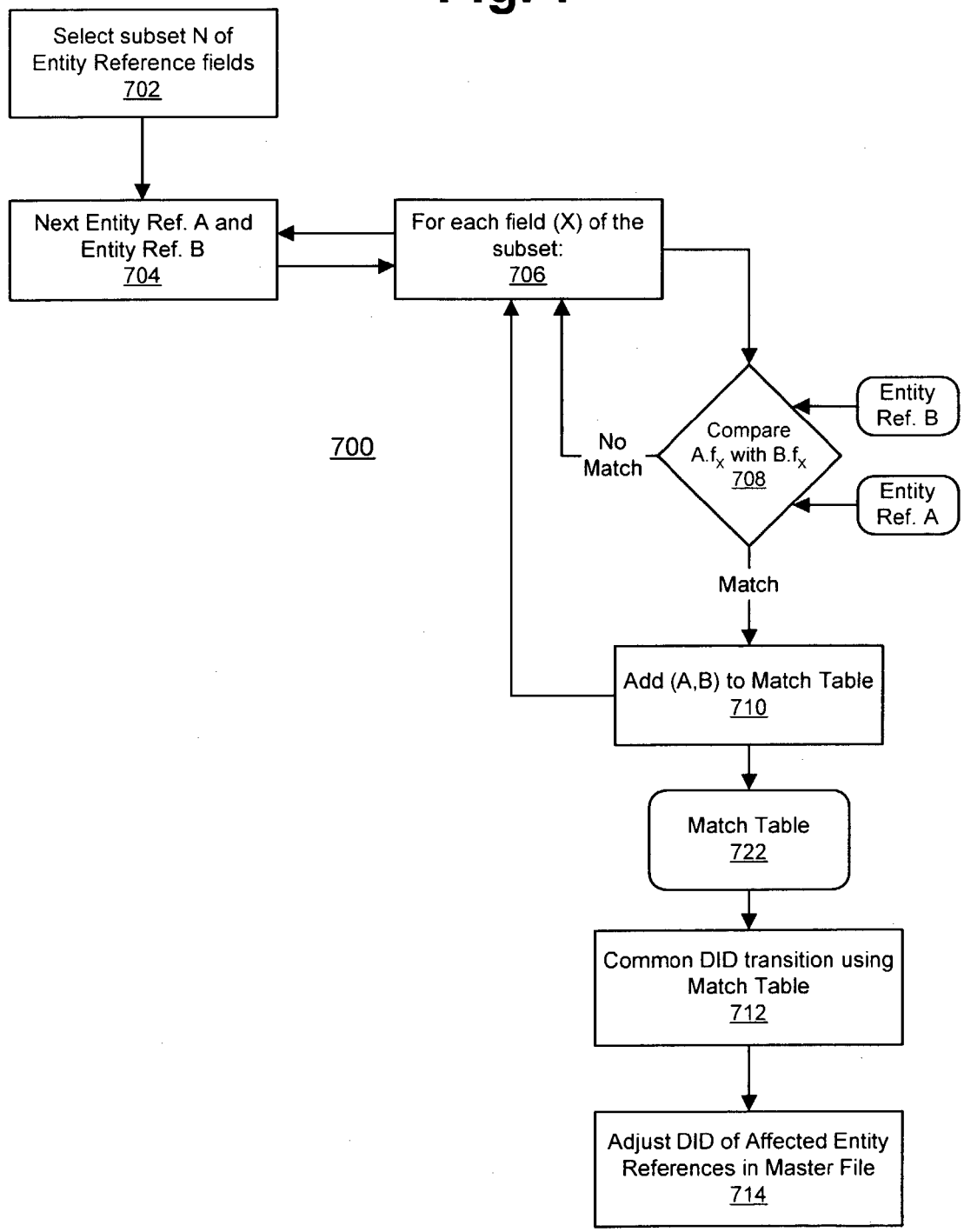
FIG. 7 is a flow chart illustrating an exemplary method for matching entity references in accordance with at least one embodiment of the present invention.

Referring now to FIG. 7, a method 700 for linking entity references by comparing subsets of the available data fields is illustrated in accordance with at least one embodiment of the present invention. Rather than comparing all data fields of the entity references, the exemplary method 700 involves selecting a subset of fields for comparison. These data fields of interest are then used to determine the probability match value by finding those data fields that are equivalent or otherwise match. If the selected data fields are required to be identical to match, there is no allowance for fuzziness in those data fields by definition. In at least one embodiment of the present invention, this problem may be solved by performing multiple match passes, each pass holding different data fields fixed for matching purposes. From each match pass a resultant tuple may be output, the tuple comprising the two DIDs for records considered to be equivalent and a flag indicating which selected data field resulting in the match. Optionally, a weight may be included so that matches that are marginal may be combined to either increase or decrease the match weight.

Method 700 initiates at step 702 whereby a subset of the data fields available are selected for use in identifying those entity references which have a strong probability of referencing a common or same entity. It will be appreciated that the appropriate data fields generally are dependent on the subject matter of the database. As described above, name, SSN, and age ranges often are appropriate data fields for use in linking entity references relating to US citizens. In motor vehicle databases, for example, the vehicle identification number and color may be appropriate data fields for grouping entity references relating to motor vehicles or their owners.

At step 704, an entity reference pair (entity reference A and entity reference B) are selected from the master file. A data field from the subset of data fields included in the entity references is selected (step 706) and the information or value in the selected data field of entity reference A is compared (step 708) to the information or value in the selected data field of entity reference B. If the information from both the entity references A and B matches, then a record indicating the match and the selected data field are added (step 710) to a match table 722. Otherwise, steps 708-710 may be repeated for the next data field of the subset of data fields. Steps 706-710 may be repeated for each of the subset of data fields for the entity reference pair.

After each of the subset of data fields of the entity reference pair is compared for a match and a record added to the match table 722 when a match occurs, a new entity reference pair may be selected from the master file and steps 706-710 may be repeated for the new entity reference pair. Steps 704-710 may be repeated for at least a significant portion of the possible pairings of entity references from the master file. For example, if there are N entity references and each possible pairing is to be evaluated, 0.5*n*(N−1) pairings may be evaluated.

To illustrate steps 702-710 (steps 712 and 714 are discussed separately below) consider the following example illustrated using Tables 8 and 9. Table 8 illustrates an exemplary master file prior to any linking of entity references, where only the selected subset of data fields is represented in Table 8. In this example, the data fields include the first name (Fname) data field, the middle name (Mname) data field, the last name (Lname) data field, the SSN data field and the date-of-birth (DOB) data field.

TABLE 8

| Row No. | DID | RID | Fname | Mname | Lname | SSN | DOB |
|---|---|---|---|---|---|---|---|
| 1 | 1 | 1 | Mary | Anne | Vandriver | | 19660302 |
| 2 | 2 | 2 | MaryAnne | Anne | Driver | 654567876 | 19660302 |
| 3 | 3 | 3 | MaryAnne | Van | Driver | 654576876 | |
| 4 | 4 | 4 | Mary | Ann | VanDriver | 654567876 | 196603 |

In this example, it is assumed that all of the entity references in Table 8 are close enough to match provided that any one of their desired data fields are exact matches of the same data field of another entity reference. In this example, three passes (steps 704-710) are performed: one pass for matching first/middle/last names, another pass for matching SSNs, and the last pass for matching the DOBs. The three passes, when combined into one table, yields Table 9 (an example of match table 722). It will be appreciated that these three passes may generate "duplicate" records which typically are records having the same information but in a different order. For example, a record could be generated for the DID 1:DID 4 pairing and a record could be generated for the DID 4:DID 1 pairing. It will be appreciated that these two records refer to the same pairings and, in many instances, it is advantageous to remove one of the records as it is a duplicate record. In one manner, only those entity reference match pairings where the left DID is greater than the right DID are stored in Table 9, thereby removing duplicate records.

TABLE 9

| Row Number | Left DID | Right DID | Match Type |
|---|---|---|---|
| 1 | 4 | 1 | first/middle/last name |
| 2 | 4 | 2 | SSN |
| 3 | 2 | 1 | DOB |
| 4 | 3 | 2 | first/last name |

Figure 8:
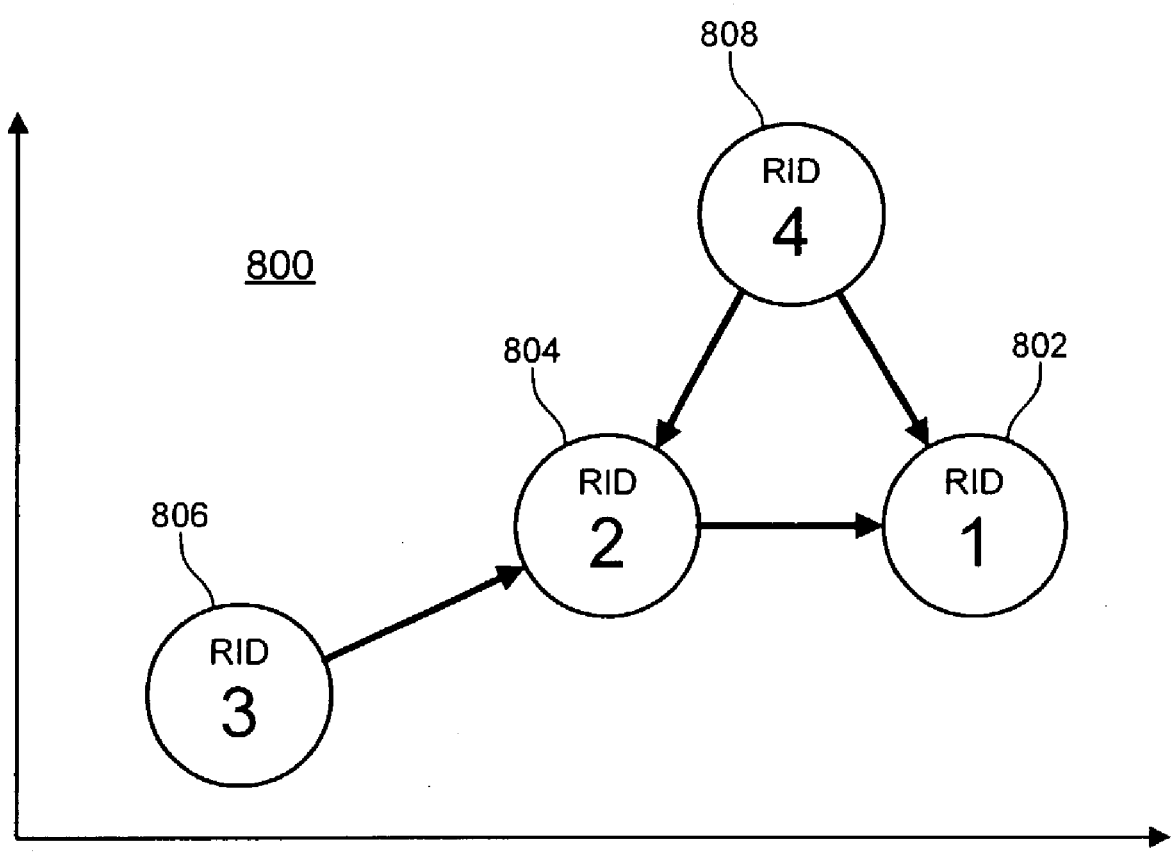
FIG. 8 is a graph illustrating an exemplary linkage among a plurality of entity references in accordance with at least one embodiment of the present invention.

Table 9 may be graphically represented as exemplary graph 800 of FIG. 8. Entity references 802-808 represent the entity references of Table 8 having RIDs 1-4, respectively. The arrows between the entity references 802-808 represent the matches determined by performing steps 704-710 in comparing first/middle/last name, SSN, and/or DOB data fields, the matches represented as the records in Table 9. For example, the first record of Table 9 indicates that the entity reference 808 (having DID 4 and RID 4) matches the entity reference 802 (having DID 1 and RID 1) by first/middle/last name and matches the entity reference 804 (having DID 2 and RID 2) by SSN. Accordingly, graph 800 illustrates the corresponding arrow from entity reference 808 to entity reference 802 and from entity reference 808 to entity reference 804.

As noted above with reference to step 412 of the link phase 204 (FIG. 4), it may be assumed to a reasonable degree of certainty that, depending on the data of the master file and the interrelationships among entity references, the matches between entity references are transitive (i.e., if entity reference A and entity reference B refer to the same entity and entity reference B and entity reference C refer to the same entity then entity reference A and entity reference C refer to the same entity).

At step 712 of method 700, the match table 722 may be used to link entity references with common entities based on transitive matches determined from the match table 722 (generated from steps 704-710). To illustrate, assuming that a match between data fields indicates that two entity references refer to the same entity, the graph 800 graphically demonstrates that entity reference 808 refers to the same entity (DID 1) as entity reference 802 (and entity reference 804). Graph 800 also demonstrates that entity reference 806 refers to the same entity (DID 2) as entity reference 804. However, graph 800 further demonstrates that entity reference 804 refers to the same entity (DID 1) as entity reference 802. Accordingly, using this transitive property at step 712, it may be determined that entity references 802-808 all refer to the same entity (having DID 1) because entity reference 806 and entity reference 804 refer to a same entity, entity reference 804 and entity reference 802 refer to a same entity, and entity reference 808 and entity reference 802 refer to a same entity.

Tables 10-11 illustrate this transition technique using Tables 8 and 9. For each transition pass of Table 9, the question applied is whether the DID for a given entity reference of Table 8 should stay at its current DID or change to another DID. In one manner, an attempt is made to convert each DID to the lowest DID available through the transitive technique (as shown by step 714). Accordingly, at each pass of a generated match table, the match table 722 may be deduped by keeping the lowest right DID. Table 10 illustrates a first transition pass.

TABLE 10

| Row No. | DID | RID | Fname | Mname | Lname | SSN | DOB |
|---|---|---|---|---|---|---|---|
| 1 | 1 | 1 | Mary | Anne | Vandriver | | 19660302 |
| 2 | 1 | 2 | MaryAnne | Anne | Driver | 654567876 | 19660302 |
| 3 | 2 | 3 | MaryAnne | Van | Driver | 654576876 | |
| 4 | 1 | 4 | Mary | Ann | VanDriver | 654567876 | 196603 |

TABLE 11

| Row No. | DID | RID | Fname | Mname | Lname | SSN | DOB |
|---|---|---|---|---|---|---|---|
| 1 | 1 | 1 | Mary | Anne | Vandriver | | 19660302 |
| 2 | 1 | 2 | MaryAnne | Anne | Driver | 654567876 | 19660302 |
| 3 | 1 | 3 | MaryAnne | Van | Driver | 654576876 | |
| 4 | 1 | 4 | Mary | Ann | VanDriver | 654567876 | 196603 |

This is close to the ideal grouping and on the next transitive iteration the DID for RID 3 will become DID 1 as illustrated in Table 11. As Table 11 illustrates, the DID of each entity reference was brought to the lowest DID number possible under the available transition links available.

Figure 9A:
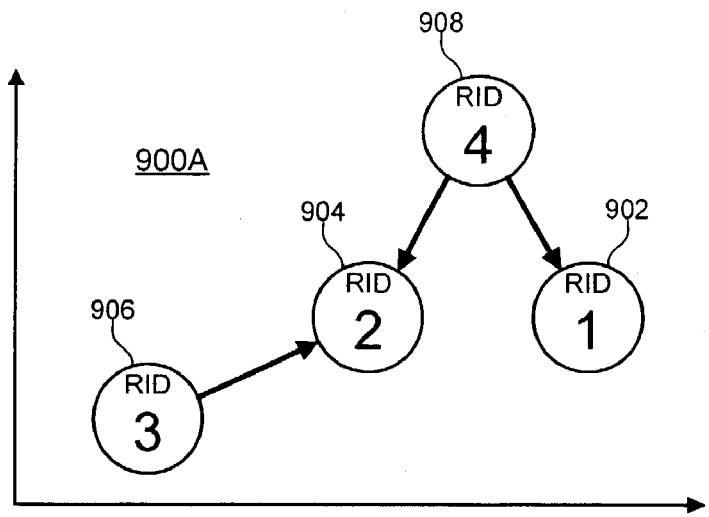
FIGS. 9A-9C are graphs illustrating an exemplary transitive closure between entity references in accordance with at least one embodiment of the present invention.

While the above-described transition technique, when run iteratively, may link entity references to entities (DIDs) to a significant extent, in many instances the transition technique described above may not link the entities to the greatest extent possible under the circumstances. To illustrate, graph 900A of FIG. 9A illustrates an instance where the above-described transition technique fails to completely identify the entity common to all of the entity references 902-908. The graph 900A illustrates a graphical representation of a match table 722 (FIG. 7) having the matching relationships among the entity references 902-908 as shown, whereby entity reference 906 refers to the same entity as entity reference 904 and entity reference 908 refers to the entity referenced by entity reference 904 as well as the entity referenced by entity reference 902. By evaluating the graph 900A, the conclusion typically would be that entity references 902-908 all refer to the same entity. However, it will be appreciated that a considerable number of links, or iterations, would be traversed before a link between entity reference 906 and entity reference 902 typically would be established. Accordingly, in one embodiment of the present invention, a transitive closure technique may be applied to determine the optimal grouping of entities to common entities in instances where the above-referenced transition technique would require an extensive number of iterations.

Figure 10:
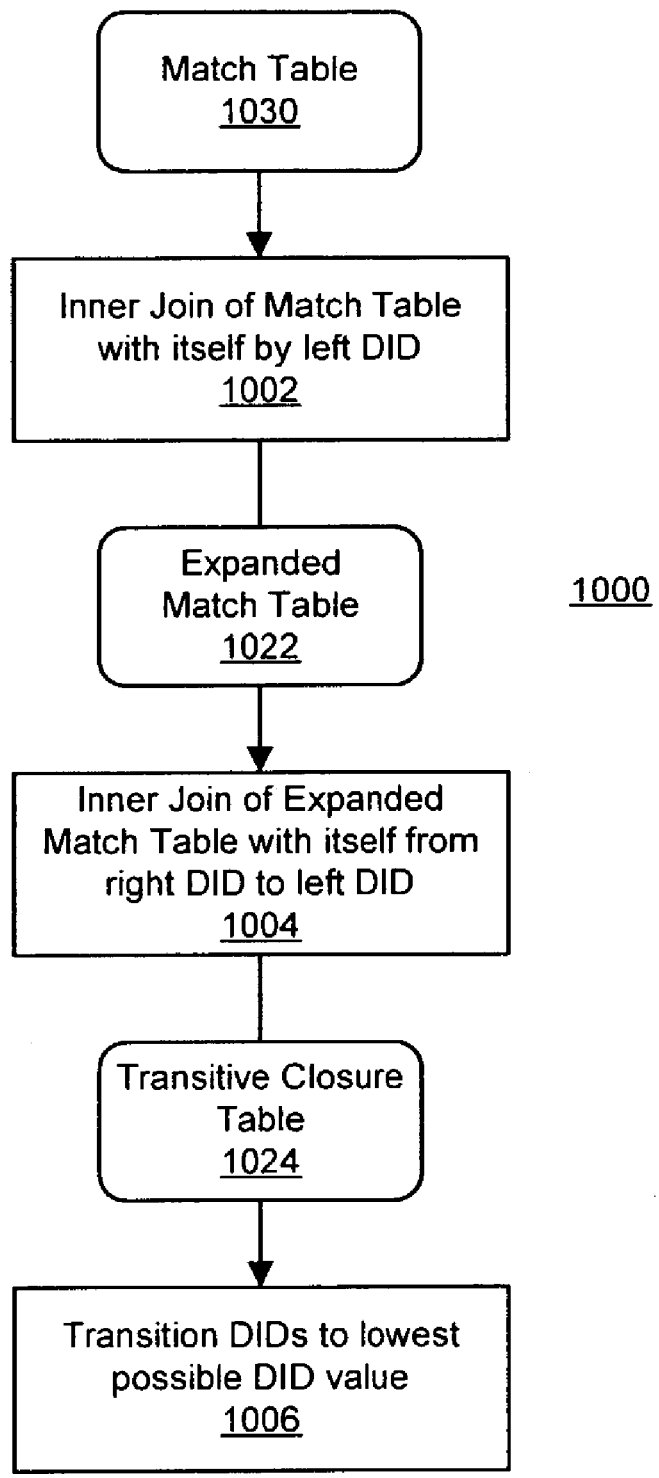
FIG. 10 is a flow chart illustrating an exemplary method for applying a transitive closure technique to link entity references in accordance with at least one embodiment of the present invention.

Referring now to FIG. 10, an exemplary method 1000 for performing a transitive closure technique is illustrated in accordance with at least one embodiment of the present invention. Like the transitive technique discussed above, the transitive closure technique described by method 1000 may be implemented at step 412 (FIG. 4) of the link phase to identify indirect links between entity references.

The exemplary method 1000 initiates at step 1002 wherein an inner join (or other join technique providing the same result) of the match table 1030 (analogous to the match table 722, FIG. 7) to itself by left DID may be performed using the two right DID values as new left DID/right DID pairs in the resulting expanded match table 1022. In one manner, only those pairs of results wherein the left DID is greater than the right DID is retained in the expanded match table 1022 to prevent duplicate records.

To illustrate, consider the application of step 1002 to Table 12, where Table 12 is an exemplary representation of the graph 900A of FIG. 9, which is in turn an exemplary representation of the match table 1030. The resulting expanded match table 1022 is represented as Table 13.

TABLE 12

| Row Number | Left DID | Right DID | Match Rule |
|---|---|---|---|
| 1 | 3 | 2 | A |
| 2 | 4 | 2 | B |
| 3 | 4 | 1 | C |

TABLE 13

| Row Number | Left DID | Right DID | Match Rule |
|---|---|---|---|
| 1 | 3 | 2 | A |
| 2 | 4 | 2 | B |
| 3 | 4 | 1 | C |
| 4 | 2 | 1 | T (= Transitive Closure) |

Figure 9B:
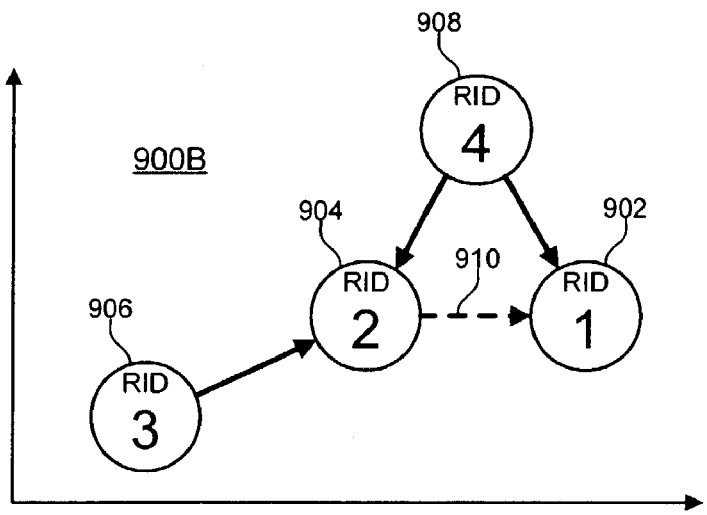

Chart 900B of FIG. 9B graphically represents the linkage described in Table 13. As illustrated, the application of the inner join (or similar join technique) in step 1002 results in an intuited link (link 910 of FIG. 9B) between the entity reference 904 (DID 2) and entity reference 902 (DID 1). Row 4 of Table 13 depicts this intuited link. Accordingly, step 902 is referred to herein as a "cross" step as it enables the formation of cross-links in a directed graph.

The exemplary method 1000 of FIG. 10 continues at step 1004 wherein an inner join (or similar join technique) from the right DID data field to the left DID data field of the expanded match table 1022 is performed to generate a transitive closure table 1024. Again, in one manner, only those resulting records of the transitive closure table 1024 where the new left DID is greater than the new right DID are kept to prevent duplicate records. Table 14 represents an exemplary transitive closure table 1024 resulting from the application of step 1004 to Table 13.

TABLE 14

| Row Number | Left DID | Right DID | Rule |
|---|---|---|---|
| 1 | 3 | 2 | A |
| 2 | 4 | 2 | B |
| 3 | 4 | 1 | C |
| 4 | 2 | 1 | T |
| 5 | 3 | 1 | T |

Figure 9C:
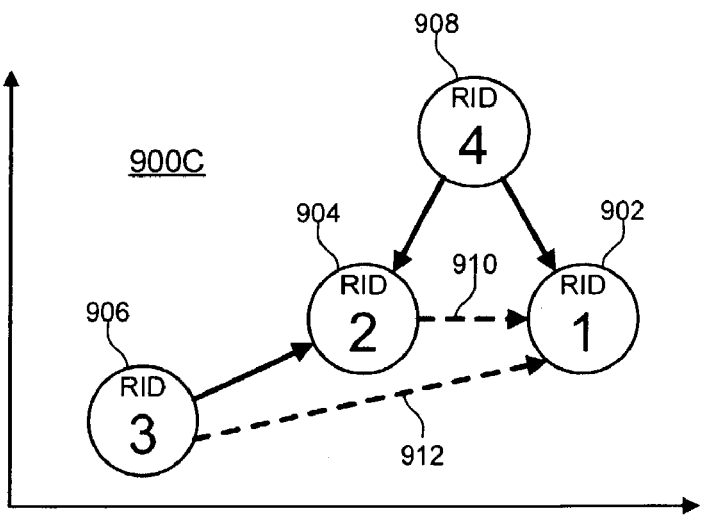

Chart 900C of FIG. 9C graphically represents the linkage described in Table 14. As illustrated, the application of the inner join (or similar technique) in step 904 results in an intuited link (link 912 of FIG. 9C) between the entity reference 906 (DID 3) and entity reference 902 (DID 1). Row 5 of Table 14 depicts this intuited link. Accordingly, step 1004 is referred to herein as a "step" as it enables the determination of those target DIDs that are also the source DID of another link and the creation of a new record that performs the two moves of the above-described transition technique in only one move.

At step 1006, the transition technique, discussed above, may be used to adjust the DIDs associated with each entity reference of the transitive closure table 1024 to the lowest DID possible through the available links between DIDs. To illustrate using chart 900C of FIG. 9C, each of entity references 902-908 could be, in this case, associated with DID 1 since there is a direct link or series of links between each entity reference 904-908 and the entity reference 902. Note that the cross and the step are independent and both may be applied iteratively. In a large data set, however, a significant number of links may be added at each step so it may be advantageous to limit the number of iterations.

Discussed above are techniques for preparing and linking entity references. Also described above is a method for filling in absent information for entity references to ensure that such entity references contain most or all of the information available for each such particular entity reference. Discussed below are a variety of techniques for constructing entity references to match entity references that do not exist at the time of construction but would be expected to exist at some point (step 408, FIG. 4). These constructed entity references are herein referred to as ghost entity references and the techniques for constructing ghost entity references are collectively referred to herein as ghosting.

To illustrate, take the example of a recently married woman having a maiden surname of Billington and a married surname of Hobbson. Further assume that this woman commonly uses two first names: "Helen" and "Clare." Also assume that the master file includes three entity references associated with this woman: 1) Helen Billington; 2) Helen Hobbson; and 3) Claire Billington. There is, however, a fourth entity reference ("Claire Hobbson") that is absent from the master file but may be conceivable under the circumstances. The "Claire Hobbson" entity reference is, therefore, a ghost entity reference as it does not exist in the master file at a particular time but may exist if the master file contained each possible fname/lname entity reference related to this woman. The techniques described below provide for the generation and implementation of such ghost entity references for use in entity reference linkage and entity linkage, as well as other processes as appropriate.

In the event that one or more entity references are not linked to any DID, but have some association with one or more DIDs, a ghost DID may be created and linked to the entity reference(s). Further, an association may be made between the ghost DID and the one or more DIDs. The use of a ghost DID may be necessary as a placeholder until additional information is obtained. In another embodiment, a ghost DID may be used when inconsistent or contradictory data within the entity references does not establish a linkage, but where the association may assist a user. In a further embodiment, a ghost DID may be used when there is uncertainty as to whether an entity actually exists. For example, in a criminal investigation context, one or more entity references with an association to a DID, but not a link, may be of interest to a detective for developing new leads or for indicating that another unknown entity may be involved. Other uses for ghost DIDs are also envisioned.

According to another embodiment of the present invention, associations may be made through neighbors, classmates, customers, employees, or any other relationship that may be definable and relevant. By way of example, it may be desirable to view the neighbors or former neighbors of a person identified by a certain DID, for example DID 1. Data fields related to state, zip code, address, street name, street number and apartment number for the records associated with DID 1 may be compared to similar data fields in one or more other entity references to determine if a neighbor association exists, e.g., the data within the identified entity references indicate an address within a predetermined distance from the target address (e.g., one half mile, on the same street, immediately adjacent, etc.). By way of example, a neighbor association may be made for all addresses within six houses addresses of the target address. After analyzing and comparing relevant entity references, those entity references that meet the neighbor association criteria may be identified and associated with DID 1.

Further, the DIDs linked to or associated with the identified neighbor entity references may also be associated with DID 1. By way of example, in order to determine security clearance for a job applicant in a sensitive government job, it may be necessary to identify and interview neighbors of the job applicant from, for example, the past ten years. After entering an appropriate query for the job applicant, one or more places of residence for the job applicant may be identified from entity references in the master file. Based on the places of residence, and the address of the residences, neighboring addresses may be identified from the master file and the DIDs associated with the addresses are identified. These DIDs may include DIDs identifying people currently living in the neighboring addresses, as well as DIDs identifying people who have lived at the neighboring addresses within a certain time period, e.g., the last ten years. Thus, the results of the query may include an identification of the current people living at the identified addresses and relevant information about those people. Further, the results of the query may include an identification of the people who previously lived at identified addresses during the time the job applicant was a neighbor, the current address of those people, as well as other relevant information about those people, such as additional contact information. Where applicable (e.g., where the job applicant has lived at an address for less than ten years), the results of the query may include an identification of persons who lived at certain identified addresses during the time when the job applicant lived at a neighboring address, i.e., the job applicant's previous address(es), as well as the current address of such persons and other relevant information.

By way of one example, a user of a system employing the present invention, e.g. a states motor vehicle department, may desire to match all entity references in the user database to a person or persons. In such an example, the entity references of the motor vehicle database (one example of a master file) may be compared, where the entity references typically can include driver's license information, motor vehicle registrations, property ownership records, tax records, and the like. Comparison between entity reference pairs, or matches, may be assigned a confidence level, and based on certain thresholds, the entity references may be linked to each other and to an appropriate DID. By way of one example, every person in the state may have a separate DID and/or user defined identifier. The user system then may try to link each record with one or more DIDs as appropriate (e.g., primary driver, owner, etc.). However, in certain circumstances, some entity reference comparisons may not meet the necessary confidence level threshold to link the entity reference to one or more DIDs. In such instances, ghost DIDs may be assigned to the records and associations may be identified between the ghost DIDs and one or more DIDs. Ghost DIDs may be used as provisional DIDs or placeholder DIDs until more information has been obtained or until later action is taken. For example, where a ghost DID contains records that do not meet the necessary confidence thresholds (e.g., greater than 90%) to be linked to a first DID, but do indicate likelihood of association (e.g., a confidence level between 70% and 90%) with that first DID, an association may be made between the ghost DID and the first DID.

By way of another exemplary embodiment of the present invention, it may be desirable to provide a list of associates, neighbors, and relatives, as well as potential associates, neighbors, and relatives for a particular person, the subject person. The results of a query may thus list those people, as identified through the system, who are relatives of the subject person based on a predetermined confidence threshold level comparison. A multiplicity of predetermined or dynamic thresholds may be used and may be based on one or more data fields type or other factors. Further, where a predetermined threshold level has not been met, but where there is some confidence that there is an association between the entity references and/or DID and the subject person (such as based on the entity references linked to the subject person's DID such an association may be identified. In addition, there may be entity references that indicate that some other person may be associated with the subject person, but that other person may be unknown. Also, the system may indicate that entity references should be associated with a person but at a reduced or lower confidence level (e.g., at a threshold lower than that required to link to a DID). Ghost DIDs may be used as placeholders for such records, until more information is obtained.

According to one embodiment of the present invention, linkages and associations may be reevaluated based on new information and/or new queries. For example, a weak association may be made between the entity references of a first DID and the entity references of a second DID. To illustrate, an entity reference representing a marriage certificate for a woman identified by a first DID and a man identified by a second DID may be added to the master file. This additional information, upon a reanalysis of the data in the master file, may result in a linkage being made between the entity references of the first DID and the entity references of the second DID.

In addition, a relatives association may be made between the first DID and second DID to indicate that the two people identified by the DIDs are relatives (i.e., married in this example). A relatives association between two DIDs may be used where the people identified by the DIDs are related (e.g., married, father, son, mother, daughter, sibling, etc.). By way of example, an immediate relatives association may be made between a DID for identifying a person and the DIDs for identifying that person's immediate family (e.g., spouse, children, siblings, parents) while an extended relation link may be made to DIDs for identifying that person's extended family (e.g., cousins, aunts, uncles, etc.).

In another example, a weak association may be made between the entity references of a first DID and the entity references of a second DID. An additional entity reference may be added with the system, where the additional entity reference indicates, for example, that the man identified by the first DID and the man identified by the second DID were roommates during college. This additional information, upon a reanalysis of the entity references in the master file, may result in a strong association being made between the entity references of the first DID and the entity references of the second DID. In addition, an associate link may be made between the first DID and second DID to indicate that the two people identified by the DIDs are (or were) associates (e.g., roommates, business partners, co-owners of property, etc.). Associate links may be identified by type and may provide various information about the association. By way of example, a time delineated associate link may be made between a DID for identifying a person and the DIDs for identifying that person's associates over the last five years, while a business associate link may be made to DIDs for identifying that person's business associates (e.g., business partners, fellow employees, employers, etc.).

Further information may also require, cause or suggest associate linkages to be reevaluated. For example, a strong association may be made between the entity references of a first DID and the entity references of a ghost DID. An additional entity reference may be added to the master file for processing by the system, where the additional entity reference is, for example, a birth certificate indicating that the man identified by the first DID, "Kevin Hall," had a son named "Kevin Hall, Jr." This additional information, upon a reanalysis of the master file, may result in the ghost DID being transformed into, or replaced by, a second DID being assigned to "Kevin Hall, Jr.," where the first DID and the second DID have a relation link. Further, entity references that were originally directly linked to the first DID may be directly linked to the second DID, and not, except as relative or associate, to the first DID, based on the new information.

Determinations of associates and relatives may be made in any of a number of manners. According to an embodiment of the present invention, an association link or a relative link may be specified by a user. By way of example, a user entering a query may include that two people are related. Alternatively, the instruction may be "coded" into a database, so that the relation is factored into all future queries. According to another embodiment of the present invention, specific data fields within a record may indicate an association. Based on the data within these fields, an associate link may be established. By way of example, data from fields in a marriage license record or a birth certificate record may be used to establish a relative linkage between two people, which then may result in additional "downstream" associate and/or relative linkages with other DIDs and/or entity references. Further, data from fields in a partnership agreement or an apartment lease may be used to establish an associate lineage between two people. Data in fields of other records may also be used to establish associate linkage, including, but not limited to, tax returns, mortgage documents, and government filings.

According to another embodiment of the present invention, associate linkages (including relation linkages) may be created based upon an analysis of data, where the analysis supports an inference of a relation linkage and/or an associate linkage within a predetermined confidence level. By way of example, the entity references for a first DID may indicate that a woman, age 36, has lived at three different addresses over a period of ten years. The entity references for a second DID may indicate that a boy, age 11, has the same last name as the woman of the first DID and has lived at the same three addresses during the same or essentially the same time periods as the woman of the first DID. Based on this information, a confidence level may be calculated regarding whether the boy is the son of the woman. According to this example, based on the commonality of last name and addresses over the last ten years and moving and staying at the same address at the same time, as well as the age gap and the age of the woman at the birth of the boy, the confidence level threshold for making a relative linkage may be reached. Additionally, a type of relative linkage (e.g., mother-son) also may be determined based on the confidence level and/or the entity references associated with the woman and boy. It will be appreciated, however, that different data and confidence levels may be desirable based on the intended use of the information.

The use of ghost DIDs and/or ghost entity references may enable potential associations to be identified between entity references and/or DIDs. A system and method of the present invention may link or associate one or more ghost DIDs to one or more particular DIDs or outlier records. These potential relationships may assist in establishing leads for further investigation, identifying missing information about a person or entity, and similar features. By way of example, ghost DIDs may be useful in a law enforcement setting, where criminals may use one or more aliases. In situations where a person deliberately attempts to create different aliases and/or identities, broad associations between entity references and/or DIDs may be searched. Broad associations may be made using low confidence threshold levels, thereby potentially including large numbers of entity references and data. According to one embodiment of the present invention, associations in the context of determining aliases for a criminal may include evaluating data which is unlikely to change for a person, such as sex, race, height, etc. A system of the present invention may cast a very large ring around records and attach to all "semi-matched" DIDs. Such a search may also include known associates of a criminal (e.g., former roommates, co-workers, etc.) and relatives (e.g., spouses, children, parents, siblings, etc.). Further, in cases of unknown criminals, such as terrorists, predators, and serial killers, profiles of the criminal and known facts or likely or deduced scenarios can be searched against data in records to identify potential suspects for further investigation. Other manners for determining associations may also be used. Such associations may be made based on the desired use of the DID (e.g., credit reporting, law enforcement, target marketing, etc.) and the user's interests.

Figure 11:
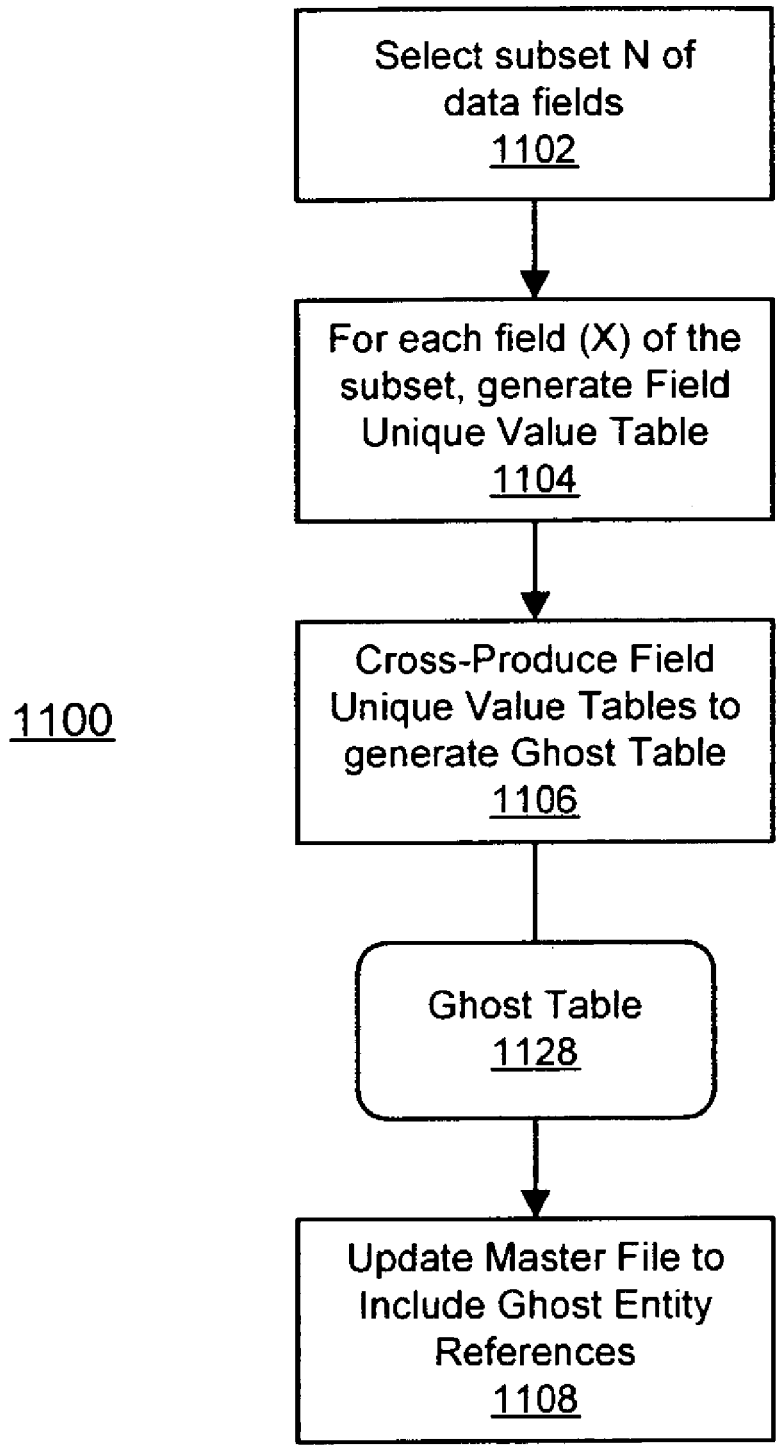
FIG. 11 is a flow chart illustrating an exemplary method for generating ghost entity references in accordance with at least one embodiment of the present invention.

Referring now to FIG. 11, an exemplary method 1100 for generating ghost entity references is illustrated in accordance with at least one embodiment of the present invention. The exemplary method 1100 initiates at step 1102 wherein a subset of the data fields are identified as data fields of the entity that would are expected to be consistent for a given entity. To illustrate, the first name, last name, address and SSN typically are consistent for a given person. Table 15 illustrates an exemplary table representative of a "mini" master file. In this example, each record of Table 15 includes a DID data field and additional data fields, including a first name data field, a last name data field, an address data field, and a SSN data field.

TABLE 15

| Row No. | DID | First Name | Last Name | Address | SSN |
|---|---|---|---|---|---|
| 1 | 1 | Helen | Billington | 4881 S Citation | |
| 2 | 1 | Clare | Hobbson | 4881 S Citation | |
| 3 | 2 | David | Hobbson | 4881 S Citation | 123456789 |
| 4 | 2 | David | Hobbson | 4889 S Citation | 123456789 |

At step 1104, a unique value table is generated for some or all data fields of the subset, where each unique value table includes a record for each unique DID-data field value pair from the master file. Tables 16-19 illustrate unique value tables generated from Table 15 by first name, last name, address and SSN, respectively.

TABLE 16

| Row Number | DID | First Name |
|---|---|---|
| 1 | 1 | Helen |
| 2 | 1 | Clare |
| 3 | 2 | David |

TABLE 17

| Row Number | DID | Last Name |
|---|---|---|
| 1 | 1 | Billington |
| 2 | 1 | Hobbson |
| 3 | 2 | Hobbson |

TABLE 18

| Row Number | DID | Address |
|---|---|---|
| 1 | 1 | 4881 S Citation |
| 2 | 2 | 4881 S Citation |
| 3 | 2 | 4889 S Citation |

TABLE 19

| Row Number | DID | SSN |
|---|---|---|
| 1 | 2 | 123456789 |
| 2 | 2 | 123546789 |

At step 1106, a ghost table 1128 may be generated from a cross-product of the unique value tables resulting from step 1104. To illustrate, Table 20 illustrates an exemplary ghost table resulting from the cross-product of Tables 16-19.

TABLE 20

| Row No. | DID | First | Last | Address | SSN |
|---|---|---|---|---|---|
| 1 | 1 | Helen | Hobbson | 4881 S Citation | |
| 2 | 1 | Helen | Billington | 4881 S Citation | |
| 3 | 1 | Clare | Billington | 4881 S Citation | |
| 4 | 1 | Clare | Hobbson | 4881 S Citation | |
| 5 | 2 | David | Hobbson | 4881 S Citation | 123456789 |
| 6 | 2 | David | Hobbson | 4881 S Citation | 123546789 |
| 7 | 2 | David | Hobbson | 4889 S Citation | 123456789 |
| 8 | 2 | David | Hobbson | 4889 S Citation | 123546789 |

Rows 1, 3, 6 and 7 of Table 20 illustrate the ghost entity references generated as a result of steps 1102-1106. At step 1108, the master file may be updated to include some or all of the ghost entity references of the ghost table 1128. After inclusion in the master file, the ghost entity references generated from an iteration of steps 1102-1108 may be utilized during the link step 410 (FIG. 4) to identify additional links between entity references and/or to strengthen previously-identified links. In at least one embodiment, ghost DIDs may be generated and one or more ghost entity references may be linked to the ghost DIDs during the link process.

Figure 12:
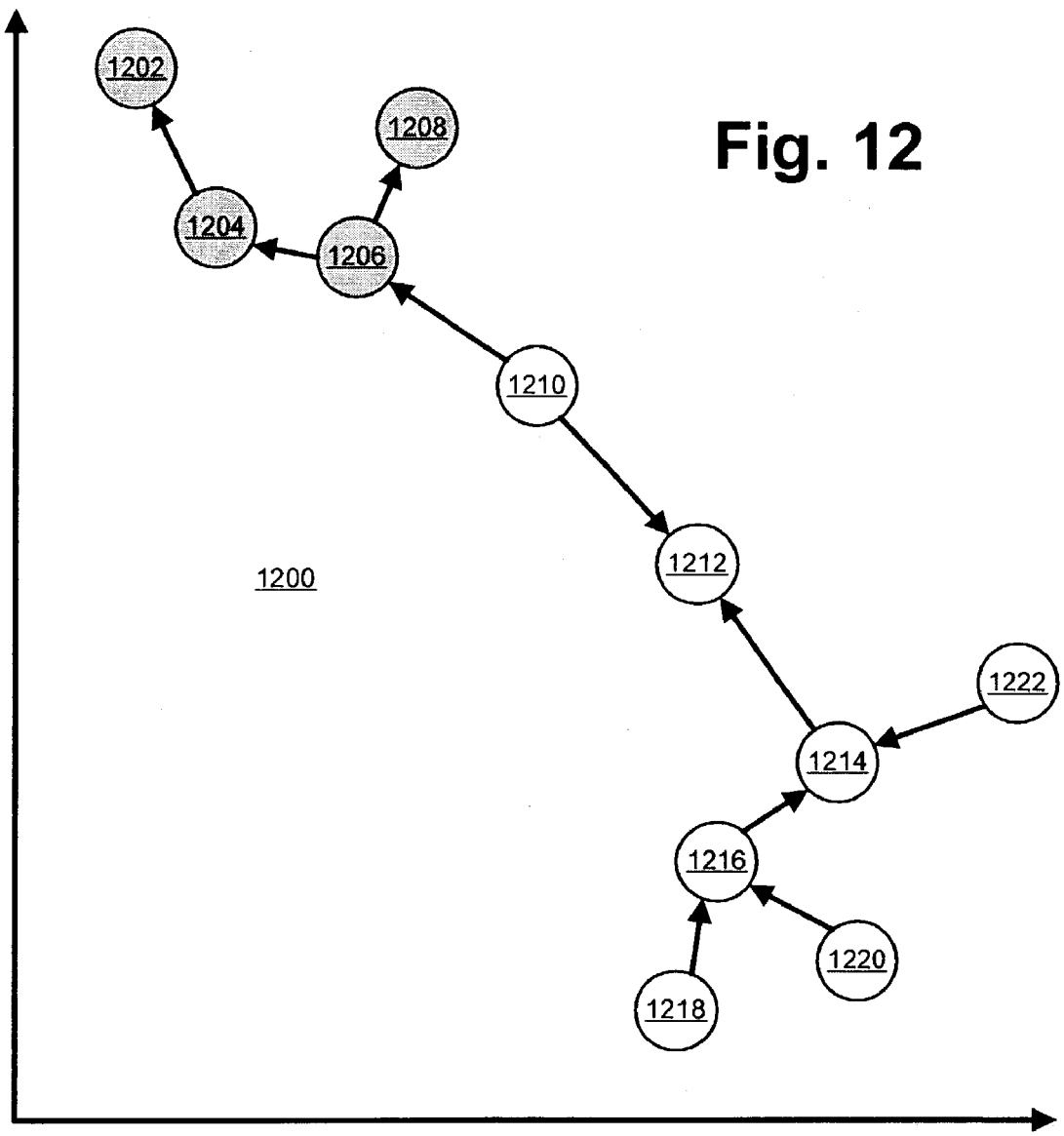
FIG. 12 is a graph illustrating an exemplary erroneous linkage of entity references in accordance with at least one embodiment of the present invention.

The techniques described above generally may link entity references to a particular entity with relative accuracy. However, particular circumstances may result in an incorrect link of entity references to a particular entity. To illustrate, graph 1200 of FIG. 12 illustrates an exemplary set of entity references 1202-1222, which have the potential to be associated with a common entity (DID) using the techniques described above, such as the transition technique, transitive closure technique, match logic, and the like. For example, because each of the entity references 1202-1222 match at least one other entity reference (as indicated by the arrows between entity references), the application of the transition technique and/or the transitive closure technique without other considerations generally would result in all of entity references 1202-1222 being associated with the same entity.

Visual inspection of the graph 1200 indicates that there is the potential for at least two separate entities to be represented by entity references 1202-1222. To illustrate, due to their close "proximity" and match characteristics, entity references 1202-1208 may be reasonably linked to entity A and entity references 1214-1222 may be reasonably linked to entity B. Whether entity references 1210, 1212 refer to either entity A, entity B, or another entity may not be ascertained from the graph 1200.

The "proximity" of entity references to each other may be represented graphically as the distance (i.e., variance) between the entity references at each extreme of each axis representing a selected data field. For example, referring to the graph 1200, there are two axes of note, each axis representing the possible variance in a particular data field for the entity references 1202-1222. In this case, the maximum variance along the abscissa axis (representing, for example, the variance in last name) for the entity references 1202-1222 could be measured as the variance in last name between entity reference 1202 and entity reference 1218. Likewise, the maximum reference along the ordinate axis (representing, for example, age) could be measured as the variance between the age represented in the entity reference 1202 and the age represented in the entity reference 1222.

There are situations that may cause unrelated entity references to erroneously refer to the same entity when applying some or all of the techniques described above without further consideration. One such situation is the presence of null values in relevant data fields. To illustrate, refer to Table 21 having entity references representing a father and son having the same name.

TABLE 21

| Row Number | Fname | Lname | DOB | SSN |
|---|---|---|---|---|
| 1 | Billy | Blenkins | 19670302 | 432234443 |
| 2 | Billy | Blenkins | NULL | 432234443 |
| 3 | Billy | Blenkins | 19370302 | 432234443 |

The first and last entity references of Table 21 both match the middle entity reference, but they do not match each other due to the different DOB field values. However, the closeness of the field values may be interpreted as a potential typographical error and using the transitive technique described above, the first and last entity references could be grouped with the same entity and assigned the same DID. If, however, the DOB data field of the middle entity reference has a valid DOB that matches one of the first and last entity references, the entity references may be separated into two separate entities (i.e., the father and son, matching and non-matching). A second DID entity may be tentative or confirmed upon matching with additional entity references.

The present invention may also provide for correcting incorrect groupings when the data used in the master file is increased over time. Ambiguous entity references may be present in the early stages of the master file and at that point it may be reasonable to join certain entity references to a same entity. Later, after additional information arrives, it may then become clear that the original or existing linking is erroneous. The introduction of ghost entity references also may cause erroneous linking between entity references. Another situation that may result in incorrect grouping lies in the fact that matching records typically is a probabilistic process and there often will be entity references that cannot readily be linked to one entity or another.

Accordingly, in one embodiment, a technique for delinking one or more entity references erroneously lined to the same entity may be employed. The technique may initiate taking one or more measurements of the entity reference by measuring and/or comparing one or more entity references linked to the entity. The one or more measurements may be obtained by measuring and/or comparing the field values of one or more data fields for one or more of the entity references. Typically, the measurements represent a "shape" of the entity as represented by the positions of entity references along the axes of the data fields. For example, the measurements may include the variance between two or more entity references linked to the entity; a ratio of variances between field value(s) of entity references; a sum of one or more variances between field values, invalid field combinations (e.g., gender=male and pregnant=yes); etc.

After taking the one or more actual measurements of the entity, the technique may continue by comparing the one or more actual measurements with one or more corresponding predetermined measurements to determine differences between the actual and predetermined measurements. In one embodiment, the predetermined measurements used for the comparison may be selected based on a classification of the entity where the classification of the entity may be determined from one or more field values of the one or more entity references linked to the entity. The classification of the entity may include, for example, race, ethnicity, geographic location, geographic proximity, social proximity, familial relationships, gender, nation of origin, age, religion, etc.

The predetermined measurements may be viewed as the expected "shape" of an entity of the particular classification. Accordingly, the differences between the actual measurements and the predetermined measurements may indicate a deviation of the entity from the expected entity for a particular classification. In other embodiments, the predetermined measurements may be selected on an entity-by-entity basis or based on one or more particular entity references, they may be the same for all entities, and the like.

After determining the difference(s) between the one or more actual measurements and the predetermined measurements, the difference(s) may be compared to the corresponding threshold(s) to determine whether the difference exceeds the threshold (i.e., is greater than or equal to a maximum threshold or is less than or equal to a minimum threshold). If the difference does exceed the threshold, the links between the one or more entity references may be viewed as erroneous and, therefore, may be delinked by, for example, resetting the DIDs of the entity references or otherwise disassociating the entity references from the entity.

Figure 13:
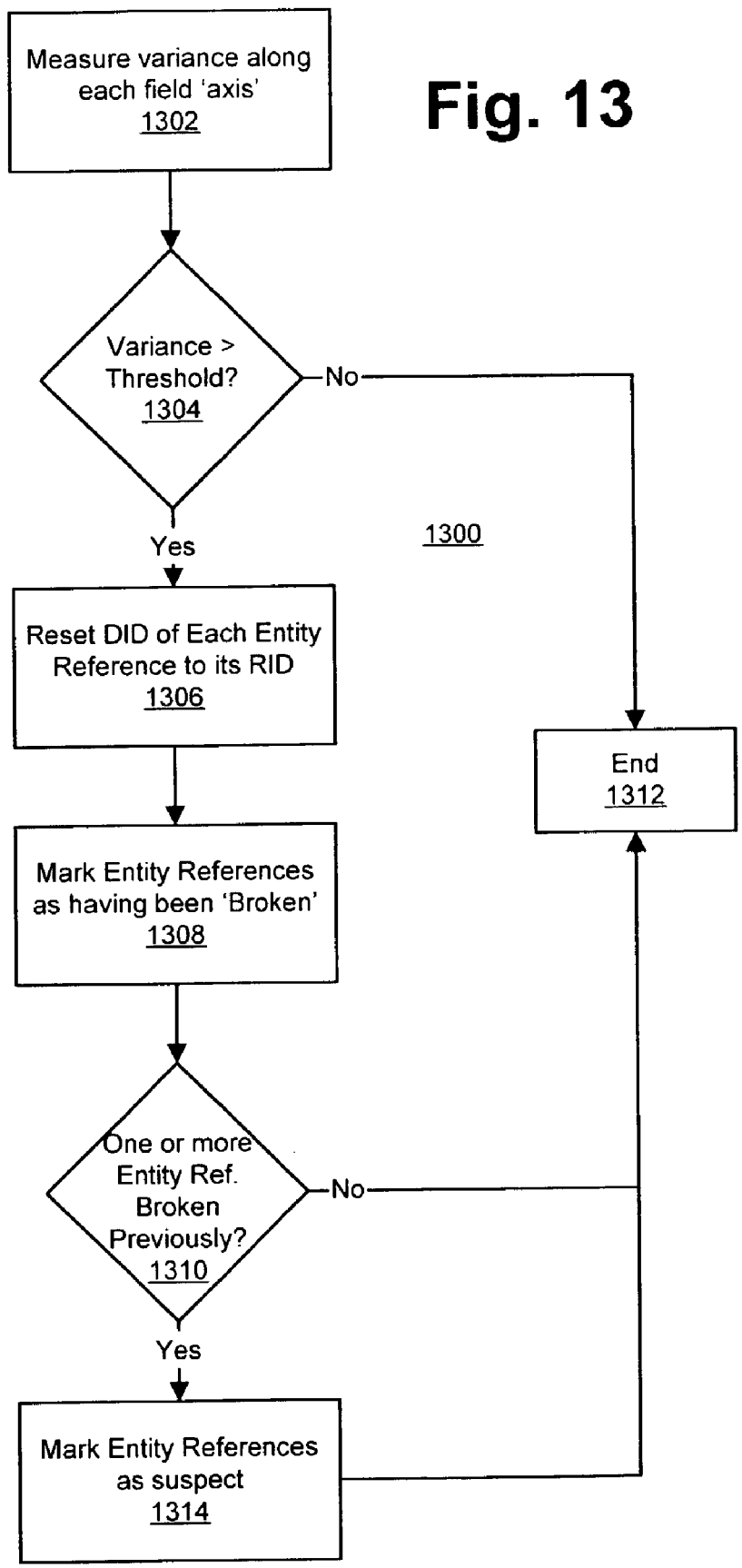
FIG. 13 is a flow chart illustrating an exemplary method for correcting an erroneous linkage of entity references in accordance with at least one embodiment of the present invention.

FIG. 13 illustrates an exemplary method 1300 whereby entity references linked to an entity are measured for a maximum variance in one or more data fields and delinked in the event that the measured variance exceeds a certain threshold. The techniques discussed below may be modified for use in other types of measurements using the guidelines provided herein. Method 1300 preferably is executed iteratively prior to each matching process to minimize the number of excessively-grouped entity references. The exemplary method 1300 may commence at step 1302 by measuring the variance in at least one subset of data fields of the entity references under consideration. As noted above with reference to graph 1200 of FIG. 12, the maximum variance between data field entries may be represented graphically as the distance between the entry references at each extreme along the corresponding axis.

At step 1304, the measured maximum variance for one or more of the selected data fields is compared, respectively, to a maximum threshold value associated with each of the one or more selected data fields. The maximum threshold value for a particular data field may be determined in any of a variety of ways, such as by statistical analysis (e.g., application of a distribution curve) or a subjective value assigned by a human operator. If, for example, the measured maximum variance exceeds the threshold value, the linking of the entity references is considered to be potentially flawed. In this instance, the DID of each entity reference of the grouping may be reset to its RID at step 1306. Otherwise, at step 1312 the method 1300 terminates. Other ways to detect or measure variance are fully contemplated by the invention.

To illustrate steps 1302-1306 by way of example using graph 1200 of FIG. 12, assume that the entity reference 1202 has an age value of 20 years and entity reference 1218 has an age value of 3 years. At step 1302, the maximum variance in the age values of grouping of the entity references 1202-1218 is measured as the variance between the age values of entity reference 1202 and entity reference 1218, so the maximum age variance therefore is 17 years. Further assume that a maximum threshold age value of, for example, 8 years has been selected. Accordingly, since the measured age variance of 17 years exceeds the threshold age value of eight years, the DID value of each of the entity references 1202-1222 may be reset to its RID value. Variance detection, measuring, scoring thresholds or the like may be based on entity type (e.g., male/female, child/adult, married/divorced, citizen/non-citizen) and may be dynamic, static, fixed or variable.

In at least one embodiment, the exemplary method 1300 further includes step 1308 whereby those entity references of a grouping that have been "broken up" (i.e., had their DIDs reset at step 1306) are marked as such. These entity references may be marked by, for example, appending a "broken up" indicator to the corresponding entity reference in the master file. Otherwise, after each entity reference is checked at step 1310, the method may terminate at step 1312. Further, at step 1310, each entity reference may be checked to determine whether the entity reference has been "broken up" from a grouping before. If so, this may indicate that null values or the probabilistic process itself are resulting in incorrect groupings with the entity in question. Accordingly, if the entity reference has been previously marked as "broken up," at step 1314 the entity reference may also be marked as suspect. Additionally, the weightings used in determining matches may be adjusted or "tightened" when suspect entity references are detected. As a result, fewer links between entity references typically will result which generally will prevent or minimize false groupings from occurring. As noted above, after method 1300 terminates at step 1312, one or more matching processes may be applied to the master file as discussed above.

As discussed above, method 1300 may be advantageously utilized to correct erroneous or overreaching links between entity references. In certain situations, however, it may be desirable to permanently or semi-permanently prevent, or block, links between certain entity references. Accordingly, in at least one embodiment, a blocking agent, or blocking DID, may be utilized to prevent links or associations from being made between certain records and DIDs where there may otherwise be an association. Thus, a first plurality of entity references linked to a first DID may be blocked from being associated with or subsumed by a second DID have a second plurality of entity references.

Blocking a link or association between one or more entity references and one or more other entity references or DIDs may facilitate decisioning. Further, by applying an understanding of associate DID records, the interaction (or specific non-interaction) between various entities and their entity references may be supplemented and/or confirmed, thereby increasing or decreasing the probability of match to a threshold level based on confirmation matching via relative, associate and interaction among DID entity reference data.

By way of an example related to blocking a record from being linked or associated with one or more records and/or DIDs, where a user is looking for a credit history, it may become known that the person identified by a first DID was the victim of identity theft at some point. In that case, it may be desirable to identify those records that were fraudulently generated at the source, and to block those records from being linked or associated with the first DID. This may enable a more accurate financial picture to be obtained for the person identified with the first DID.

By way of another example related to blocking an entity reference from being linked or associated with one or more other entity references and/or DIDs, in a law enforcement setting, assume a detective is looking for leads regarding a string of bank robberies on different days over the course of the past six months. In this example, an initial query resulted in the identification of 40 different DIDs, each identified with a particular individual. After an initial investigation, the detective learns that seven of the individuals could not have been associated with the bank robberies (e.g., out of the country at the time, hospitalized, etc.). Based on this new information, the entity references and DIDs for these seven individuals may be blocked from being associated with any of the other 33 DIDs and their respective entity references. The query may then be run again, including the blocked associations and linkage, thereby refining the results. Due to the preclusion of these entity references from the query, the results may include only 25 DIDs.

Blocking one or more records from being associated or linked with one or more additional records or DIDs also may apply to blocking associations or linkages to a ghost DID. Further, according to one embodiment of the present invention, there may be varying strengths of blocking, e.g., a strong block for one threshold span, a medium block for a second threshold span, and a weak block for a third threshold span. For example, a user may designate that an association should be blocked unless a confidence level reaches or exceeds a predetermined level (e.g., greater than 90%).

While blocking DIDs and/or the implementation of exemplary method 1300 may significantly reduce or eliminate erroneously linked entity references, those entity references that are determined to be suspect (steps 1310-1312) often may result in fragmented DIDs that in fact should be properly linked to a common DID. As noted above, null data fields typically are one cause of incorrect groupings or failure to group entity references that may properly be grouped. For example, for DIDs relating to people, any father/son with the same name may not be joined by name/address unless there is a date-of-birth to make the link. Accordingly, at least one embodiment of the present invention provides for a method for reducing the number of null data fields in entity references. This exemplary null-replacement technique typically is performed prior to a match process.

The exemplary null-replacement technique (step 406, FIG. 4), described below, is based on the observation that upon iteration N of the DID process many of the entity references are already linked to each other. For every DID generally there is a common value for many of the data fields. Thus, before entering the match process the null data fields of the entity references may be identified. The null data fields of the entity references are then replaced with the common value of that data field. This not only minimizes false links between entity references but also may cause new links to result since entity references may be available for comparison when they previously were not. Referring to the previous example of Tables 8-11, the entity references resulting from the null data field replacement process are shown in Table 22. Those null data fields of Table 8 that have been replaced with the common value for that data field are indicated in bold font.

TABLE 22

| Row No. | DID | RID | Fname | Mname | Lname | SSN | DOB |
|---|---|---|---|---|---|---|---|
| 1 | 1 | 1 | Mary | Anne | Vandriver | 654567876 | 19660302 |
| 2 | 1 | 2 | MaryAnne | Anne | Driver | 654567876 | 19660302 |
| 3 | 1 | 3 | MaryAnne | Van | Driver | 654576876 | 19660302 |
| 4 | 1 | 4 | Mary | Ann | VanDriver | 654567876 | 19660302 |

As Table 22 illustrates, the entity reference having RID 3 is now prevented from being linked to a mother/daughter using the same name and SSN. Conversely, the entity reference having RID 1 is now available to be linked during SSN matches and the entity references having RID 3 and RID 4, respectively, are available for DOB compares where they previously were not.

This null-replacement process may prevent many of the null problems for data arriving over numerous iterations. This process also may be applied for a single large data set by introducing simulated iterations. To illustrate, for a large data set, a first iteration may be performed where no null-data field replacement is done but the match rules are set to be extremely tight. For the second iteration, null-data field replacement may be performed while the match rules are relatively less stringent.

The various embodiments and features of the DID linking and merging process described thus far provide mechanisms for defining entities and linking entity references to the entities as appropriate. In many instances, this level of linkage may be sufficient to perform desired analysis using a DID-enhanced master file. In other instances, however, the inter-relationships between the entities themselves may be of interest. One such relationship of extreme importance in data mining or data analysis applications is that of association. A particular example, used frequently herein, is the association between people, such as people who have resided together and people who are related to each other. In other words, for a given person, it may be of interest to determine that person's spouse, children, parents, roommates, co-workers, neighbors, business associates, etc. Accordingly, various techniques for determining the associations between entities are described herein in accordance with at least one embodiment of the present invention. The techniques for determining the relationship between entity references (i.e., whether they refer to the same entity) may be refined and expanded for use as techniques for determining inter-entity relationships, as described below. These techniques are herein referred to collectively as the entity association processes.

Figure 14:
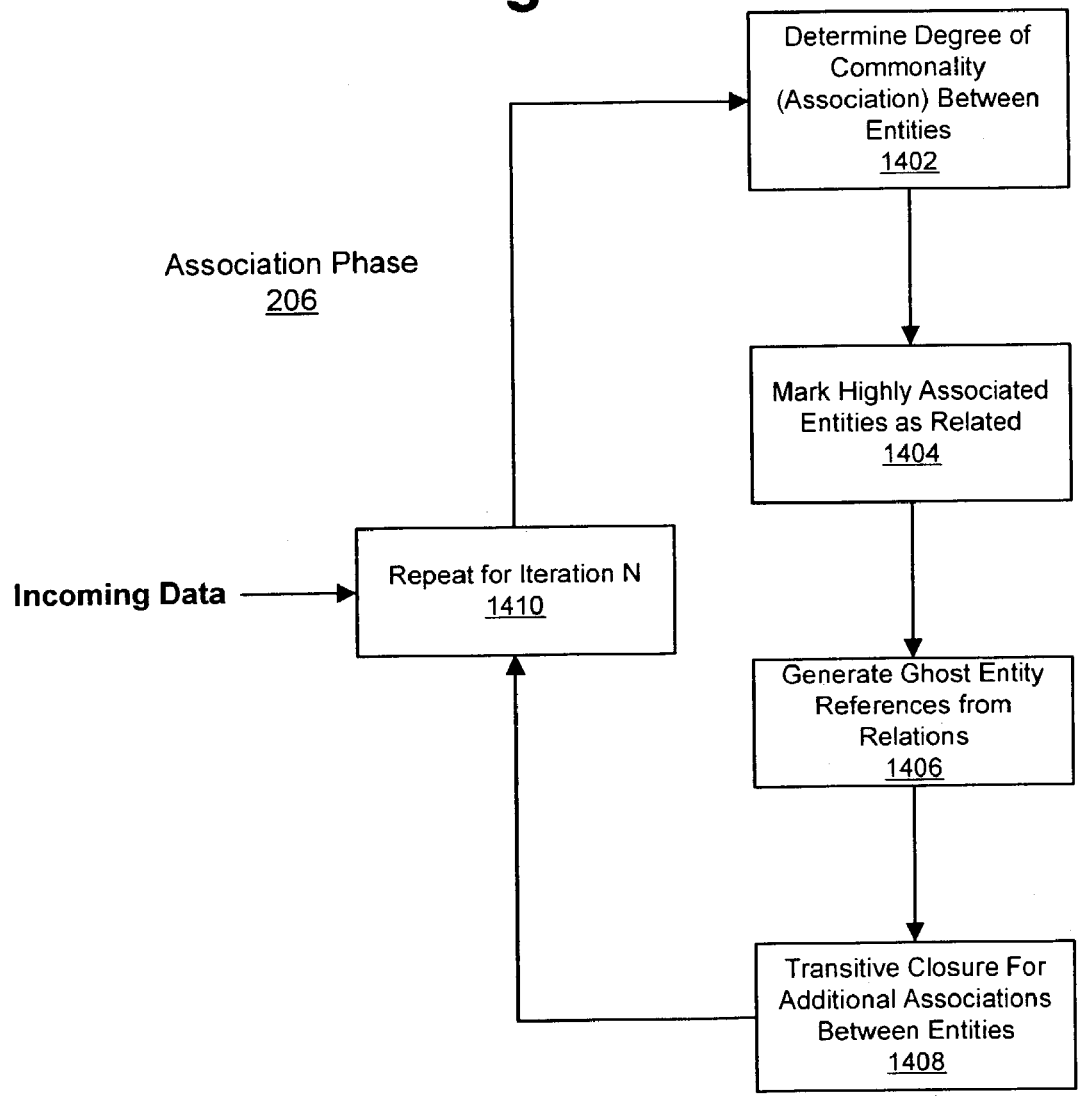
FIG. 14 is a flow chart illustrating an exemplary association phase of the process of FIG. 2 for determining associations among entities in accordance with at least one embodiment of the present invention.

Referring now to FIG. 14, an overview of one embodiment of the association phase 206 is illustrated in accordance with the present invention. Recall that during the association phase 206, inter-relationships, or associations, between entities are identified and utilized to further refine the master file. As described below, some of the techniques for identifying links between entity references may be modified to determine links between entities.

According to one embodiment of the present invention, one way to establish associations between two DIDs is to utilize records that readily confirm such relatedness. For example, record of a same marriage license issued to two DIDs may be taken directly to establish a husband-and-wife association between these two DIDs. By way of another example, record of two DIDs listed as parents on a third DID's birth certificate may also establish a husband-and-wife association between these two DIDs and at least a mother and father relative association with the child third DID.

According to another embodiment of the present invention, another way to establish associations between two DIDs is to apply an association algorithm to evaluate the set of records linked to one DID against the set of records linked to the other DID. Alternatively, a most representative record linked to one DID may be evaluated against a most representative record of the other DID. First, the general DID Architecture matching algorithms may be applied to score the confidence level of matching between records that are selected from the two DIDs. Next, if the confidence level of matching is above a minimum threshold, or some other comparison or difference, a set of predetermined algorithms and/or criteria are applied to identify the association between these two DIDs.

According to one embodiment of the present invention, associations among DIDs may be identified in real time when the database is processing a query made by the user. For example, when the user inputs a set of information and requests a match, the DID link process may be applied to calculate the confidence level of matching between the entity of interest and existing entity references and/or DIDs in order to find or create a DID that is within the query parameters. During the process, if the confidence of matching between one DID and the entity of interest is above a predetermined threshold, association algorithm may be applied to identify the association therein. An association network may be displayed to the user via a GUI by displaying a mapping of the associations among the entity being inquired about and other DIDs. Further decisions may be made by the user based on the graphical representation. If at least one field of the input data is changed, added or eliminated, the association algorithm may be re-applied to adjust the associations accordingly.

According to another embodiment of the present invention, associations among DIDs may also be pre-computed and stored in a database. The storage of established associations among DIDs may take a number of formats, such as text description, graphical representation or dynamic libraries. The information of an association may be included in the records that are linked to the related DIDs, or in a stand-alone document or the combination thereof. Pre-computed and well-documented associations may save valuable time during a time-pressed search of records. For example, in a medical emergency, when the family members of a patient need to be located, a search may be conducted only among the patient's established relatives.

Some associations may not change with time or with new information, such as a parent-child association or a sibling association. According to one embodiment of the present invention, it may be especially desirable to pre-compute and store this type of association. Conversely, some associations may change with time or new information. For example, a colleague association may change from time to time as a person changes jobs. This type of association may need to be updated from time to time or when new information is received.

Pre-established associations may also serve as a good basis for developing further linkages among DIDs and between existing DIDs and new DIDs. As the master file is updated with new entity references, new DIDs may be created. Their associations with existing DIDs may be added to the information of existing associations. In view of the new information provided by the added entity references, new DIDs or new associations may be established and/or established associations among existing DIDs may be updated accordingly.

According to yet another embodiment of the present invention, associations among DIDs may be identified both during and prior to a user query. The query process may be scheduled to run automatically on a routine basis across a whole database to reevaluate and update documented associations. The process may also be set up to adapt dynamically to the specific searching needs of a user. Additionally, it may be desirable to further identify indirect associations between two DIDs based on their respective direct associations with third party DID(s). The indirect associations may be stored in the database in addition to the direct associations.

Based on one embodiment of the present invention, established associations between a particular DID and others may change the relative importance or relevance of this particular DID's data fields. Content weights of data fields in the records linked to this particular DID therefore may be adjusted due to newly established or updated associations with other DIDs. Adjusted content weights of the data fields may in turn cause established associations to be updated. As a result, a feedback loop may be set up to cause optimal probability weights to be assigned to data fields and most truthful associations to be established among DIDs.

Based on another embodiment of the present invention, associations may be identified and established among DIDs that refer to different types of entities. For example, a DID that refers to a person, may be associated with a DID that refers to a property or a business. In a more specific example, in preparation to buy real property a potential buyer may want to know about the history of the property, people and/or businesses that are related to this property, and legal issues, if any, that may exist among previous owners. Using the techniques described herein, the potential buyer may query a number of different types of databases, such as a real estate database, a Division of Motor Vehicles (DMV) database, and a state Corporate Commission database of businesses, in an attempt to find available associations. If an association (e.g., an ownership association) is found between this property and a corporate or private entity, by, for example, matching addresses, the type of association and relevant information may be included in a report generated for the potential buyer.

One advantage of at least one embodiment of the present invention is that it provides a solution to establish a linkage between two DIDs that may otherwise be found completely unrelated. Through its associates, a DID may be indirectly associated with another DID. The present invention may be adopted by a law enforcement agent in criminal investigation. By way of example, in a homicide investigation, the police may have the identity of the victim confirmed. They may also have a number of suspects who have been seen near the crime scene or are otherwise of interest. Often the person committing a crime has some motive and has some type of association with the victim. However, judging from the records linked to the DIDs of the victim and the suspects, there may appear to be no connection at all. Investigators of the case may now take advantage of the association method of the present invention. DIDs of the victim and the suspects may be input to a database together with a request to identify and map all possible associations between the victim and each of the suspects. Based on the results, the investigators may limit their investigation first to only those who do have associations with the victim. Depending on the closeness of the suspects' associations with the victim, priorities of investigation may be set. Investigation of those who are closely related to the victim may be assigned a higher priority than investigation of those who are remotely related to the victim. With this approach, valuable time and resources may be saved and a more efficient investigation results.

A concept of Virtual Family may also be applied to the identification and analysis of a group of entities that share certain commonalities. For example, a law enforcement agency may use the entity references linked to a set of DIDs and the associations among them to investigate possible gang relations of a suspect DID. By way of another example, data records of a credit bureau may provide information about consumer behavior. A market analyzer may set up a criterion to associate buyers of a certain product into one Virtual Family to develop new marketing strategies.

The method of association and grouping of DIDs may also be applied to check for possible conflicts of interest. For example, members on a jury ideally should not have any conflict of interest with either the plaintiff or the defendant. DIDs of all the people involved in the case, including the plaintiff, the defendant, the judge, the counsel and all the jurors, may be sent as inputs for the present invention. All associations of each DID may be mapped out and possible overlap of associates/relatives may be examined to determine whether exclusion of any above-mentioned entities is justified.

In the embodiment illustrated in FIG. 14, the association phase 206 may commence at step 1402 whereby the degree of association between entity pairs may be determined. The degree of association between entities may be based in part on the commonality between their entity references. For example, associated entities often have entity references that share the same or similar data field values. An exemplary technique for determining the degree of association between entities is discussed below with reference to FIG. 15.

An entity having a relatively strong degree of association (e.g., above a particular threshold) with another entity may be marked as a relative to the other entity, and vice versa, at step 1404. When used in the context of the entities representing people, the term relative may refer to a person related to another in the familial sense. In other contexts, the term relative generally refers to an entity having a significantly high degree of association with another entity. As such, relative entities may be viewed as a subset of associate entities. Various beneficial uses of identified relatives are discussed in detail below.

At step 1406, one or more ghost entity references may be generated from the associations determined at steps 1402-1404. As noted below, entity references linked to a given entity often have in common certain data fields with the entity references of an associated entity. Based on this characteristic, step 1104 of method 1100 (FIG. 11) may be further refined by adding ghost entity references resulting from previously established associations between entities. In this case, the relatives file (discussed in detail below) may be used to identify those entities that are related (e.g., the degree of association is greater than a predetermined threshold). Accordingly, the unique value tables generated at step 1104 further may include records generated from the established associations between entities. For example, if DID 1 is strongly associated with DID 2, then the records for DID 2 in the unique value tables could be replicated for DID 1 based on the relationship between DID 1 and DID 2. To illustrate the refined step 1104 using Table 15, assume that a strong relationship between DID 1 and DID 2 is identified. Accordingly, Tables 23, 24, and 25 may be generated as unique value tables for the last name data field, address, and SSN data fields, respectively, of Table 15. Row 4 of Table 23, row 2 of Table 24, and rows 1 and 2 of Table 25 indicate those records generated by virtue of the relationship between DID 1 and DID 2 (note that these records are missing from the corresponding Tables 17-19).

TABLE 23

| Row Number | DID | Last Name |
|---|---|---|
| 1 | 1 | Billington |
| 2 | 1 | Hobbson |
| 3 | 2 | Hobbson |
| 4 | 2 | Billington |

TABLE 24

| Row Number | DID | Address |
|---|---|---|
| 1 | 1 | 4881 S Citation |
| 2 | 1 | 4889 S Citation |
| 3 | 2 | 4881 S Citation |
| 4 | 2 | 4889 S Citation |

TABLE 25

| Row Number | DID | SSN |
|---|---|---|
| 1 | 1 | 123456789 |
| 2 | 1 | 123546789 |
| 3 | 2 | 123456789 |
| 4 | 2 | 123546789 |

For ease of illustration, the new 'ghost' references were set to be of equal value to the original known references in the examples discussed above. In certain instances, however, it may be advantageous to assign a confidence level to ghost entity references, where the confidence level preferably is represented as a percentage set at the point the entity reference is created. For an existing reference the confidence level may be set at 100%. For ghost entity references, the confidence level may be determined based on global statistics, e.g., how frequently certain shifts occur. For example, the percentage of people who use a spouse's SSN may be used to determine a confidence level for ghost entity references generated from a SSN. Accordingly, during the matching process between two entity references, the match score can be adjusted down based upon the confidence level assigned to the corresponding entity references, where the higher the confidence level, the lesser the adjustment.

Just as one or more transitive techniques may be used to identify indirect links between entity references, the transitive properties of the associations between entities may be used to identify indirect associations between entities at step 1408. Exemplary transitive techniques as applied to associations between entities are illustrated with reference to FIG. 16.

As noted previously, incoming data may be periodically supplied for inclusion in the master file. Accordingly, at step 1410, steps 1402-1408 may be repeated using the incoming data. As a result, the degree of association between entities may be refined; entity references may be identified as related; new ghost entity references may be generated and the like.

Figure 15:
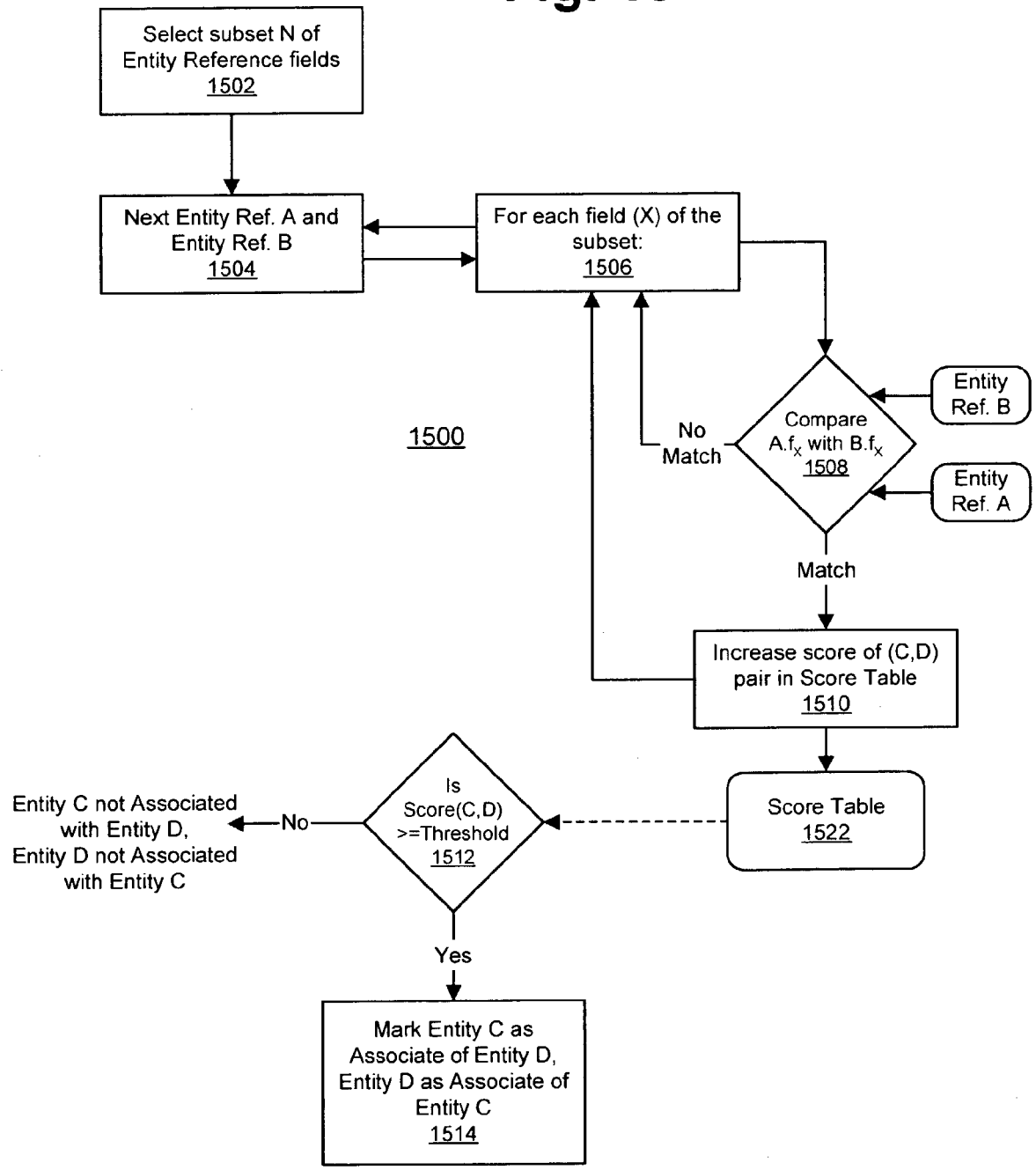
FIG. 15 is a flow chart illustrating an exemplary method for determining associations among entities in accordance with at least one embodiment of the present invention.

Referring now to FIG. 15, an exemplary method 1500 for identifying the degree of association between entities is illustrated in accordance with at least one embodiment of the present invention. In certain instances, method 1500 may be similar to the DID match process described above. Method 1500 may initiate at step 1502 whereby a subset of data fields is selected. Typically, those data fields that are expected to be shared by or are otherwise indicative of some relationship between related entities are selected at step 1502. In the case of people, some examples of such data fields may include: name; address; SSN; phone number; vehicle identification number (YIN); and credit card number.

A score table 1522 also may be generated at step 1502, where the score table 1522 has a table record for some or all of the possible entity pairings from the master file. In one manner, the initial score table 1522 has a left DID column for the entity of the pair having the higher DID, a right DID column for the entity of the pair having the lower DID, and a score column initialized, e.g., to zero for each DID pair record.

At step 1504, a first entity reference pairing (i.e., entity reference A and entity reference B) is selected from possible entity references master file. At step 1506, a first data field is selected from the subset of data fields. At step 1508, the information in the selected data field for entity reference A may be compared to the corresponding information for entity reference B. If there is a match (i.e., equivalence or some acceptable degree of similarity), the score of the corresponding entity pair record in the score table 1522 may be adjusted (e.g., increased) at step 1510. For example, if the first name of entity reference A (having, for example, DID 1) matched the first name of entity reference B (having, for example, DID 3) then the score of the DID 3:DID 1 record in the score table 1522 would be adjusted by a determined or predetermined amount. The score adjustment may be constant regardless of the type of match or the magnitude of the score adjustment may be related to the type or degree of match (e.g., matching SSNs may be given a higher match score than matching first names). If no match exists for the data field in question, the method 1500 returns to step 1506.

Steps 1506-1510 may be repeated for each data field of the subset of data fields for the entity pair. After each related data field for an entity pair has been compared, additional entity reference pairings may be selected at step 1504 and steps 1506-1510 may be repeated for each of the selected entity reference pairings. Steps 1504-1510 may be repeated for some or all of the possible entity reference pairings from the master file.

After the entity reference pairings have been evaluated for each data field of the subset of data fields, the resulting score table 1522 may be used to probabilistically determine associations between entities. In one embodiment, the association between an entity pair is binary; either the entities are associated or they are not. In other embodiments, the association between an entity pair may be set forth by degree of association. For example, three levels of association could be used, such as: not associated; little association; and extensive association. The degree of association among entities may be represented graphically as a form of spatial "closeness."

At step 1512, the score of each entity pair record in the score table 1522 is compared to one or more score thresholds to determine the probable relationship between the entities of the entity pair record. If the score meets or exceeds the score threshold, entity C of the entity pair is identified as being associated to entity D of the entity pair and vice versa. A data field indicating this relationship may be appended to the entity references linked to entities C and D, where each entity relationship linked to entity C may receive a value indicating a type of association with the entity D and each entity reference linked to entity D may receive a value indicating the type of association with entity C. The association value preferably further includes the DID of the associated entity. In instances where multiple thresholds are utilized, an indication of the level of relatedness between the entities also may be appended. Steps 1512 and 1514 may be repeated for some or all of the entity pair records in the score table 1522.

Additionally, in one embodiment, an additional indicator of association may be implemented based on a match between two entity references in addition to the score for the corresponding entity pair record in the score table 1522. For example, in databases regarding information about people, matching last names are a strong indication of a familial relationship between people. If the entity pair score of two people exceeds a set threshold, the last names of the two people may be compared (i.e., the entity references of the two people may be compared) to determine a match. If the last names match, the two people could be marked not only as associated but also as related (in a familial sense). Also, weighting may be based on number of occurrences or distinctiveness of the name. If the last names do not match and there is no match with a name known to be used by an entity (e.g., a maiden name of a woman), then the two people may be marked as associated but not related.

The method 1500 may be beneficially demonstrated by way of example using Tables 26-35 whereby the association between people (one embodiment of an entity) of a database is probabilistically determined. Table 26 illustrates the database under consideration:

TABLE 26

| Row No. | DID | First Name | Last Name | Address | SSN |
|---|---|---|---|---|---|
| 1 | 1 | David | Baymont | 4881 S Citation | 345678987 |
| 2 | 1 | David | Baymont | 453 Main Street | 345678987 |
| 3 | 2 | Clare | Baymont | 4881 S Citation | 876543321 |
| 4 | 2 | Clare | Baymont | 876 High Street | 876543321 |
| 5 | 3 | Tim | Hodkins | 876 High Street | 123456789 |
| 6 | 3 | Tim | Hodkins | 456 Time Blvd | 123456789 |
| 7 | 3 | Tim | Hodkins | 456 Time Blvd | 876543321 |
| 8 | 4 | Karen | Hodkins | 456 Time Blvd | 112233445 |
| 9 | 4 | Karen | Hodkins | 4881 S Citation | 112233445 |
| 10 | 4 | Karen | Hodkins | 453 Main Street | 345678987 |

From Table 26, Tables 27 and 28 may be generated, each table having a DID column and a column for at least one of the subset of data fields (identified at step 1002). From Table 26, the relevant data fields may include the address data field (Table 27) and the SSN data field (Table 28)

TABLE 27

| Row Number | DID | Address |
|---|---|---|
| 1 | 1 | 4881 S Citation |
| 2 | 1 | 453 Main Street |
| 3 | 2 | 4881 S Citation |

TABLE 27-continued

| Row Number | DID | Address |
|---|---|---|
| 4 | 2 | 876 High Street |
| 5 | 3 | 876 High Street |
| 6 | 3 | 456 Time Blvd |
| 7 | 3 | 456 Time Blvd |
| 8 | 4 | 456 Time Blvd |
| 9 | 4 | 4881 S Citation |
| 10 | 4 | 453 Main Street |

TABLE 28

| Row Number | DID | SSN |
|---|---|---|
| 1 | 1 | 345678987 |
| 2 | 1 | 345678987 |
| 3 | 2 | 876543321 |
| 4 | 2 | 876543321 |
| 5 | 3 | 123456789 |
| 6 | 3 | 123456789 |
| 7 | 3 | 876543321 |
| 8 | 4 | 112233445 |
| 9 | 4 | 112233445 |
| 10 | 4 | 345678987 |

Row 7 of Tables 27 and rows 2, 4, 6 and 9 of Table 28 represent duplicates in the projected tables. These preferably are removed. Otherwise, the inner join (discussed more fully below) may produce multiple records for the same fact and thereby cripple the scoring.

The address table (Table 27) may be now inner joined by address with person1 and person2 coming from the 'DID' data field of the left and right hand side of the join. As with convention, the records where the DIDs are the same or where the right DID is greater than the left DID are removed. The resulting Table 29:

TABLE 29

| Row Number | Person1 - DID | Person2 - DID | Score | Notes |
|---|---|---|---|---|
| 1 | 2 | 1 | 1 | On 4881 S Citation |
| 2 | 4 | 1 | 1 | On 4881 S Citation |
| 3 | 4 | 1 | 1 | On 453 Main |
| 4 | 3 | 2 | 1 | On 876 High |
| 5 | 4 | 3 | 1 | On 456 Time |

In a similar manner, Table 30 is generated from the SSN Table 28:

TABLE 30

| Row Number | Person1 - DID | Person2 - DID | Score | Notes |
|---|---|---|---|---|
| 1 | 4 | 1 | 1 | On 345678987 |
| 2 | 3 | 2 | 1 | On 876543321 |

Tables 29 and 30 may then be concatenated and sorted such that the DID pairs are located together in the resulting Table 31. The DID pairs in Table 31 may then be rolled up so that the scores of the records removed are added to the corresponding record being kept. Rows 3, 5 and 6 of Table 31 illustrate those records removed during roll up in Table 31. The results are illustrated in Table 32 (an exemplary illustration of the score table 1022).

TABLE 31

| Row Number | Person1 - DID | Person2 - DID | Score | Notes |
|---|---|---|---|---|
| 1 | 2 | 1 | 1 | From 4881 |
| 2 | 3 | 2 | 1 | From 876 |
| 3 | 3 | 2 | 1 | From 876543321 |
| 4 | 4 | 1 | 1 | From 4881 |
| 5 | 4 | 1 | 1 | From 453 |
| 6 | 4 | 1 | 1 | From 345678987 |
| 7 | 4 | 3 | 1 | From 456 Time |

TABLE 32

| Row Number | Person1 - DID | Person2 - DID | Score | Notes |
|---|---|---|---|---|
| 1 | 2 | 1 | 1 | From 4881 |
| 2 | 3 | 2 | 2 | Merged |
| 3 | 4 | 1 | 3 | Merged |
| 4 | 4 | 3 | 1 | From 456 Time |

The applicable score threshold(s) then may be applied to Table 31. For example, those records of Table 31 having scores of 1 are probably coincidental and therefore may be removed. However, DID 4 and DID 1 (rows 4 and 1, respectively) may be marked as associated (step 1014) as their score is a 3 and DID 3 and DID 2 may be marked as associated, as their score is a two.

In the above exemplary process, the score for an entity pair was computed directly from comparisons of the data fields of the entity references. However, it may be beneficial to include other indicators relevant to associations between entities. One such indicator may include an indication of relatedness type (e.g., familial relatedness) as discussed above. Another indicator may include the recency of the association between entities. The initial values for these indicators typically are data dependent to a significant degree. To illustrate, for personal relationships the master file may include additional information regarding the date(s) a person lived at an address, the time that a person reported a specified SSN or DOB (such as on an application for credit), and the like. By convention, the most recent date of overlap is used as the recency date and if there is no recency information, the recency date may be set to zero. Accordingly, when performing the roll up phase (discussed above for Table 31) one or both of these data fields may be included in the roll up process. For the related data field a logical OR may be performed with the related data field during roll up. For the recency data field, the most recent recency date may be retained.

A number of techniques may be implemented to further refine the entity association process described above. Although the principles in the following discussion are generally applicable to various types of data, exemplary techniques useful in identifying associations among people are discussed below.

As noted above, dedup operations may be implemented to remove duplicate or essentially identical table records. The dedup operation typically is used when identical records or pieces of information would otherwise count as two links between entity references. However, there may be table records that are semantically identical even though they are syntactically different. For example it is quite common for streets to be known both by an official number and a local street name. To illustrate: 1800 US 1 Delray Beach, Fla. and 1800 Federal Highway, Delray Beach Fla. are actually the same address. Similarly, cities may have postal and vanity names for such streets. Furthermore, suppose 1800 Federal is an apartment block with at least 1000 people, all of whom have had records (entity references) with both addresses. It may result from the techniques described above that each of the 100 people may be identified as being associated or even related to the 999 other people in the apartment block as they have "lived together" and shared two "different" addresses (although actually the same). Similar issues may arise from, for example, address cleaning software when there are two similar road names and the cleaning software will select the less correct road name.

An unrefined approach would incorporate aggressive deduping to reduce such problems. For example, entity references may be deduped so that there is only one entity reference in each address number for any given entity. While this approach may remove the double counting it also may eliminate a number of valid matches, such as when a person has lived at address "123" on two genuinely different streets. A different technique for adjusting for various names for the same street is discussed with reference to Table 33.

TABLE 33

| Row Number | DID | Address |
|---|---|---|
| 1 | 1 | 1800 Federal |
| 2 | 2 | 1800 Federal |
| 3 | 2 | 1800 US1 |
| 4 | 3 | 1800 US1 |

By attempting to dedup the two DID 2 entity references, a link from DID 2 to either DID 1 or DID 3 may be lost regardless of which table record is removed. To prevent such an occurrence, in one embodiment, the dedup process may be implemented whereby the deduped data fields are carried forward with the joined table records and then the dedup process is performed based upon the dedup data field and the DID data fields just prior to the rollup phase. In this manner double counting within any one association pair may be avoided but association pairs may be available for counting. To illustrate, assume that Table 34 includes a projected address table:

TABLE 34

| Row Number | DID | Address |
|---|---|---|
| 1 | 1 | 1800 Federal |
| 2 | 2 | 1800 Federal |
| 3 | 2 | 1800 US1 |
| 4 | 3 | 1800 US1 |
| 5 | 4 | 1800 Federal |
| 6 | 4 | 1800 US1 |

The pairs generated prior to roll up are illustrated in Table 35. Row 4 of Table 35 typically would be deduped. Therefore, during the rollup none of these data fields get a score of 2 although all of them get a score of 1.

TABLE 35

| Row Number | Person1 | Person2 | Dedup Data field | Score |
|---|---|---|---|---|
| 1 | 2 | 1 | 1800 | 1 |
| 2 | 4 | 1 | 1800 | 1 |
| 3 | 4 | 2 | 1800 | 1 |
| 4 | 4 | 2 | 1800 | 1 |
| 5 | 3 | 2 | 1800 | 1 |
| 6 | 4 | 3 | 1800 | 1 |

The previous discussion was based on the assumption that addresses either match exactly or they do not reference the same address. In reality, address information typically is highly variable even when referring to the same physical address. Accordingly, an address match technique utilizing fuzzy-logic type matching is provided in accordance with one embodiment of the present invention. Better results often may be obtained if a certain amount of fuzziness is allowed in the match. An applicable example is the use of apartment numbers that are very often omitted from database records (i.e., entity references). Table 36 illustrates such an instance.

TABLE 36

| Row Number | DID | Address | Apt |
|---|---|---|---|
| 1 | 1 | 123 Main | 4 |
| 2 | 2 | 123 Main | |
| 3 | 3 | 123 Main | 5 |
| 4 | 4 | 123 Main | |
| 5 | 5 | 123 Main | 4 |

When considering whether two entity references listed in Table 36 are linked, four cases can be considered: 1) left and right agree on apartment number; 2) either left or right is null; 3) both left and right are null; and 4) left and right disagree on apartment number. Accordingly, improved precision in entity reference linking by address may be achieved by scoring address matches from 0 to 4 rather than 0 or 1. An exemplary scoring of 1 to 4 follows: 1) if left and right agree on apartment number then score 3 points; 2) if either side is null then score 2 points; 3) if both sides are null then score 2 points; and 4) if the two sides disagree then score 1 point.

As such, the final scoring threshold may be set at 6 points so that two perfect matches to within an apartment have to be made in order to score an actual association. In some cases, scoring (3) is sometimes too low. For people living in single-family dwellings there may not be an apartment number to compare. Nevertheless, such residents should be considered as those who share an apartment. The solution can include checking the address against a list of known apartment buildings and if this is not an apartment building then score 3 rather than 2. Another solution may include assuming that an address is not an apartment unless at least one entity references indicates an apartment number for that address.

This scoring system may be improved further. If only two people ever have lived in a building then they are probably more closely associated than if one hundred people lived in the building (as might be expected for a timeshare). If a large enough master file is available, this problem may be solved using statistical techniques, including the content weighting technique described above or a hybrid technique incorporating both content weighting and field weighting. Specifically, this technique may include counting for every address the number of different DIDs that have lived there. Rather than having the weight based upon scoring criteria (1)-(4) above, a point value may be selected based upon the larger of the occupancy values. For example, if less than ten people have resided at either address, apply a score of three; if less than one hundred people have resided at either address, apply a score of two; or if one hundred people or more have resided at either address, apply a score of 1. This scoring system takes advantage of the fact that nulls in the apartment data field are common and thus if it is an apartment building the null address potentially will have a high occupancy count. If the number of units can be determined to be relatively low then the score can be adjusted upward.

Another issue to consider when looking at the weight on link is timing. In general, if two people have lived at the same place at the same time then they are more likely to be linked than if they have lived there at different times. The recency data field, described above, may be implemented to increase the score or link weight if there is time overlap. This increase may be adjusted to add more weight dependent upon the degree of overlap. Of course, in setting a search strategy, a user may use parameters or conditions, such as overlap in residence, as a requirement. Accordingly, no match would occur unless the requirement is met.

The score data field in score table 1522 (FIG. 15) may be viewed as a weight or a probability that there is a significant link between the two entities to a degree greater than sheer chance. Thus when forming a tentative link between two individuals, the fact that they happen to share a last name typically decreases the probability of this being chance and may, therefore, be used to increase the weight or probability. As noted previously, a relative indicator may be used to indicate a relative-type association link between entities. Also as noted previously, this relative indicator could be predicated upon the score and/or a match between last names.

An initial attempt to identify relatives could include the addition of a certain number of points to the match score if the last names are the same. Two people living in the same apartment/single family dwelling with the same last name may therefore automatically be considered associated. This introduces the problem of how close of a match is adequate to determine statistically that two entities are relatives. Two "Smiths" in the same building is more likely to be coincidence than two "Burklehoffs." Similarly an accidental match is more likely in a building that has had 1000 people than one that has had 5 people. Therefore, in one embodiment, two statistics tables may be constructed, one table to register the number of people in a building and the other table to register the commonality of given surnames. From these tables a more accurate score for the significance of two people having the same last name can be constructed. This score then may be used to enhance or subtract from the entity reference pair score. For instance, a value of one to three may be added or subtracted from the score.

Additional insight may be obtained by observing that if two weak links between entity references occur but are heavily unrelated then it may suggest a genuine strong link. For example, if two people have lived in three different apartment buildings in the same zip code but never in the same apartment then they probably are not related. However, this may be indicative of some other form of association. On the other hand, if, for example, two people have lived in the same three apartment buildings, one in Texas, one in Florida and one in New York then there is a strong possibility that they are associates and even relatives, particularly if their occupancy periods in each apartment overlap. A "separation" data field therefore may be included in the link record. This data field may be thought of as a one-dimensional axis upon which data is projected, a long distance on that axis suggests a high degree of separation between the link types and thus corresponds to a higher score. For example, if the zip codes in a link are greater than 10 miles apart one point may be added, two points may be added if the zip codes in a link are greater than 100 miles apart and 3 points may be added if the zip codes are greater than 1000 miles apart.

To clarify, consider the following example of a heavily related couple, illustrated with reference to Tables 37 and 38.

TABLE 37

| Row Number | Did | Fname | Lname | Address | Zip Code | Apt | First Seen | Last Seen |
|---|---|---|---|---|---|---|---|---|
| 1 | 1 | John | Smith | 4881 Main | 10445 | 32 | 1998 | 1999 |
| 2 | 1 | John | Smith | 123 High | 43002 | 17 | 1999 | 2002 |
| 3 | 2 | Jane | Blyth | 4881 Main | 10445 | 32 | 1998 | 1999 |
| 4 | 2 | Jane | Smith | 123 High | 43002 |  | 1999 | 2002 |
| 5 | 2 | Jane | Smith | 123 High | 43002 | 32 | 2002 | 2002 |

Table 38 illustrates the resulting match records:

TABLE 38

| Row No. | Person 1 | Person 2 | Dedup | Separation | Score | Recency | Related |
|---|---|---|---|---|---|---|---|
| 1 | 2 | 1 | 4881 | 10445 | 3 | 1999 | 0 |
| 2 | 2 | 1 | 123 | 43002 | 3 | 2002 | 2 |
| 3 | 2 | 1 | 123 | 43002 | 1 | 2002 | 1 |

In the next stage, Table 38 is deduped by the person1, person2 and dedup data fields. Note the dedup process preferably includes the dedup in which the record with the greatest score is kept, as described above. This allows for full apartment flexibility without accidentally double counting. In Table 38, the Row 3 typically is eliminated as a result of the dedup process.

During the rollup phase the resulting record receives a score of 11. The score of 11 comes from the first record score of 3, the second record score of 3 plus related score of 2. Given that zip code 10445 is greater than 1000 miles from zip code 43002, a bonus score of 3 points may be added for having address links that are, for example, greater than 1000 miles apart.

For the most part, the relationship-determination techniques discussed above are based at least in part on projections of the master file. In other words, the relationships between entities may be determined using statistical processes on the master file. There are, however, data sources external to the master file that may provide indications of relationships between entities. For example, marriage records, vehicle registrations and property deeds records often include joint registrations for two or more people that typically are a strong indication of a relationship between these entities. Accordingly, an external relationship process may be implemented to determine relationships between entities using data sources external to the master file. The external relationship process, in one embodiment, commences by performing the DID matching process, described above, a number of times to assign a DID to each registrant of a record in an external data source. To illustrate, marriage records typically have two registrants for each marriage record, one registrant being the bride and the other registrant being the groom. Thus, for marriage records, the DID matching process is performed twice. The result of the multiple DID matching processes typically is a data file with two or more DIDs associated with each record of the data file. One or more of the entity linking techniques described above then may be performed to link records. Further, a matching score, as well as a recency data field may be attached to each record of the data file using the techniques described above.

In at least one embodiment, the matching score assigned to a record may be assigned based on a subjective evaluation of the type of external data source from which the record originated. For example, a marriage record may be assigned a score of 6, a property deed record might be assigned a score of 3 and a vehicle registration record may be assigned a score of 5. Depending on the nature of the incoming record the dedup data field may be utilized to ensure that multiple records of the same type are not present in the file and the separation data field may be used to indicate if the information in the record is a different type of information compared to the data typically present in the master file.

Figure 16:
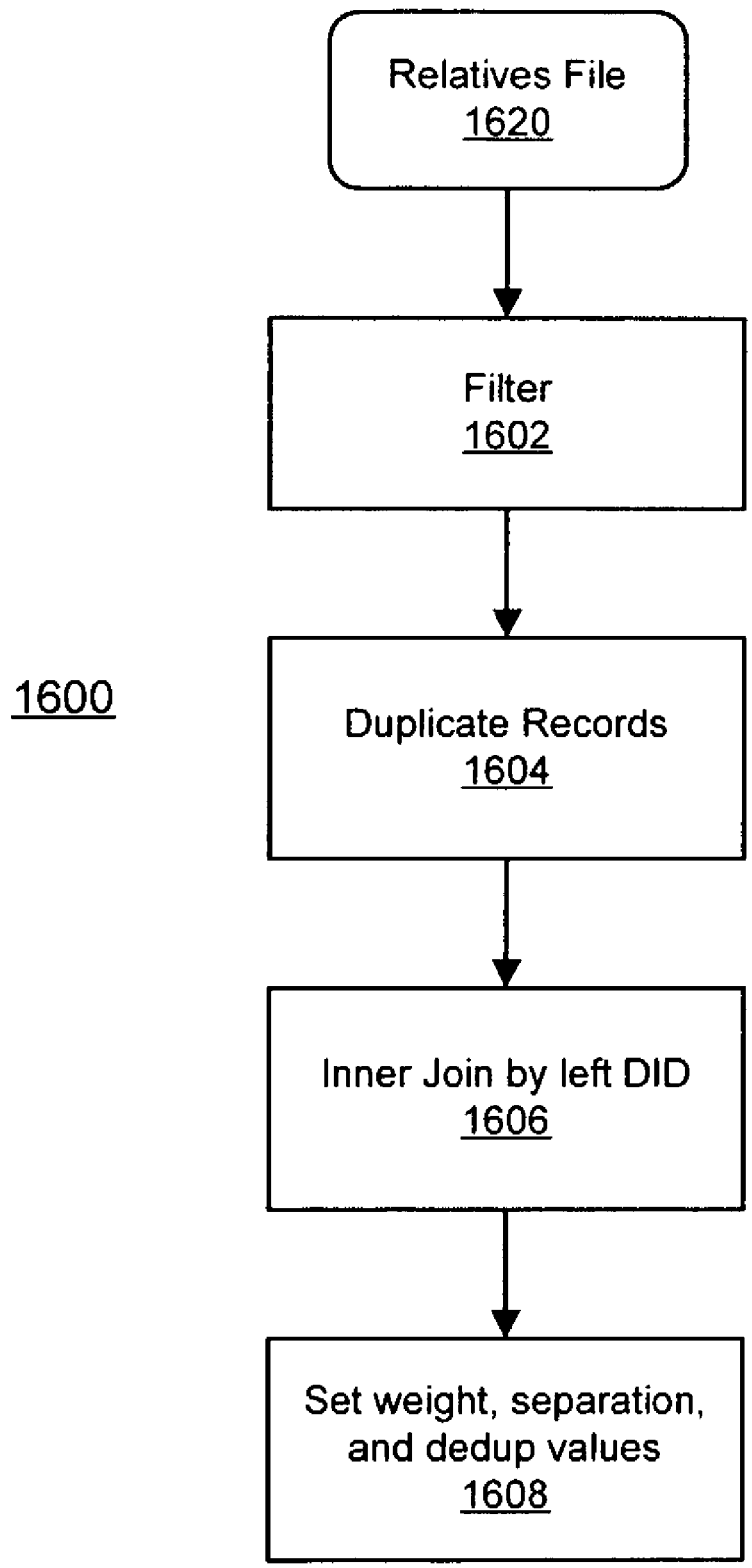
FIG. 16 is a flow chart illustrating an exemplary method for determining associations among entities using transitive closure in accordance with at least one embodiment of the present invention.

Referring now to FIG. 16, an exemplary method 1600 for implementing transitive closure also to establish relationships between entities is illustrated in accordance with at least one embodiment of the present invention. The transitive techniques discussed below are especially useful when the relationship link between two entities may initially appear to be relatively weak.

The exemplary method 1600 may commence at step 1602 wherein the relatives file 1620 (generated, for example, from method 1500, FIG. 15) is filtered by matching score, where those records of the relatives file 1620 having a score less than a predetermined threshold value are removed from consideration. Any of a variety of techniques may be used to determine the appropriate threshold value. For example, a filter threshold value could be determined upon statistical examination of the relatives file 1620 so as to keep only 10% of the entries of the relatives file. As a result of the filtering step 1602, an intermediate relatives file (not shown) having only those more strongly-related records of relatives file 1620 is generated.

At step 1604, the records of the intermediate relatives file may be duplicated so that both forwards and backwards relationships are represented in the relatives file 1620. At step 1606, the intermediate relatives file is inner joined with itself by the left DID. In one manner, those records wherein the right DID is greater than the left DID of the record may be discarded to remove duplicate records. At step 1608, each record of the resulting relatives file is set to a particular weight value (e.g., a weight of 3) and the separation and dedup values are preferably set to 0. This typically ensures that only one 'transitive closure' is accounted for each relationship. The net result of the exemplary method 1600 is that a first entity typically is identified as an associate of a second entity if they are associates of a third entity who is an associate of the second entity and the second entity has, at some point, a common data field value with the first and third entity. The common data field value preferably is an information type that is relatively specific to a particular entity, such as, for example, an address, SSN, or vehicle registration.

The exemplary method 1600 may be beneficially demonstrated with reference to Tables 36-38. Table 39 represents an example of the relatives file 1620. Table 40 represents the intermediary relatives file resulting from the duplication of the filtered records of Table 39 (step 1602, 1604). A score threshold value of 10 is used for filtering in the following example. Table 41 represents a table resulting from an inner join (or other technique) of Table 41 to itself by the left DID (the Person1 column) (step 1606) and the setting of the weight, separation, and dedup data fields of the resulting table (step 1608). A weight of 3 is used in this example.

TABLE 39

| Row Number | Person1 (left DID) | Person2 (right DID) | Score |
|---|---|---|---|
| 1 | 2 | 1 | 20 |
| 2 | 3 | 2 | 20 |
| 3 | 7 | 2 | 5 |
| 4 | 4 | 1 | 15 |
| 5 | 4 | 2 | 15 |
| 6 | 4 | 3 | 15 |

As Table 39 illustrates, row 3 is filtered as it has a match score below the exemplary filter threshold of 10.

TABLE 40

| Row Number | Person1 (left DID) | Person2 (right DID) |
|---|---|---|
| 1 | 1 | 2 |
| 2 | 1 | 4 |
| 3 | 2 | 1 |
| 4 | 2 | 4 |
| 5 | 2 | 3 |
| 6 | 3 | 4 |
| 7 | 3 | 2 |
| 8 | 4 | 1 |
| 9 | 4 | 2 |
| 10 | 4 | 3 |

TABLE 41

| Row No. | Person1 | Person2 | Score | Dedup | Separation | Notes |
|---|---|---|---|---|---|---|
| 1 | 4 | 2 | 3 | 0 | 0 | Person1 = 1 |
| 2 | 4 | 1 | 3 | 0 | 0 | Person1 = 2 |
| 3 | 4 | 3 | 3 | 0 | 0 | Person1 = 2 |
| 4 | 3 | 1 | 3 | 0 | 0 | Person1 = 2 |
| 5 | 4 | 2 | 3 | 0 | 0 | Person1 = 3 |
| 6 | 2 | 1 | 3 | 0 | 0 | Person1 = 4 |
| 7 | 3 | 1 | 3 | 0 | 0 | Person1 = 4 |
| 8 | 3 | 2 | 3 | 0 | 0 | Person1 = 4 |

Rows 5 and 7 of Table 41 indicate the records of Table 41 that will be deduped based on the dedup data field. Row 8 of Table 41 indicates the new relationship information that may be used in a successive relationship rollup. All other rows indicate known relationships.

The techniques discussed thus far may be applied across the entire universe of data that is available. There are occasions, however, when the data is so poor and fragmented that some "outlier" entity references remain unlinked. Statistically these outliers typically comprise a relatively small portion of the data but there are certain instances where these outliers are the most important portion of the data. Circumstances where this has been most evident include law enforcement applications where large numbers of disparate files are integrated into a single master file. In such situations the data for the people sought by law enforcement typically is highly fragmented, for instance where people are deliberately trying not to be found or where they are new to the country. The matching process may be adapted to identify and locate such outliers, as discussed below.

In one embodiment, a technique whereby ghost entities are constructed to identify potential entities may be implemented as follows. Each of a number of entity references may be linked to a separate ghost entity (i.e., a 1:1 ratio of entities to entity references). The entity reference of each ghost entity may be compared to the entity references of some or all of the other ghost entities to determine a match probability between the entity references being compared. As discussed above, the match probability may based at least in part on a content weight of one or more field values of the entity references being compared and/or a degree of similarity between the values of the entity references. In the event that the match probability is greater than or equal to a match threshold, the entity references of each of the two ghost entities being compared is linked to the other ghost entity. The entity references of the ghost entities may be compared for some or all of the ghost entity pairing possible.

After linking the entity references to one or more ghost entities, a score may be determined for each entity reference linked to a ghost entity, where the score is based at least in part on a match probability between the entity reference and a midpoint of the entity references linked to the ghost entity. The mid-point may be viewed, in one embodiment, as the "average" entity reference for that ghost entity and may include, for example, an average field value for one or more data fields, a weighted average field value, a median field value, a randomly selected field value, and the like. The match probability between the midpoint and the selected entity reference may be based on content weight and/or degree of similarity between one or more field values, as discussed above.

Figure 17:
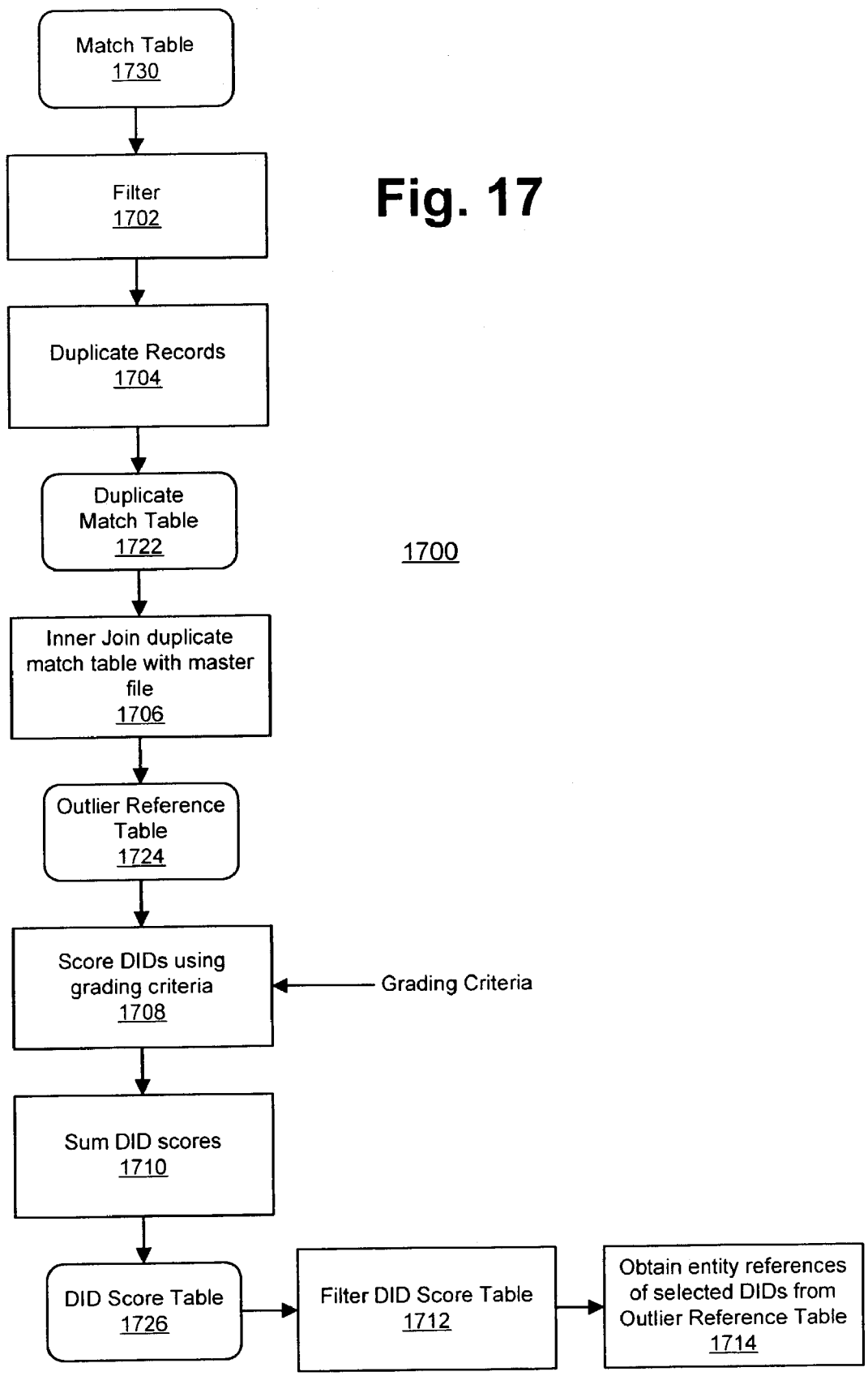
FIG. 17 is a flow chart illustrating an exemplary method for linking outlier entity references to entities in accordance with at least one embodiment of the present invention.

The score for each entity reference linked to a ghost entity then may be summed. Additionally, in at least one embodiment, the scores may be adjusted prior to being summed by one or more grading criteria, as discussed below, where the grading criteria typically represent an entity sought-after or expected and may include one or more particular characteristics of the entity. The ghost entity may be identified as this actual entity when the sum of the scores (or some variant of the sum) is greater than or equal to a certain threshold. The identification of the ghost entity as an actual entity may include associating the DID of one of the entity references linked to the ghost/actual entity with all of the remaining linked entity references. Alternatively, the ghost DID of the ghost entity could be associated with the linked entity references. FIG. 17 illustrates an implementation of the above-described technique.

Referring now to FIG. 17, an exemplary method 1700 for identifying outlying entities is illustrated in accordance with at least one embodiment of the present invention. The exemplary method 1700 commences at step 1702, whereby the match table 1730 (analogous to match table 722, FIG. 7) is filtered using a predetermined minimum match score threshold. In at least one embodiment, this match score threshold is set at a lower value than the match score threshold typically used during method 700 of FIG. 7. A match score threshold used at step 1702 may include, for example, a score of at least 30 (or 30%) whereas the threshold used during method 400 may include, for example, a score of at least 60 (or 60%).

Recall that, in at least one embodiment, the match table may be deduped to eliminate duplicate records. During this dedup process, the record having a higher left DID value than right DID value may be kept while the duplicate record having a lower left DID value than the right DID is discarded (or vice versa) to remove duplicate records. Accordingly, at step 1704, the records of the filtered match table are duplicated so that both forwards and backwards relationships are represented in the resulting duplicated match table 1722. To illustrate, if the match table 1730 included a record having a left DID of 2, a right DID of 1 and a score of 50, after the duplication step 1704 the duplicated match table 1722, in addition to the original record, also would have a record having a left DID of 1, a right DID of 2 and a score of 50. At step 1706, an inner join (or other similar join technique) of the master file with the left DID data field of the duplicated match table 1722 is performed to generate an outlier reference table 1724.

In at least one embodiment, the technique illustrated by method 1700 is based on the premise that the data of the master file has semantic content other than the entity reference and that this additional semantic content may be used to grade the results of the match process to identify outlier entities. This additional semantic content may include a confidence level on one or more of the data fields of the entity references under consideration. For example, if a law enforcement database is utilized to assist in identifying a fugitive described as a thirty-year old white male, a confidence level could be assigned to each identifying feature based on the confidence in the accuracy in the description. To demonstrate, the ethnic description of white could be given a 70% confidence level, the gender description of male could be given a confidence level of 95%, and the age description of 30 years could be given a confidence level of 50%. The confidence levels assigned to the one or more identification terms are herein referred to as the "grading criteria." The grading criteria may be determined in any of a variety of ways. For example, the grading criteria could be determined through statistical analysis, assigned a subjective value by a human operator, and the like.

In at least one embodiment, the additional semantic content of the data is applied at step 1708 by scoring the DIDs represented in the outlier match table 1722 based on the grading criteria. The match score of each record of the outlier match table 1722 may be multiplied by the confidence level assigned to the match rule that resulted in the creation of the record. Using the previous example, a record having a match score of 80 resulting from the match rule of "gender=male" would be multiplied by a confidence level of 95% to generate a resulting total score of 76. The total match score for a given entity reference may be appended to the entity reference in the outlier reference table 1724.

At step 1710, the total match score for each entity reference associated with a particular score are, for instance, summed to generate an overall DID match score. The DID/DID match score pair are then added to a DID score table 1726. At step 1712, the DID score table 1726 is filtered by a predetermined threshold value to obtain those DIDs of the DID score table 1726 having the highest total match score. The threshold may be set at a certain minimum total match score, as a certain top percentage, as a certain number of the highest total match scores, and the like. The DIDs identified via the filter step 1710 generally represent the entities most likely represented by the supplied identification terms. Accordingly, at step 1714, the identified DIDs may be used to identify the corresponding entity references from the outlier reference table 1724.

The exemplary method 1700 may be beneficially illustrated by way of the following example. In this example, assume that a law enforcement agency is seeking to identify a person in connection with a crime. Further assume that the law enforcement agency has information indicating that this person owns three cars, and that the law enforcement agency is 100% certain that this person owns a red car, 80% certain that this person drives a green car, and 60% certain that this person drives a blue car. Table 42 represents an exemplary master file generated from a motor vehicle registration database. Table 43 represents an exemplary match table 1730 generated from Table 42 as a result of steps 702-710 of method 700 (FIG. 7) using name matches and zip code matches.

TABLE 42

| Row No. | DID | First Name | Last Name | Zip code | Car Color |
|---|---|---|---|---|---|
| 1 | 1 | David | Hobbson | 33445 | Red |
| 2 | 2 | D | Hoobson | 33445 | Blue |
| 3 | 3 | David | Hobbson | 33555 | Green |
| 4 | 4 | David | Yates | 33445 | Red |
| 5 | 5 | Dave | Yates | 33447 | Green |

TABLE 43

| Row Number | Left | Right | Score |
|---|---|---|---|
| 1 | 2 | 1 | 50 |
| 2 | 3 | 1 | 40 |
| 3 | 5 | 4 | 60 |
| 4 | 4 | 1 | 30 |

In this example, a minimum score threshold of 30 is used to filter Table 43 (step 1702). However, because all of the records in Table 43 have a match score of at least 30, none of the records are filtered out in this example. Next, the records of Table 43 are duplicated (step 1704) to generate Table 44 (an example of the duplicated match table 1722). The duplicated records are depicted as rows 1, 2, 3, and 7 of Table 44.

TABLE 44

| Row Number | Left DID | Right DID | Score |
|---|---|---|---|
| 1 | 1 | 2 | 50 |
| 2 | 1 | 3 | 40 |
| 3 | 1 | 4 | 30 |
| 4 | 2 | 1 | 50 |
| 5 | 3 | 1 | 40 |
| 6 | 4 | 1 | 30 |
| 7 | 4 | 5 | 60 |
| 8 | 5 | 4 | 60 |

At step 1706, Table 42 is inner joined with the left DID data field of Table 44 to generate Table 45 (an example of the outlier reference table 1724). Row 2, 3, 4, 6, 8, 10, 11 and 13 of Table 45 represent the additional entity references constructed via steps 1702-1706.

TABLE 45

| Row No. | DID | % Score | First Name | Last Name | Zip | Car Color |
|---|---|---|---|---|---|---|
| 1 | 1 | 100 | David | Hobbson | 33445 | Red |
| 2 | 1 (from 2) | 50 | D | Hoobson | 33445 | Blue |
| 3 | 1 (from 3) | 40 | David | Hobbson | 33555 | Green |
| 4 | 1 (from 4) | 30 | David | Yates | 33445 | Red |
| 5 | 2 | 100 | D | Hoobson | 33445 | Blue |
| 6 | 2 (from 1) | 50 | David | Hobbson | 33445 | Red |
| 7 | 3 | 100 | David | Hobbson | 33555 | Green |
| 8 | 3 (from 1) | 40 | David | Hobbson | 33445 | Red |
| 9 | 4 | 100 | David | Yates | 33445 | Red |
| 10 | 4 (from 1) | 30 | David | Hobbson | 33445 | Red |
| 11 | 4 (from 5) | 60 | Dave | Yates | 33447 | Green |
| 12 | 5 | 100 | Dave | Yates | 33447 | Green |
| 13 | 5 (from 4) | 60 | David | Yates | 33445 | Red |

The grading criteria then may be applied to Table 45 (step 1708) to generate Table 46 having the total match scores appended to the entity references of Table 45. Recall that, in this example, the grading criteria is equivalent to the confidence level in the color of the car, where the color red has a confidence level of 100%, the color green has a confidence level of 80% and the color blue has a confidence level of 60%.

In at least one embodiment, the DID score table 1726 (Table 46 in this example) typically is deduped at this point to avoid double counting. Row 4 of Table 46 illustrates the entity reference that typically would be removed.

TABLE 46

| Row Number | DID | % Score | Color Score | Total Score | Car Color |
|---|---|---|---|---|---|
| 1 | 1 | 100 | 100 | 100 | Red |
| 2 | 1 (from 2) | 50 | 60 | 30 | Blue |
| 3 | 1 (from 3) | 40 | 80 | 32 | Green |
| 4 | 1 (from 4) | 30 | 100 | 30 | Red |
| 5 | 2 | 100 | 60 | 60 | Blue |
| 6 | 2 (from 1) | 50 | 100 | 50 | Red |
| 7 | 3 | 100 | 80 | 80 | Green |
| 8 | 3 (from 1) | 40 | 100 | 40 | Red |
| 9 | 4 | 100 | 100 | 100 | Red |
| 10 | 4 (from 1) | 30 | 100 | 30 | Red |
| 11 | 4 (from 5) | 60 | 80 | 48 | Green |
| 12 | 5 | 100 | 80 | 80 | Green |
| 13 | 5 (from 4) | 60 | 100 | 60 | Red |

At step 1710, the total match scores for each of the entity references of a certain DID in Table 46 may be combined to arrive at an overall DID match value for the DID. Table 47 illustrates an exemplary sorted DID score table 1726 resulting from Table 46.

TABLE 47

| Row Number | DID | Total Score |
|---|---|---|
| 1 | 1 | 162 |
| 2 | 4 | 148 |
| 3 | 5 | 140 |
| 4 | 3 | 120 |
| 5 | 2 | 110 |

Table 47 then may be filtered (step 1712) to obtain the highest scored DIDs. In this example, Table 47 is filtered by taking only the highest scored DID: DID 1 having a total score of 162 (represented by row 1 of Table 44). At step 1714, the entity references from Table 45 associated with DID 1 may be used to identify the sought-after person. Table 48 illustrates these entity references. From this table, the law enforcement agency can ascertain that the sought person goes by the names "David Hobbson," "D Hoobson" and "David Yates." It also can be determined that this person resides in the zip code 33445 and possibly in the zip code 33555.

TABLE 48

| Row Number | DID | First Name | Last Name | Zip | Car Color |
|---|---|---|---|---|---|
| 1 | 1 | David | Hobbson | 33445 | Red |
| 2 | 1 (from 2) | D | Hoobson | 33445 | Blue |
| 3 | 1 (from 3) | David | Hobbson | 33555 | Green |
| 4 | 1 (from 4) | David | Yates | 33445 | Red |

The techniques discussed herein preferably are implemented as a computer-readable medium comprising executable instructions adapted to manipulate one or more processors to perform the techniques as described. Further, in at least one embodiment, a parallel processing system may be utilized to perform some or all of the above-described techniques. In particular, the parallel processing systems and methods described in U.S. patent application Ser. No. 10/293, 490 in the name of David Bayliss et al. filed Nov. 14, 2002 (the entire disclosure of which is hereby incorporated herein by reference) may be advantageously implemented to minimize processing effort and time in performing the techniques described herein.

Referring now to FIG. 18, an exemplary database management system 1800 for processing queries to the master file and/or other databases is illustrated in accordance with at least one embodiment of the present invention. In the illustrated example, the system 1800 includes a query server 1802, a query agent 1804, a query builder module 1806, a repository 1810, a naming services module 1812, a scheduling services module 1814, and a computing matrix 1816. The computing matrix 1816 may comprise one or more parallel-processing matrices, such as a global-results processing matrix 1818, a general-purpose query processing matrix 1820, an index-based query processing matrix 1822, and the like. Although the illustrated exemplary embodiment includes one of each type of processing matrices 1818-1822, any number and/or combination of processing matrices may be implemented in accordance with at least one embodiment of the present invention.

In at least one embodiment, the system 1800 is adapted to receive and process one or more queries received from one or more clients using the master file generated using the techniques described above. Queries submitted by clients may include, for example, linking, matching, filtering, scoring, simple searching, neural net scoring, data sorting, merge operations, purge operations, heuristic propensity scoring, data formatting, extract-transform-load (ETL) operations, and the like.

Queries submitted by a client to the query server 1802 preferably are formatted using a query programming language having specified syntax and structure, similar to high-level programming languages such as C++. This programming language, referred to herein as Enterprise Control Language (ECL), can include actions (also referred to as "functions"), constants, variables, expressions and operations, keywords, workflow services, and the like. To illustrate, to generate a list of people sorted by age, the simple query formatted in ECL as "T:=SORT(Person, Person.age)" could be generated, where the attribute "T" represents the resulting record set of people sorted by age, "SORT" represents the sorting function, "Person" represents the record set of people (e.g., the master file), and "Person.age" represents the attribute defining the age field of each "Person" entry of the record set "Person". In other embodiments, the query can be described using any of a variety of techniques and/or programming languages as appropriate. For example, rather than using the ECL language, a client could generate a query using SQL or Perl and submit the SQL/Perl query to the query server 1802 for processing.

In at least one embodiment, the query builder module 1806 is adapted to facilitate the client in generating queries. The query builder module 1806 can include software executed on, for example, client computer 1808 and can implement a graphical client interface (GUI) to receive client input. To illustrate, the query builder module 1806 could include software adapted to receive command-line input in the format of the ECL language or other appropriate programming language. Alternatively, the query builder module 1806 could include a GUI used by the client to enter one or multiple lines of ECL language or other query-based language representing one or more queries. In another embodiment, the query builder module includes an XML template generated by the query server 1802 and displayed on, for example, a web browser at the client computer 1808. Using this displayed template, a client may input one or more queries in the input fields provided.

Regardless of the technique used to input a desired query to the query builder module 1806, the query builder module 1806 may be adapted to generate a representation of the query (query representation 1832) and provide the representation to the query server 1802. The query representation 1832 can take any of a variety of forms. As noted above, in one embodiment the query builder module 1806 is implemented as an XML web page, whereby the client can submit queries to the query server 1802 via a network, such as the Internet. In this case, the query builder module 1806 could receive the query input from the client, generate a hypertext markup language (HTML) or extensible markup language (XML) document representing the query input, and transmit the document to the query server 1802 for processing using, for example, the Simple Object Access Protocol (SOAP). Alternatively, the query builder module 1806 could include a stand-alone software program or integrated utility executed by the client computer 1808, whereby the query provided from a client is transmitted to the query server 1802. For example, the query may be transmitted as a text file having the set of high-level programming language instructions representative of the query (one embodiment of the query representation 1832).

Upon receipt of the query representation 1832 from the query builder 1806, the query server 1802, in one embodiment, is adapted to convert the query representation 1832 into intermediary source code, such as source code segment structured in C, C++, Fortran, Pascal, and the like. The query server 1802 then may compile the intermediary source code to generate one or more executables (i.e., the executable machine code representation of the source code). The executable(s) preferably include dynamically-linked executables, such as dynamic link libraries (DLLs), parts or all of which can be executed dynamically by another executable (such as a homogenous agent, discussed below). Alternatively, the executable(s) could include a fully linked executable or a shared library. For purposes of explanation, a particular implementation of the executable as a DLL is described herein. For explanatory purposes, an exemplary implementation wherein a single DLL representing an entire query is generated and processed by the system 1800 is illustrated herein. Using the guidelines provided herein, those skilled in the art can adapt the system 1800 for generation and processing of multiple DLLs or other types of executables for a single submitted query.

In the course of generating a DLL, the query server 1802 may utilize one or both of the repository 1810 and the naming services module 1812. An ECL-based query submitted by the query builder 1806 may include one or more attributes, where attributes can include client- or system-defined values, actions, expressions, and the like. Attributes also may be nested. To illustrate, consider the following ECL coding sequence for determining those people represented in a financial record set that have more than five credit accounts:

CountTrades:=COUNT(Trades);
IsBigSpender:=CountTrades >5;
OUTPUT(Person(IsBigSpender),
{person.lastname}); . . . .

In the first line, the attribute "CountTrades" implements the action "COUNT" and is defined as a total number of credit accounts (i.e., "Trades") associated with a record entry. In the second line, the attribute "IsBigSpender" implements a boolean expression and the "CountTrades" attribute and is defined as all entries of a record set having more than five credit accounts. In the third line, the "OUTPUT" action is used to output the last names of those entries of the record set "Person" (e.g., the master file) having more than five credit accounts.

In the course of creating the ECL-based, attributes defined in the submitted query can be added to the repository 1810. During the compilation of an ECL-based query into a DLL, the query server 1802 can access the definitions of those attributes included in the ECL-based query from the repository 1810. The repository 1810 therefore can be viewed as a database or library of attributes used by clients to generate ECL queries and by the query server 1802 in the generation of the corresponding DLL.

Domain Name Service (DNS) often is used to translate domain names into Internet Protocol addresses for the corresponding network devices. In a similar manner, the naming services module 1812 is adapted to translate the names of various data sets or databases referenced in a query into the actual location of the referenced name. To illustrate using the previous exemplary ECL code sequence, the query server 1802 could submit the name "Persons" representative of the "persons" data set to the naming services module 1812. The naming services module 1812 could search its database for the physical location of the data set (e.g., a file located at "\datasets\persons.sql") corresponding to the name "Persons" and return this file location to the query server 1802. The query server 1802 then can incorporate the location into the DLL compiled from the submitted query. Alternatively, as discussed in greater detail below, the compiled DLL can include a generic reference that the naming services module 1812 resolves at runtime when the DLL is executed by one or more of the processing matrices 1818-1822. As with the repository 1810, the naming services module 1812 can be implemented in any of a variety of ways, preferably as a SQL or XQL database server.

In at least one embodiment, the system 1800 includes a plurality of query servers 1802 and/or a plurality of query agents 1804 to process multiple queries. The scheduling services module 1814, in one embodiment, is adapted to prevent one or more queries (represented by DLLs) from being submitted to one or more components of the computing matrix 1816 while those components are occupied processing another database operation. Accordingly, the query server 1802 can be adapted to submit a scheduling request to the scheduling services module 1814 after generating a DLL representing a submitted query. The scheduling request can include an estimated execution time of the DLL in whole or in part, a priority indicator, an indicator of the number and/or type(s) of processing matrices needed to process the DLL, and the like. After submitting the scheduling request, the query server 1802 may then submit the DLL (DLL 1850) to the query agent 1804 for processing.

Using the submission request information, the scheduling services module 1814 determines the next available time that the query can be processed and generates a token associated with the scheduling request. The token is provided to the query agent 1804 having the corresponding DLL 1850, either directly or via the query server 1802. The query agent 1804 then informs the scheduling services module 1814 that it has received the token and requests that the scheduling services module 1814 notify the query agent 1804 when it has permission to proceed. At the designated time, the scheduling services module 1814 notifies the query agent 1804 to proceed with the submission of the DLL 1850 to the computing matrix 1816. In the event that the processing of a previously submitted DLL is running ahead of or behind schedule, the scheduling services module 1814 can adjust the submission time of the next DLL accordingly.

In at least one embodiment, the computing matrix 1816 includes one or more types of parallel-processing processing matrices adapted to perform various database operations on the master file. In the illustrated embodiment, the computing matrix 1816 is shown having three processing matrices (or sub-matrices): a general-purpose query processing matrix 1820 adapted to perform database operations on preferably hierarchical data, an index-based query processing matrix 1822 customized for index-based queries, and a global-results processing matrix 1818 adapted to perform various operations on a large amount of data, such as sorting, collating, counting, duplicate record resolution (i.e., "deduping"), joining, appending, merging, purging, non-hierarchical linking, formatting, and the like. The processing matrices 1818-1822 are discussed in greater detail with reference to FIGS. 19-23. Although a particular configuration of processing matrices is illustrated, the computing matrix 1816 can include any number and combination of processing matrices 1818-1822 as appropriate without departing from the spirit or the scope of the present invention.

Depending on the particular query, the query agent 1804 can provide the DLL 1850 to a specific type of processing matrix or the query agent 1804 can use multiple processing matrix types in sequence or in parallel to process the query represented by the DLL 1850. To illustrate, consider a query to a state's motor vehicle registration database (one example of a master file) resulting in a list of all registered drivers who own a black automobile, sorted by last name. This query requires at least two operations: identifying the registered drivers who own a black car in the database and sorting the identified registered drivers by last name. Since the general-purpose query processing matrix 1820, in one embodiment, is particularly well suited for identification analysis, the query agent 1804 can direct the general-purpose query processing matrix 1820 to perform the identification operation of the DLL 1850 and to provide the results to the global-results processing matrix 1818. The query agent 1804 then can direct the global-results processing matrix 1818 to perform the sorting operation of the DLL 1850 on the results generated by the general-purpose query processing matrix 1820. Alternatively, two DLLs could be generated, one representing the identification operation and one representing the sorting operation, the former assigned to the general-purpose query processing matrix 1820 and the latter assigned to the global-results processing matrix 1818. The results (i.e., the sorted list) from the global-results processing matrix 1818 then can be provided back to the query agent 1804 for storage and/or delivery to the client via, for example, the query builder module 1806. In a similar manner, the results from an operation performed by the index-based processing matrix 1822 can be provided to the global-results processing matrix 1818 for additional processing.

In some instances, the query agent 1804 can be adapted to process the DLL 1850 in whole or in part prior to or after receiving permission from the scheduling services module 1814. The processing performed by the query agent 1804 using the DLL 1850, in at least one embodiment, is dependent on the type of query represented by the DLL. For relatively simple queries involving a few database operations on a relatively small data set, the query agent 1804 can be adapted execute the DLL 1850 itself. For more complex queries, the query agent 1804 is adapted to submit the DLL 1850 or some derivative of the DLL 1850 to one or more of the processing matrices 1818-1822 of the computing matrix 1816 for processing. The query agent 1804 also can be adapted to report various events to the scheduling services module 1814, such as time of submission of the DLL 1850, status of the processing of the DLL 1850, time of completion, errors, and the like.

The query agent 1804 can submit the DLL 1850 to the processing matrices 1818-1822 of the computing matrix 1816 in a variety of ways. For queries involving the global-results processing matrix 1818, the query agent 1804 can provide the DLL 1850 directly to the processing matrix 1818. In at least one embodiment, however, the general-purpose query processing matrix 1820 and the index-based query processing matrix 1822 are adapted simulate the operation of, for example, a SQL server wherein the query agent 1804 submits an SQL or XQL query to one or both of the processing matrices 1820, 1822 for execution. The SQL/XQL query can be embedded in the DLL 1850 by the query server 1802, extracted by the query agent 1804, and then provided to the processing matrix 1820/processing matrix 1822. Upon receipt of the SQL/XQL query, the master node of the processing matrix 1820/1822 is adapted to generate another executable (e.g., another DLL) from the embedded SQL/XQL instructions. The master node then provides the newly generated DLL to a subset of the processing nodes of the processing matrix 182/1822 for execution. Alternatively, the query agent 1804 can be adapted to extract the embedded SQL/XQL instructions from the DLL 1850 and compile a new DLL 1852 from the extracted SQL/XQL instructions. The DLL 1852 then may be submitted to the processing matrix 1820/processing matrix 1822 for execution.

The results of a database operation by the computing matrix 1816 can be managed in a variety of ways. Depending on the query, the results can remain in data storage or memory of the processing matrices, especially when the results are known or expected to be used in subsequent database operations. The results can be forwarded to the query agent 1804 for further processing and/or the results can be stored in a common work-unit storage module (as discussed in greater detail with reference to FIG. 2). The results also could be transmitted back to the client by the query agent 1804 via, for example, as a file transferred over a network.

Once the execution of a submitted query has been completed, the query agent 1804 can be adapted to report to the scheduling services module 1814. The scheduling services module 1814 may adjust the scheduling of subsequent queries, if necessary, and then notify the next scheduled query server that its DLL can now be submitted to the computing matrix 1816 for processing. Part of the scheduling process may include determining which processing matrices of the computing matrix 1816 should be used for the optimum utilization of the system. To illustrate, the computing matrix 1816 may implement two global-results processing matrices 1818, each having five nodes, a global-results processing matrix 1818 having 20 nodes, and a global-results processing matrix 1818 having one hundred nodes. It will be appreciated that the use of the hundred node processing matrix 1818 to perform a database operation suitable for a five node processing matrix 1818 is relatively inefficient or at least consumes system resources that could be used to satisfy another query. Accordingly, the scheduling services module 1814 can be adapted to analyze the processing demands of all submitted requests to determine the most appropriate allocation of the database operations among the processing matrices as well as the timing of their submission.

Referring now to FIG. 19, an exemplary method of operation of the system 1800 of FIG. 18 is illustrated in accordance with at least one embodiment of the present invention. The exemplary method 1900 initiates at step 1902 wherein a query is generated and submitted to the query server 1802. As note above, the query preferably is represented as ECL source code generated using, for example, the query builder module 1806 (FIG. 1). Alternatively, the query can be structured using one or more conventional programming languages useful in programming queries, such as SQL, XQL, Java, Perl, C, C++, Fortran, and the like. After the query is generated, it can be formatted into a format suitable for transmission to the query server 1802 (FIG. 1), such as an XQL, XML, HTML file, or text file. The formatted query then is transmitted to the query server 1802.

At step 1904, the query server 1802 receives the query and compiles a DLL 1930 (or multiple DLLs) from the submitted query. Step 1904 of the method 1900 continues with the query server 1802 providing the DLL 1930 to one or more of the processing matrices 1818-1822 of the computing matrix 1816 (FIG. 1) via the query agent 1804. Those processing matrices of the computing matrix 1816 are selected to receive the DLL 1930, as well as the order in which the processing matrices receive the DLL 1930, based at least in part on the query submitted. Should the query involve relatively minimal processing, such as searching for the lowest value of 1,000 data entries, the query agent 1804 can process the DLL 1930 by itself at step 1906. As such, the query agent 1804 can be viewed as a relatively low-powered component of the computing matrix 1816. The results of the execution of part or all of the DLL 1930 by the query agent 1804 are processed at step 1908 and, at step 1910, the results may be provided to the client via, for example, the query builder module 1806 (FIG. 1), stored to disk or tape, provided to one or more of the processing matrices for additional processing, and the like.

In some instances, the submitted query can involve database operations using certain fields that are indexed by the index-based query processing matrix 1822 (FIG. 18). Accordingly, the query agent 1804 can provide the DLL 1930 to the index-based query processing matrix 1822 at step 1910. The index-based query processing matrix 1822 can provide the results of the database operation(s) to the global-results processing matrix 1818 at step 1918 and/or provide the results to the query agent 1804 at step 1912.

Some or all of the operations of a submitted query may involve the analysis of relatively large amounts of data. Examples of such database operations can include, but are not limited to, sorting, collating, counting, cleansing, duplicate record resolution (i.e., "deduping"), joining, appending, merging, purging, cleansing, non-hierarchical linking, formatting, and the like. In this case, the query agent 1804 can provide the DLL 1930 to the general-purpose query processing matrix 1820 (FIG. 1) at step 1914, whereupon the DLL 1930 is executed by the processing matrix 1820. The general-purpose query processing matrix 1820 is discussed in greater detail with reference to FIGS. 20 and 21.

As with the index-based query processing matrix 1822, the results of the execution of the DLL 1930 at the general-purpose processing matrix 1820 can be stored to disk or tape, provided to the client via the query agent 1804, and the like (step 1916). In some instances, however, it may be desirable to process the query on multiple processing matrices, where the results generated by one processing matrix are provided to another for additional processing. Particularly, many queries involve one or more database operations performed by the general-purpose query processing matrix 1820 and/or the index-based query processing matrix 1822 followed by one or more database operations performed by the global-results processing matrix 1818 on the results from the processing matrices 1820/1822. To illustrate, an exemplary submitted query could include a sequence of two database operations. The first operation could include identifying and returning the entity references linked to those people having an age greater than thirty years from a criminal records database. The second operation could include sorting the identified entity references by last name. Accordingly, the identifying operation could be performed by the general-purpose query processing matrix 1820 and the identified results provided to the global-results processing matrix 1818 in no particular order. The global-results processing matrix 1818 then could perform the sort operation on the results provided from the processing matrix 1820.

Accordingly, at step 1920 the results from one or more database operations performed by the general-purpose query processing matrix 1820 are provided to the global-results processing matrix 1818. The results can be provided in any of a variety of ways. Preferably, the results stored in the memory of a node of the general-purpose query processing matrix 1820 are transferred to the disk storage of a corresponding node of the global-results processing matrix 1818. Alternatively, the results could be transferred to storage and the general-purpose query processing matrix 1820 could provide a reference to the storage location of the results to the global-results processing matrix 1818.

In addition to, or rather than, using two or more types of processing matrices to process a query, the system 1800 can be adapted to process the query using two or more of the same type of processing matrices in sequence or in parallel. For example, a query could include two database operations, one operation to identify entity references linked to entities having a certain characteristic in one master file, and the other operation to identify entity references linked to an entity having a certain characteristic in another master file. Accordingly, the query agent 1804 could provide the DLL 1930 to one processing matrix 1820 to identify and output the appropriate entity references from the first master file and provide the DLL 1930 to another processing matrix 1820 to select the entity references from the second master file. In another example, a query could include two database operations, one operation to identify entity references of a large master file having a certain characteristic, and another operation to identify those entity references identified by the first operation as having a second characteristic. In this case, the query agent 1804 could be adapted to supply the DLL 1930 to a first processing matrix 1820 having a relatively large number of processing nodes to identify the entity references having the first characteristic. The identified entity references and the DLL 1930 then could be supplied to a second processing matrix 1820 to identify those entity references from the first processing matrix 1820 that have the second characteristic.

Some or all of the database operation(s) of a submitted query may be beneficially performed by the global-results processing matrix 1818, either separately or in conjunction with the results generated by another processing matrix of the computing matrix 1816. Accordingly, the query agent 1804 can provide the DLL 1930 to the global-results processing matrix 1818. At step 1922, the global-results processing matrix 1818 can execute some or all portions of the DLL 1930 using the results generated by another processing matrix, data previously distributed to the nodes of the global-results processing matrix 1818, or a combination thereof. At step 1924, the results of the execution of the DLL at the global-results processing matrix 1818 can be stored to disk or tape, provided to the client via the query agent 1804, provided to another processing matrix of the computing matrix 1816, and the like. The operation of the global-results processing matrix 1818 is discussed in greater detail with reference to FIGS. 22 and 23.

Figure 20A:
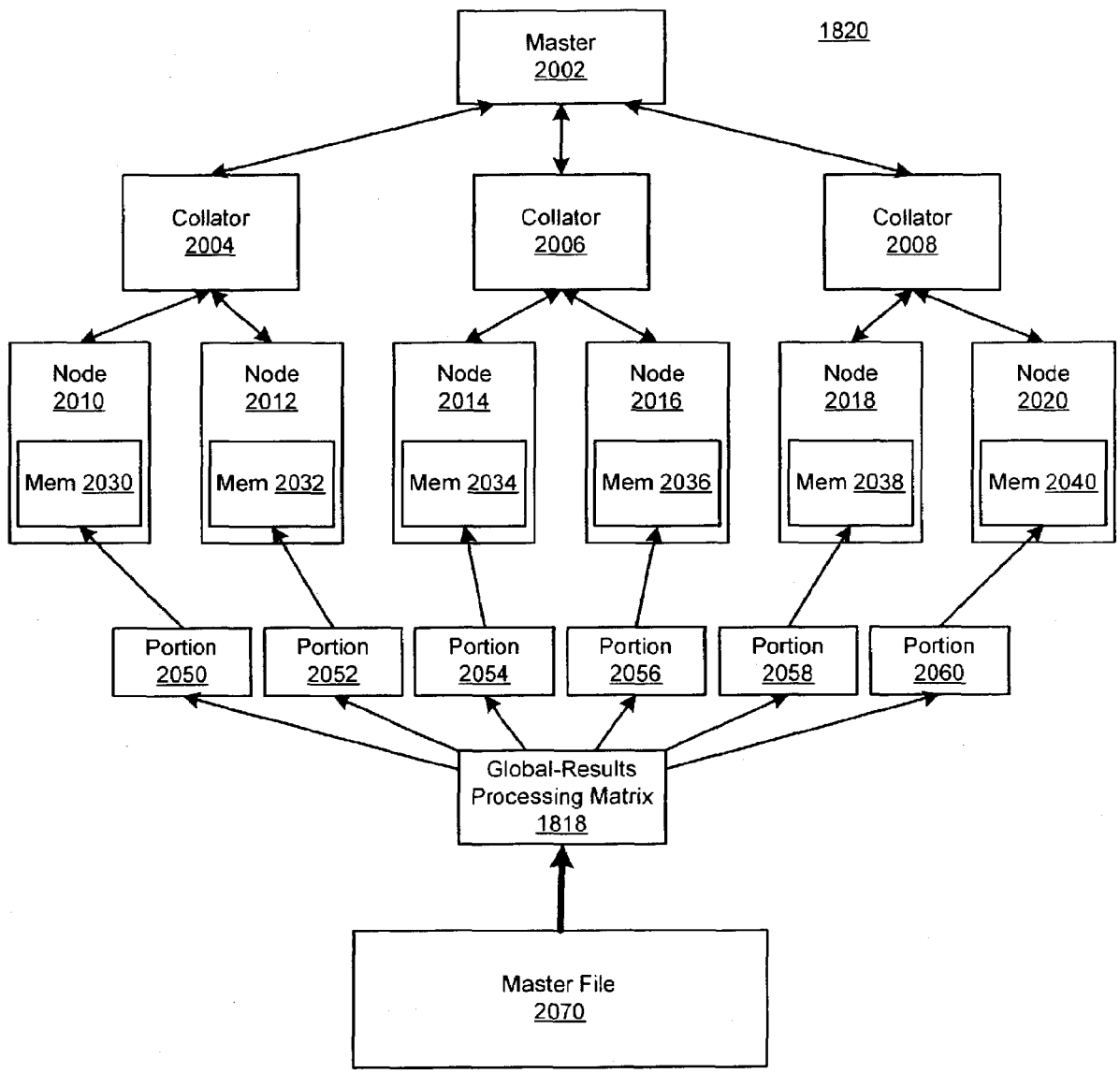
Figure 21:
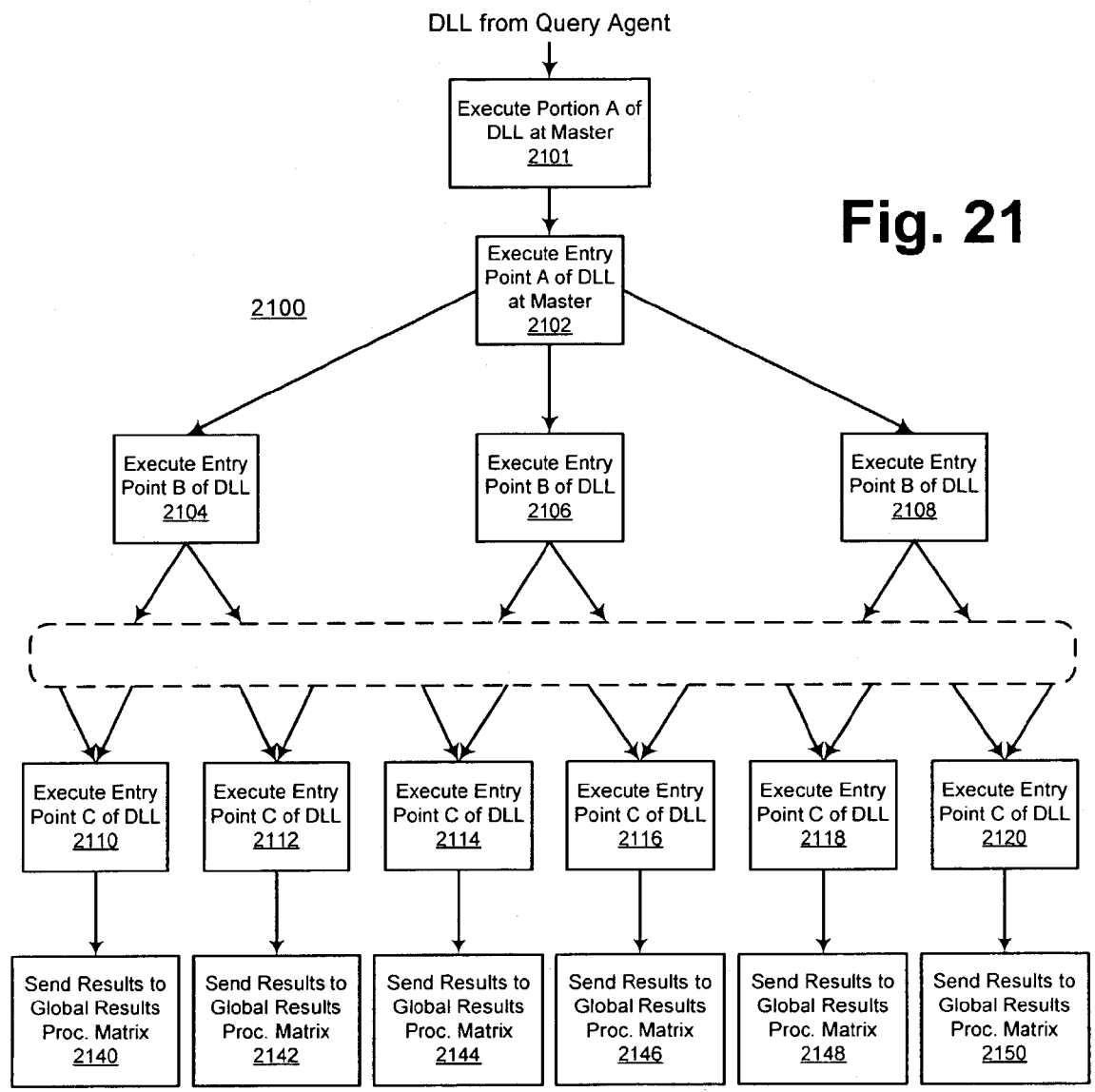
FIG. 21 is a flow diagram illustrating an exemplary operation of the general-purpose query processing matrix of FIGS. 20A and 20B in accordance with at least one embodiment of the present invention.

Referring now to FIGS. 20A, 20B, and 21, an exemplary implementation and operation of the general-purpose query processing matrix 1820 are illustrated in accordance with at least one embodiment of the present invention. In the illustrated embodiment of FIG. 20A, the processing matrix 1820 includes a plurality of interconnected processing nodes 2002-2020 operating in parallel. Each node includes at least one processor and memory accessible by the processor(s) of the node. Each node also may include one or more storage devices, such as disk storage, tape drives, and the like. In a preferred embodiment, a processing node includes a common general-purpose, single-user microcomputer configuration having a motherboard, one or more processors, random access memory (RAM), one or more disk drives, a network interface, as well as various support components, such as read only memory (ROM), direct memory access (DMA) controller, various busses, and the like. An exemplary implementation could include, for example, a general-purpose, single-user microcomputer motherboard having an Intel® Pentium® III processor and 2 GB of RAM; two 32 GB EIDE or SCSI hard disk drives; and an Ethernet network interface card (NIC).

The nodes of the processing matrix 1820 preferably are logically arranged in an n-ary tree structure of N levels. The node at the root of the tree is designated as the master node and each node at the bottom level of the tree structure is dedicated as a slave node. Those nodes at intermediate levels of the tree between the top level and the bottom level are designated as collator nodes. In the illustrated example, the processing matrix 1820 includes three levels, where the master node 2002 is located at the first level, collator nodes 2004-2008 are located at the second level, and slave nodes 2010-2020 located at the third level. Alternatively, if the processing matrix 1820 included, for example, four levels, the nodes 2010-2020 also would be collator nodes and the children of the nodes 2010-2020 would then be the slave nodes. Note that although FIGS. 20A, 20B illustrates an exemplary implementation of the processing matrix 1820 having a three-level tree structure where the parent to child ratio for the master node is 1:3 and 1:2 for the master node collator nodes, respectively, any number of tree levels and/or any ratio or combination of ratios of parent node to children nodes may be implemented without departing from the spirit or the scope of the present invention.

In one embodiment, the master node 2002 is adapted to prepare the processing matrix 1820 for processing a DLL/SQL query received from the query agent 1804; to distribute the DLL to its children; and to process the results supplied from its children. The slave nodes of the processing matrix 1820 may be viewed as the "workhorses" of the processing matrix 1820 by performing the processing-intensive operations of the submitted query. Each collator node between the slave nodes and the master nodes manages the results from its children and then provides the results of its processing to its parent node, which may include another collator node or the master node. The master node then processes the results from its children nodes.

In at least one embodiment, each node of the processing matrix 1820 executes the same software application, referred to herein as a "homogenous agent" or "HomAgent". In one embodiment, the HomAgent is adapted to receive a DLL; dynamically link to a specified portion of the DLL while operating; and execute the specified portion of the DLL. It will be appreciated, however, that after executing multiple DLLs in this manner, there is the potential for corruption of the memory space of the HomAgent. Accordingly, in another embodiment, rather than linking to and executing the specified portion, the HomAgent invokes another process to link to and execute the specified portion of the DLL. For ease of discussion, reference to the HomAgent executing a DLL or performing another act also extends to the execution of the DLL or the execution of the act by a process invoked by the HomAgent, unless otherwise noted.

The relationship between the HomAgent and the DLL can be viewed as analogous to the relationship between, for example, a word processor application and a device driver (i.e., a type of DLL) for a printer. When the word processor is directed to output a document to a printer for printing, the word processor invokes generic print commands. These generic print commands in turn are dynamically linked to the printer-specific device driver that directs the operation of the printer. As such, the word processor can be adapted to print to a plurality of different printers by engaging device drivers specific to each printer. In the same manner, the HomAgent allows each node to perform a wide variety and combination of operations by using generic commands that are dynamically linked to specific portions of the DLL. The operations coded in different entry portions of the DLL determine the specific operations performed by a particular HomAgent.

In at least one embodiment, each slave node 2010-2020 operates essentially as a separate database management system on a respective portion of one or more master files (illustrated as master file 2070). Accordingly, in one embodiment, the global-results processing matrix 1818 segments the master file into separate database portions 2050-2060 and then distributes the portions 2050-2060 among the slave nodes 2010-2020 prior to the processing of one or more database operations on the master file. Any of a variety of distribution techniques may be implemented to distribute the data of the master file. The data of the master file may be, for example, equally distributed among the nodes 2010-2020 by providing the first x entity references of the master file to node 2010, the next x entity references of the master file to the node 2012, and so on. In this example, x represents the total number of entity references divided by the number of slave nodes (six in this case), across which the entity references are to be distributed.

In many instances, however, it is desirable to randomly, rather than sequentially, distribute the data of the master file across the nodes 2010-2020. Accordingly, the global-results processing matrix 1818 can be adapted to use of one or more hash functions on one or more fields of the records of the master file. For example, the master file could represent a credit history database, each entity reference of the credit history database having a social security number field, a name field, an address field, and a number of credit-related fields. In this example, the entity references could be distributed among the nodes 2010-2020 using a hash function keyed to the social security number associated with each record and the DID associated with each record. The distribution of the master file is illustrated in greater detail with reference to FIG. 25.

In at least one embodiment, the data portions 2050-2060 of the master file may be stored in the memory of the corresponding slave node (memory 2030-2040), which preferably comprises random access memory (RAM). The slave nodes then may perform database operation(s) using the data distributed into their memories. It will be appreciated that memory accesses typically are much faster than disk storage accesses, and are often at least two to three orders of magnitude faster. Accordingly, database operations performed by the slave nodes typically can be performed much faster than those performed by conventional database query systems that process queries from data stored in non-volatile storage, such as hard disk, tape, optical disk, and the like. The distribution of data into node memory from one or more databases is discussed in greater detail below with reference to FIG. 25.

FIGS. 20B and 21 illustrate an exemplary operation of the general-purpose query processing matrix 1820. Using the exemplary method 1900 (FIG. 19), the query server 1802 may generate a DLL 2000 and provide the DLL 2000 to the master node 2002 of the processing matrix 1820. In the illustrated example, the DLL 2000 includes three portions A-C, each portion to be executed by processing nodes of a specified level of the tree. The HomAgent at the master node 2002 (or a process invoked by the HomAgent), upon receipt of the DLL 2000, is configured to execute portion A of the DLL 2000 (step 2101, FIG. 21). Portion A may direct the HomAgent of the master node 2002 to generate a new DLL from SQL instructions embedded in the DLL 2000 and provide the new DLL to the collators 2004-2008 (step 2102, FIG. 21). Alternatively, portion A may direct the HomAgent of the master node 2002 to directly transfer a copy of the DLL 2000 to each of the collators 2004-2008. For ease of discussion, subsequent reference to the DLL 2000 refers to either the original DLL 2000 from the query agent 1804 or the DLL 2000 generated by the master node 2002 from the original DLL unless otherwise indicated.

Upon receipt of the DLL 2000 (or a newly generated DLL), the HomAgent at each collator node 2004-2008 is adapted to execute portion B of the DLL 2000 substantially in parallel (steps 2104-2108, FIG. 21), where portion B may direct the HomAgent of each collator node 2004-2008 to provide a copy of the DLL to each of the collator node's children nodes. The step of providing the DLL from parent node to its children nodes is repeated until the DLL is received by the slave nodes at the lowest level of the tree, in this case, the slave nodes 2010-2020. The HomAgent at each of the slave nodes 2010-2020, in turn, is configured to execute portion C of the DLL 2000 substantially in parallel (steps 2110-2120, FIG. 21). In this case, the portion C of the DLL 2000 represents the one or more database operations to be performed by the slave nodes 2010-2020 on their respective database portions. This portion of the DLL typically includes the processor-intensive operations of the submitted query, such as performing complex calculations, locating certain data in the data set at each node, evaluating complex boolean expressions, and the like, all on a relatively large number of data set entries.

In one embodiment, the slave nodes 2010-2020 transmit their results in parallel to one or more the global-results processing matrices 1818 (steps 2140-2150, FIG. 21). As discussed in greater detail below, in one embodiment the global-results processing matrix 1818 is implemented as a two-level tree having a single master node and a plurality of slave nodes. Accordingly, the slave nodes 2010-2020 of the general-purpose query processing matrix 1820 can be adapted to directly transfer their results to one or more slave nodes of the global-results processing matrix 1818. The results from a slave node of the general-purpose query processing matrix 1820 may be allocated to the slave nodes of the global-results processing matrix 1818 in any of a variety of ways. With consideration to the storage capacity of the slave nodes of the processing matrix 1818, the results from each of slave nodes 2010-2020 can be distributed among some or all of the slave nodes of the processing matrix 1818, all of the results could be concentrated in one or more slave nodes of the processing matrix 1818, subsets of the slave nodes 2010-2020 could be associated with each of the slave nodes of the processing matrix 1818, and the like.

Method 2100 typically is implemented in a query wherein the results of one or more database operations by the general-purpose query processing matrix 1820 receive further processing by the global-results processing matrix 1818. To illustrate, consider the following exemplary query:

j=JOIN(Persons.age >20, Cars.color="blue");

where the operation "JOIN" results in the generation of a new dataset "j" that represents the union of the entries of the dataset "Persons" having an "age" value greater than 20 and those entries of the "Cars" dataset having a "color" value equal to "blue". In this example, the computing matrix 1816 of system 1800 (FIG. 1) includes two general-purpose query processing matrices 1820 and a global-results processing matrix 1818. Accordingly, the exemplary query above could be constructed by the query server 1802 (FIG. 1) into three database operations:

FETCH(Persons, Persons.age >20, Query Processing Matrix 1);

FETCH(Cars, Cars.color="blue", Query Processing Matrix 2);

JOIN(j, Global-Results Processing Matrix 1); . . . .

The first "FETCH" operation being assigned for processing by one of the general-purpose query processing matrices 1820 and the second "FETCH" operation being assigned for processing by the other general-purpose query processing matrices 1820. The results of the "FETCH" operations by the processing matrices 1820 are provided to the global-results processing matrix 1818, whereupon the global-results processing matrix joins the results into a single data set "j".

The operation of the processing matrix 1820 may be better understood by considering the following example. In this example, a query for the last names of the ten oldest people in a motor vehicle registration database of 60,000 entries (one example of a master file) is submitted to the processing matrix 1820. At a prior time, the 60,000 records of the master file are randomly, but evenly, distributed among the memories 2030-2040 of the slave nodes 2010-2020, each memory storing 10,000 entity references. A DLL 2000 representing the query is generated by the query server 1802 (FIG. 1) and then provided to the processing matrix 1820, where the DLL 2000 then is distributed down the tree levels of the processing matrix 1820 to the HomAgents of the slave nodes 2010-2020. Upon receipt of the DLL 2000, the HomAgents of the slave nodes 2010-2020 (or processes spawned by the HomAgents) each execute the portion of the DLL 2000 associated with the slave nodes, whereby each HomAgent is directed by the portion of the DLL 2000 to identify the ten oldest people from the 10,000 entity references stored in the memory of the slave node. Each slave node returns ten entity references corresponding to the ten oldest people in the slave node's portion of the database to its parent collator node.

The results from the slave nodes are stored in the memory of the parent collator node. The HomAgents at the collator nodes 2004-2008 then each execute the collator portion of the DLL 2000 substantially in parallel, whereby the HomAgent is directed to identify and return ten entity references corresponding to the ten oldest people of the twenty entity references received from its child slave nodes (ten entity references from each slave node). The identified entity references of the ten oldest people at each collator then may be stored in the memory of the master node 2002. As directed by the master node entry portion of the DLL 2000, the HomAgent at the master node 2002 then may identify the ten entity references corresponding to the ten oldest people of the thirty entries received from the collator nodes 2004-2008 and provide these entities to the query agent 1804 for transmission to the client. The master node portion of the DLL 2000 also could direct the HomAgent of the master node 2002 to perform one or more additional operations on the ten entity references before transmitting them to the query agent 1804, such as sorting the ten entity references by last name or reformatting the entity references into a client-specified format.

Figure 22A:
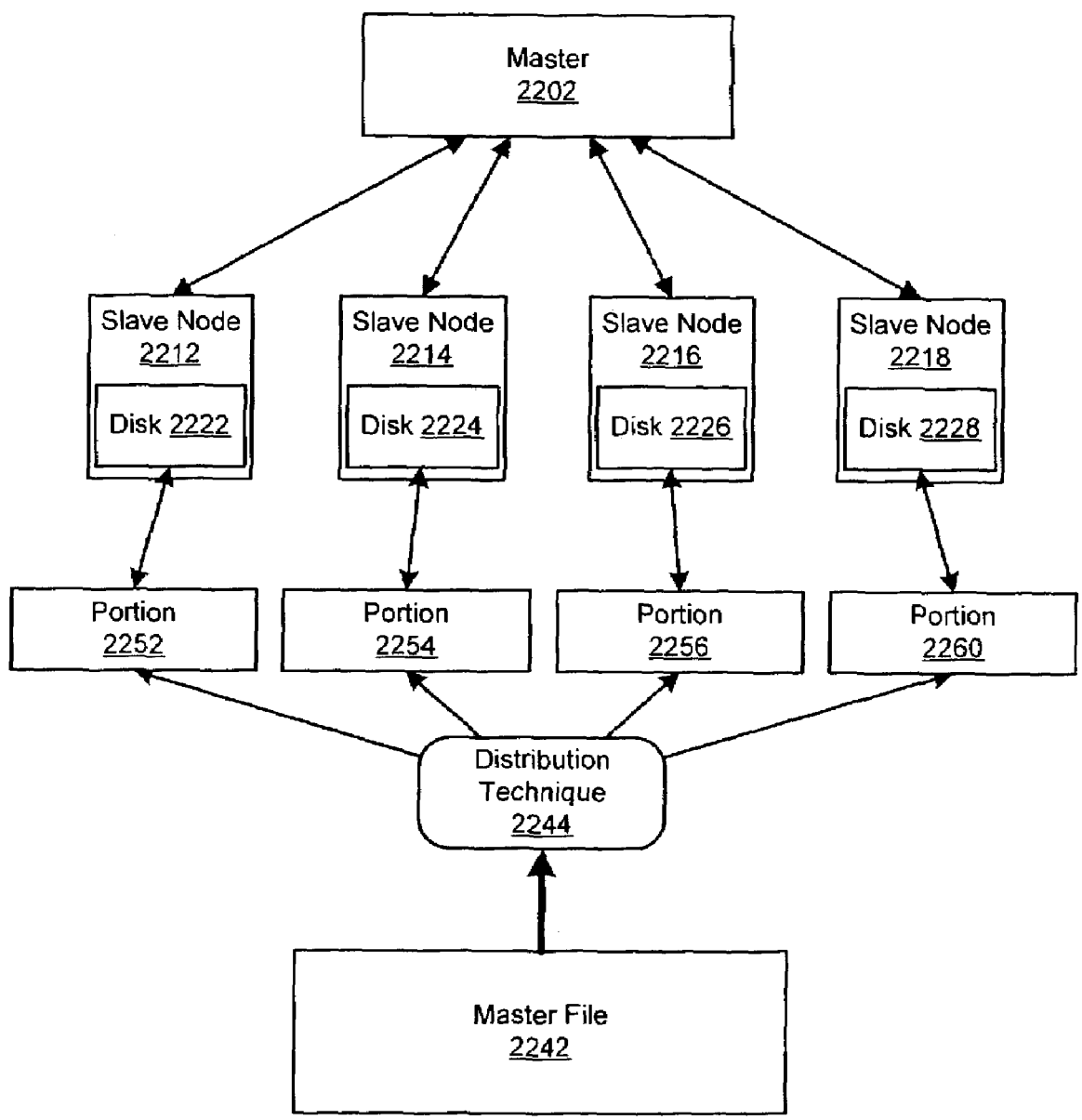
FIGS. 22A and 22B are schematic diagrams illustrating an exemplary global-results processing matrix of the system of FIG. 1 in accordance with at least one embodiment of the present invention.

Referring now to FIGS. 22 and 23, an exemplary implementation and operation of the global-results processing matrix 1818 is illustrated in accordance with at least one embodiment of the present invention. In the illustrated embodiment of FIG. 22, the global-results processing matrix 1818 includes a bi-level tree architecture having a master node 2202 connected to one or more slave nodes 2212-2218. Additionally, each slave node preferably is connected to at least one other slave node via a network and more preferably is connected to every other slave node of the processing matrix 1818. As with the processing matrix 1820, in at least one embodiment, each processing node of the processing matrix 1818 executes the same HomAgent software application.

As noted above, in one embodiment, the results generated by one or more processing matrices 1820/1822 may be stored to the slave nodes 2212-2218 for further processing by the global-results processing matrix 1818. Alternatively, in one embodiment, the master file (illustrated as master file 2242) may be segmented into separate database portions 2252-2260 and the portions distributed among the slave nodes 2212-2218 prior to the processing of one or more database operations on the master file. Any of a variety of distribution techniques 2244 may be implemented to distribute the data of the master file, such as randomly distributing the records of the master file using, for example, a hash function.

Rather than storing the master file portions or query results in the memory at the slave nodes 2212-2218 like the processing matrix 1820 (FIG. 7), in at least one embodiment, the data portions 2252-2260 of the master file and/or query results from slave nodes of matrices 1820/1822 are stored on a storage device of the corresponding slave node (disk storage 2222-2228), such as on a disk drive, tape drive, and the like. The slave nodes then perform database operation(s) using the data stored in the storage devices. While accessing data from a storage device typically is considerably slower than memory data accesses, it will be appreciated that storage devices typically are capable of storing considerably larger amounts of data than typical RAM memories. Further, for equal storage capacity, disk storage is considerably cheaper than memory technologies. Accordingly, the slave nodes 2212-2218 can store considerably larger data portions using disk storage 2222-2228 than the slave nodes 2010-2020 of the processing matrix 1820 (FIG. 20) implementing memory 2030-2044 to store all or a significant amount of their respective database portions. The distribution of data into node disk storage from one or more databases is discussed in greater detail below with reference to FIG. 25.

Figure 22B:
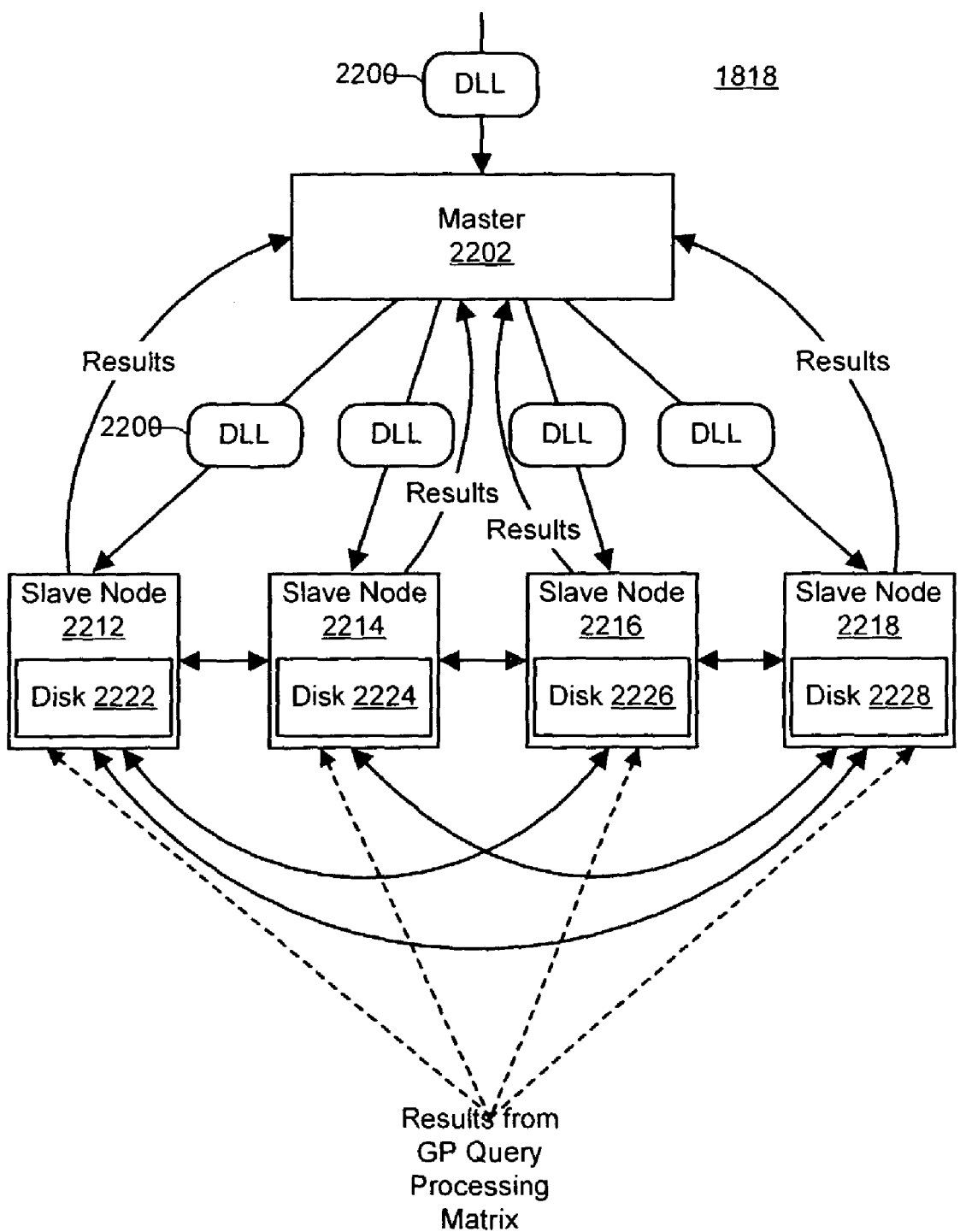
Figure 23B:
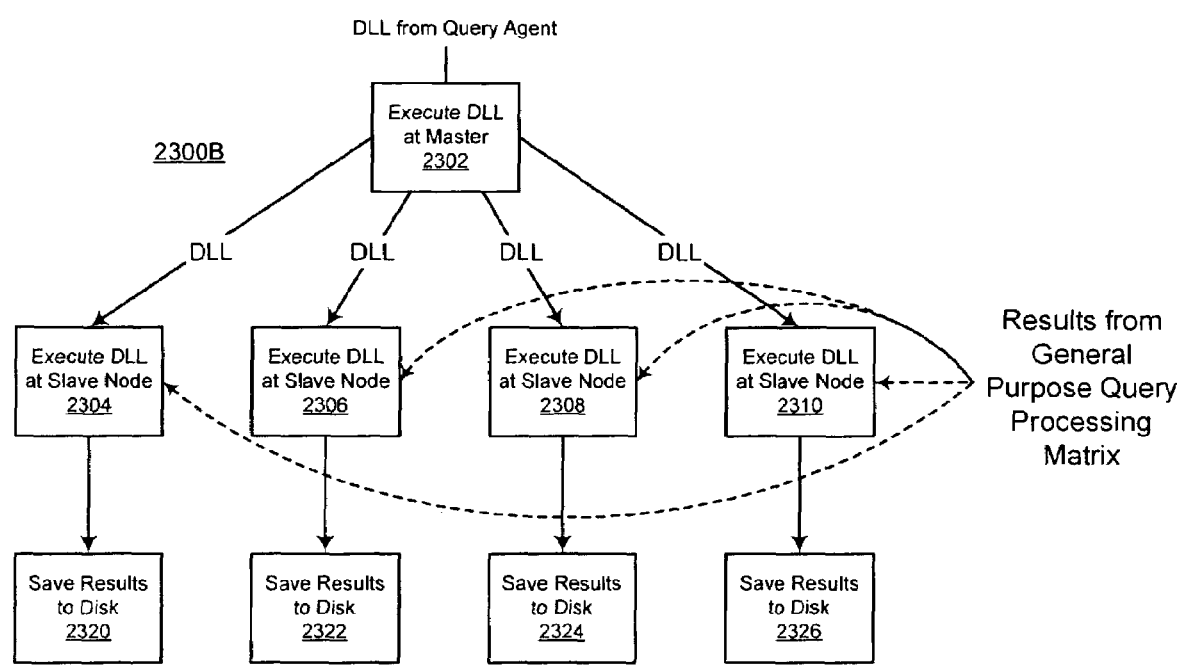

Referring now to FIGS. 22B, 23A and 23B, exemplary operations of the global-results processing matrix 1818 are illustrated. As with the master node 2002 of the processing matrix 1820 (FIG. 20), the master node 2202 of the processing matrix 1818 can be adapted to receive a DLL 2200 having portions A and B from a query agent 1804 (FIG. 1). The HomAgent at the master node 2002 may execute portion A of the DLL 2200 and, in the process of execution, distribute a copy of the DLL 2200 to the slave nodes 2212-2218 (step 2302, methods 2300A and 2300B). The HomAgents for the slave nodes 2212-2218 each then may execute portion B of the DLL 2200 (steps 2304-2310, methods 2300A and 2300B), where portion B represents the one or more database operations to be performed on the database portions stored in the disk storage 2222-2228 of the slave nodes. Recall that in some instances, the database operations performed by the slave nodes 2212-2218 may be performed, in whole or in part, on the results from one or more general-purpose query processing matrices 1820 and/or index-based query processing matrices 1822.

For some database operations, the results of the execution of the assigned DLL portion are provided to the master node 2202 for additional processing (step 2312, method 2300A). The master node 2202 then may distribute the results to the client via, for example, the query builder 1806 (step 2316, method 2300A). For example, certain database operations that are expected to return a relatively small amount of data may be returned via the master node 2202. Alternatively, the slave nodes 2212-2218 may be adapted to directly store their query results at one or more data stores (step 2314).

The transfer of the raw results to the client may prove unduly burdensome for some database operations or the results of one database operation may be used subsequently by another database operation at the global-results processing matrix 1818. Accordingly, in one embodiment, the results of these types of queries are stored to non-volatile storage (e.g., disk drives 2222-2228) of the slave nodes 2212-2218 (steps 2320-2326, method 2300B).

In at least one embodiment, a significant difference between the global-results processing matrix 1818 and the general-purpose query processing matrix 1820 is that data operated on by the general-purpose query processing matrix 1820 is stored in memory prior to processing of a submitted DLL, whereas the global-results processing matrix 1818 can be adapted to distribute data from the non-volatile storage to the memory of the slave nodes 2222-2228 depending on the nature of the database operation. As a result, the general-purpose query processing matrix 1820 may be able to process more quickly due to the relative speed of memory accesses. However, because the data typically must be in the memory of the nodes prior to executing a database operation, the general-purpose query processing matrix 1820 typically is limited to performing operations on hierarchical data, thereby ensuring that related data is on the same node. Conversely, the global-results processing matrix 1818 operates at a slower speed due to the delay in non-volatile storage accesses, but generally is not constrained to only hierarchical data, as the data may be distributed from the non-volatile storage of each slave node to other slave nodes or from external storage to the slave nodes.

Figure 24:
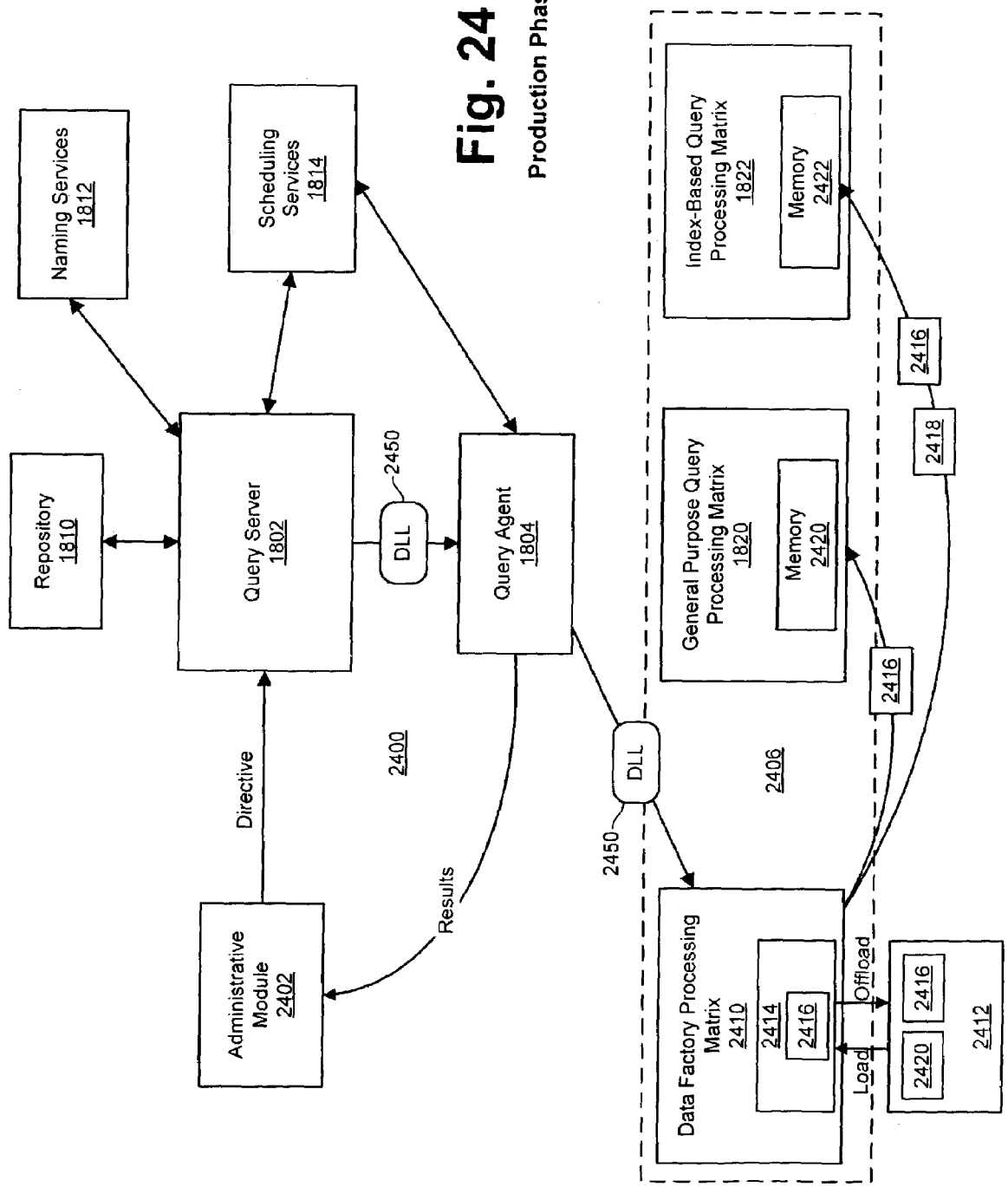
FIG. 24 is a schematic diagram illustrating an exemplary system for distributing database data within the system of FIG. 18 in accordance with at least one embodiment of the present invention.

Referring now to FIG. 24, an exemplary production phase system 2400 for use in building and preparing the system 1800 of FIG. 18 is illustrated in accordance with at least one embodiment of the present invention. The illustrated exemplary system 2400 includes the query server 1802, the query agent 1804, the repository 1810, the naming services module 1812, and the scheduling services module 1814 of the system 1800 of FIG. 18. The system 2400 further may include an administrative module 2402 and production matrix 2406 comprising one or more of the processing matrices 1818-1822 of the computing matrix 1816 of the system 1800. The production matrix 2406 further may include a data factory processing matrix 2412 connected to a staging zone 2412.

As demonstrated above, the system 1800, in one embodiment, is adapted to receive a query from a client, generate a DLL or other executable representative of the query, and process the DLL or other executable using one or more parallel processing matrices of the computing matrix 1816. It may be necessary, however, to distribute the data of the master file(s) to the nodes of the processing matrices 1820, 1822 prior to the processing of any of the queries. In at least one embodiment, the production phase system 2400 is adapted to distribute data to one or both of the processing matrices 1820, 1822. In many cases, the data to be processed for queries may come from one or more data sources, may be an update to an existing master file, and the like. Accordingly, the system 2400 can be adapted to process incoming data to generate one or more master files and then distribute the master files(s) to the processing matrices 1820, 122 as appropriate. To eliminate the complexities of inserting and modifying data in a database distributed across multiple nodes, the system 1800 of FIG. 1 preferably is a "read-only" database system whereby query operations may identify and copy information from the database portions distributed among the nodes, but the new data cannot be inserted nor can data be materially altered.

Figure 25:
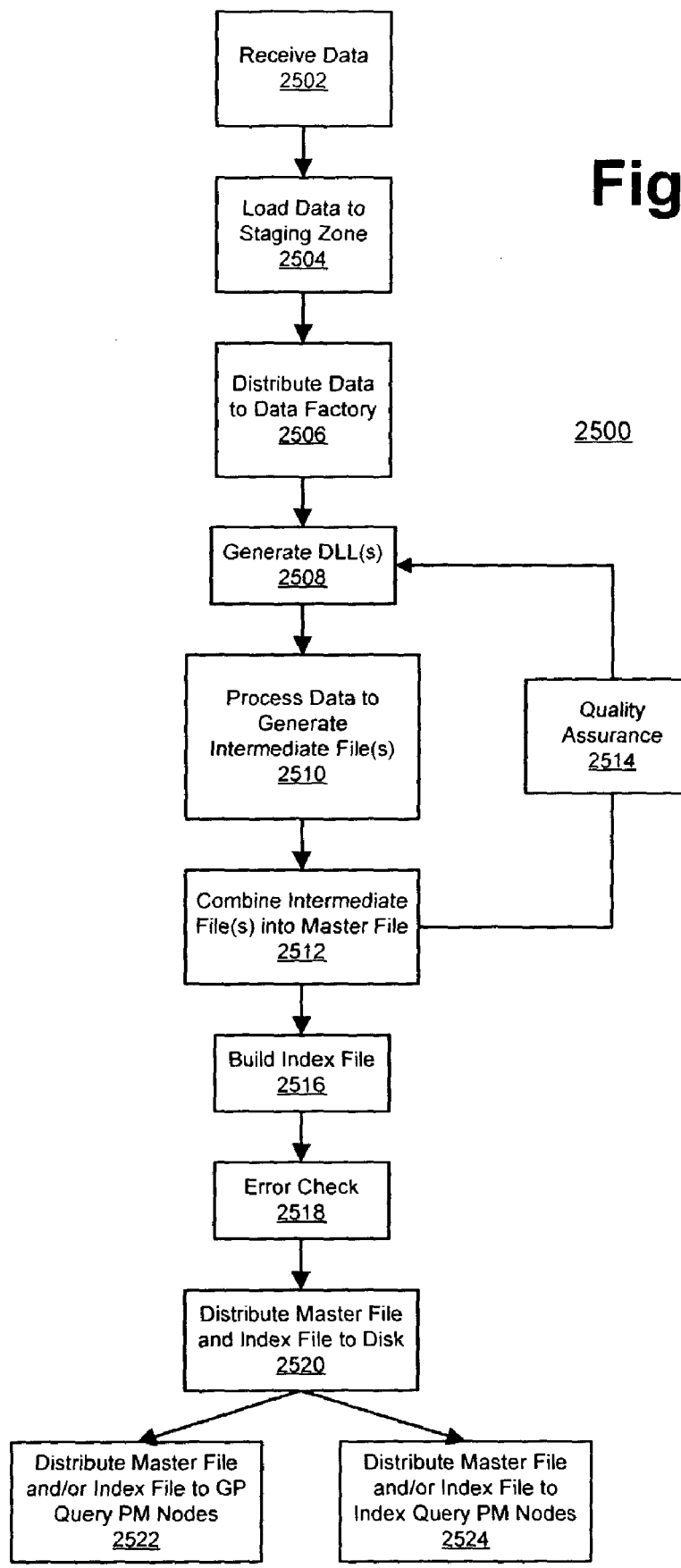
FIG. 25 is a flow diagram illustrating an exemplary method for distributing database data using the system of FIG. 24 in accordance with at least one embodiment of the present invention.

FIG. 25 illustrates an exemplary method 2500 for data distribution using the system 2400. The method 2500 initiates at step 2502, wherein incoming data (data 2420) to be distributed to the processing matrices 1820/1822 is received from a data source, such as via the staging zone 2412. This data can be received via non-volatile storage, such as tape or hard disk, provided over a computer network, and the like. The data may represent data used to generate a first version of a master file or may data to update or augment an existing master file. At step 2504, the data is transferred onto the staging zone 2412. The staging zone 2412 can include any of a variety of data stores, such as a Symmetrix 8830 available from EMC Corporation of Hopkinton, Mass.

The source data is loaded from the staging zone 2412 into the storage 2414 of the data factory processing matrix 2410 at step 2506. In at least one embodiment, the data factory processing matrix 2410 includes one or more of the global-results processing matrices 1818 (FIG. 1) put to use for data production. Accordingly, in this case, the storage 2414 represents the non-volatile storage at each node of the processing matrix 1818/1410.

At step 2508, an administrator provides input to the administrative module 2402 describing the desired distribution of data in the processing matrices 1820/1822. The data can be distributed in a number of ways. In some instances, the data preferably is randomly distributed. Alternatively, the data can be distributed in a sorted arrangement. The administrative module 2402 directs the query server 1802 to generate a DLL 2450 based on the desired distribution of data, where the DLL 2450 is generated to manipulate the data factory processing matrix 2412 to achieve the desired distribution.

At step 2510, the data factory processing matrix 2410 processes the DLL on the source data 2420 to generate one or more intermediate files. At step 2512, the intermediate files are joined into a master file (depicted as master file 2416) and the master file may be stored to disk 2414. Quality assurance processes may be performed on the master file at step 2514, and if the master file is found deficient, steps 2508-2512 may be repeated until the master file is satisfactory.

At step 2516, the data factory processing matrix 2410 reads the master file 2416 from disk into memory and builds one or more index files 2418 for specified fields of data represented by the master file 2416. A data integrity check can be performed on the master file 2416 and/or the index file(s) 2418 at step 2518 and the files may then stored to disk 2414 at step 2520.

At step 2522, the master file 2416 may be distributed into the memory 2420 of the general-purpose query processing matrix 1820. Recall that in at least one embodiment, the general-purpose query processing matrix 1820 is implemented as a plurality of interconnected processing nodes, each node having its own memory resources. In this case, the memory 2420 represents the collective memory resources of the slave nodes of the processing matrix 1820. The data comprising the master file 2416 can be distributed among the slave nodes of the processing matrix 1820 in a variety of ways. As noted above, the performance of a number of database operations may be optimized when the data is randomly distributed across the slave nodes of the processing matrix 1820. To this end, the data factory processing matrix 2410 can be adapted to distribute the entity references of the master file among the nodes by performing a hash function keyed to one of the fields of the data. For example, if the master file represented a credit rating data set, the credit rating records could be randomly distributed among the nodes based on a hash function performed on the social security number associated with each entity reference of the data set.

At step 2524, the master file and the index file(s) may be distributed to the memory 2422 of the index-based query processing matrix 1822. Recall that in at least one embodiment, the index-based query processing matrix 1822 also may be implemented as a plurality of processing nodes operating in parallel. As with step 2522, the data of the master file and the index file(s) may be randomly distributed using a hashing function. Other methods of distributing the data among the nodes of the processing matrix 1820 and/or the nodes of the processing matrix 1822 can be utilized without departing from the spirit or the scope of the present invention.

Figure 26:
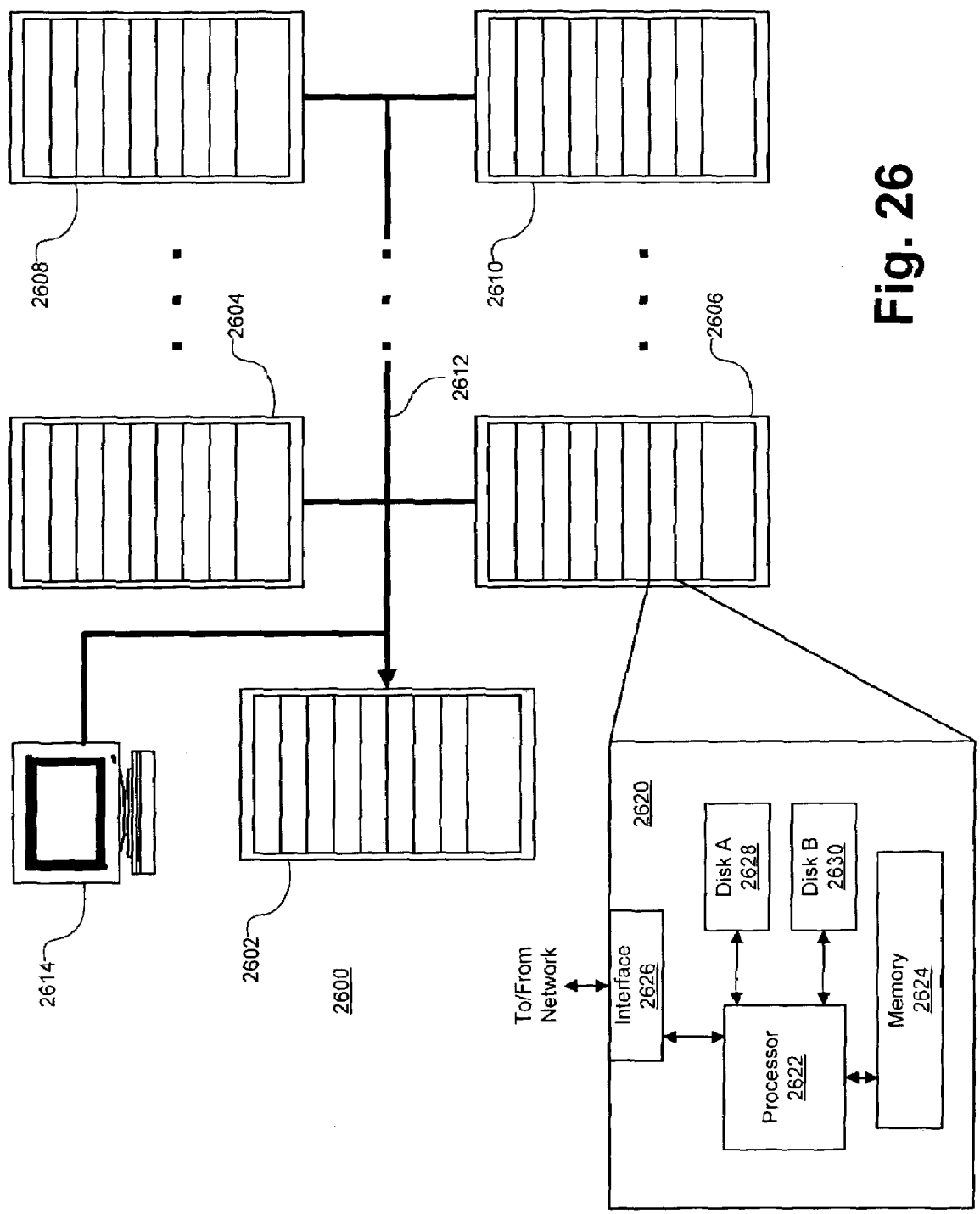
FIG. 26 is a schematic diagram illustrating an exemplary hardware architecture for the system of FIG. 18 in accordance with at least one embodiment of the present invention.

Referring now to FIG. 26, an exemplary physical architecture 2600 of the system 1800 (FIG. 1) is illustrated in accordance with at least one embodiment of the present invention. In the illustrated example, the system 1800 is implemented as a plurality of processing nodes 2620 connected via a network 2612. Each processing node 2620 includes one or more processors 2622, memory 2624 (e.g., random access memory), one or more disk storage devices 2628, 2630, and a network interface 2626 to the network 2612. Each node 2620 preferably is implemented using a "shared nothing" architecture whereby each node includes its own memory, disk, and processor that is not directly accessible by another processing node. The nodes may be divided among one or more network racks 2602-2610. The system 1800 further may comprise an administrator computer 2614 for configuring and managing the components of the system.

In at least one embodiment, the nodes 2620 of the system 1800 are substantially homogeneous. For example, the nodes 2620 may only vary by memory capacity, disk storage capacity, processor speed, etc, and are largely interchangeable, thus providing a high degree of simplicity, uniformity, flexibility, and capability to the system 1800. The nodes 2620 can be dynamically assigned to various components of the system 1800 depending on the data to be processed, the types of queries to be submitted, and the like. For example, the computing matrix 1816 of the system 1800 could include a two-hundred-node global-results processing matrix 1818 and two one-hundred-node general-purpose processing matrices 1820. Accordingly, two hundred processing nodes 2620 could be assigned and configured for use as the global-results processing matrix 1818, two hundred nodes 2620 could be assigned and configured for use as the two general-purpose processing matrices 1820. One of the nodes 2620 could be assigned to operate as the repository 1810, one node 2620 could be assigned to operate as the naming services module 1812, and another node 2620 could be assigned to operate as the scheduling services module 1814. If, for example, the system 1800 included two query servers 102 and four query agents 104, two nodes 2620 each could be assigned to operate as a query server 1802 and four nodes 2620 could be assigned to operate as query agents 104. The remaining nodes 2620 then could be assigned to perform other functions of the system 1800 as described herein.

In one embodiment, each node 2620 of the system 1800 is loaded with software (e.g., the HomAgent, associated library DLLs, and/or an operating system) related to its assigned function. For the nodes 2620 assigned to the computing matrix 1816, the nodes can be loaded with the same HomAgent but with different library DLLs and configuration files. The same HomAgent on one node 2620 having a certain configuration file may operate in an entirely different manner on another node 2620 having a different configuration file and/or library DLLs.

The use of substantially homogeneous nodes 2620 for varying components of the system 1800 provides a number of advantages. For one, the expense of implementation may be reduced as specialized hardware can be minimized or eliminated. Furthermore, homogeneity can provide for increased flexibility in configuring and operating the system 1800. Since each node is substantially the same, a node used as a slave node of a processing matrix in one system configuration can be quickly converted for use as a query agent 1804 in a subsequent configuration without requiring any physical modification of the node itself. Rather, all that may be required is to load a different configuration file and/or library DLLs to the node when it is configured for a different operation.

Although the difficulties in processing data may be reduced by distributing the data of the master file across a plurality of processing nodes, some master files may be of such a size that each node may be overwhelmed by the sheer size of its assigned data portion. Accordingly, various techniques may be implemented to reduce the data storage requirements at the processing nodes. One technique includes using compression processes, such as zero run length compression, at the node to minimize the storage requirements. The storage requirements for individual entity references may be reduced by using data fields that are "odd sized", that is, having a number of bytes that are not a power of two. To illustrate, the processing nodes may be adapted to handle entity references having, for example, a DID and RID field of six bytes each, an associate field of five bytes, a date field of three bytes, etc.

Another consideration when processing relatively large master files using the techniques described above is the size of the resulting intermediate file(s) at the processing nodes. For example, processes performed on master files that represent entire populations of people could result in intermediate data files having, for example, 750 billion results represented by, for example, 16 TB of disk storage. If this storage requirement were to be evenly distributed across 400 nodes, each node would require about 40 GB of storage just for the intermediate file.

Figure 27:
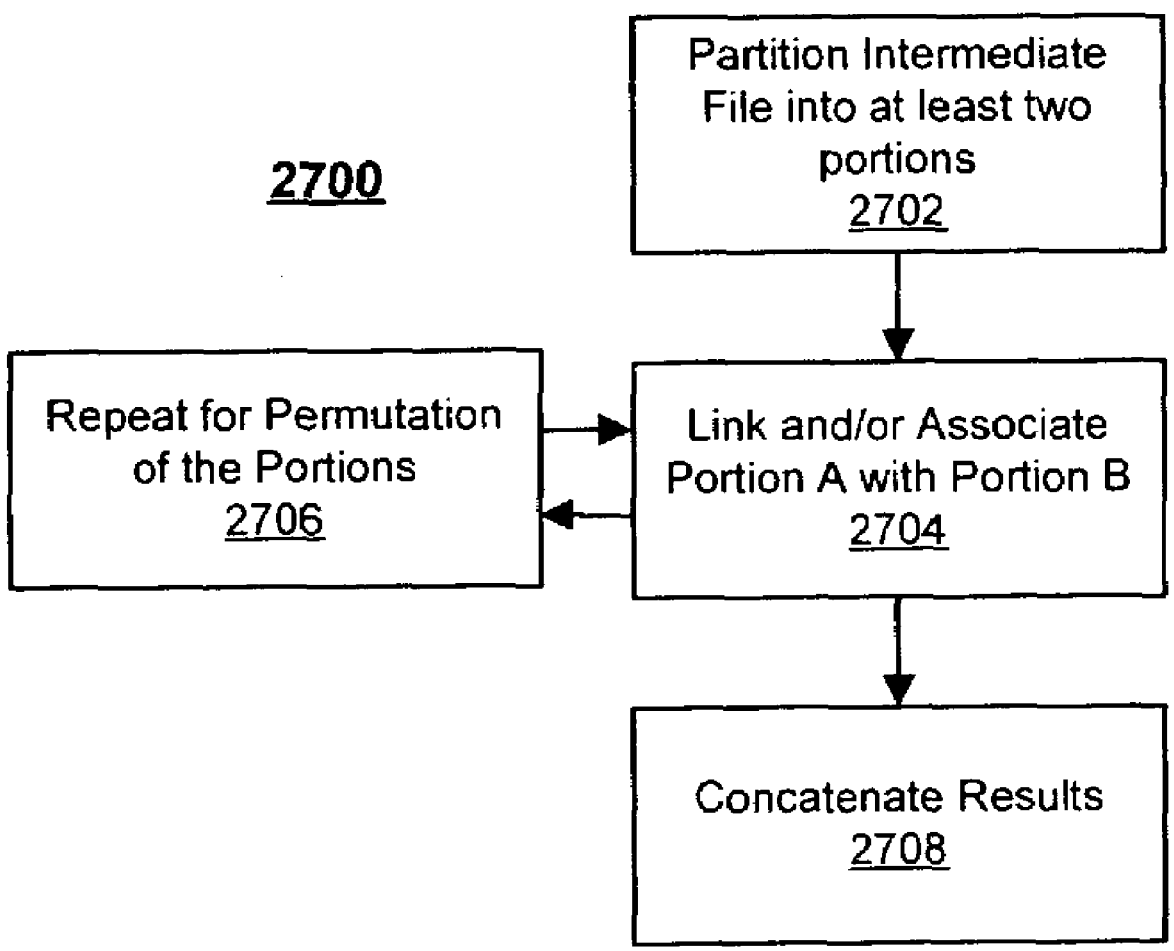
FIG. 27 is a flow diagram illustrating an exemplary method for configuring the system of FIG. 18 using the hardware

Referring now to FIG. 27, an exemplary method 2700 for employing the techniques described above while minimizing the intermediary file storage requirements is illustrated in accordance with at least one embodiment of the present invention.

In many instances, it is not necessary to evaluate all entity references at the same time to determine potential links between the entity references and/or associations between entities. Rather, at step 2702 the master file is partitioned into two or more portions using one or more of the data fields to partition the entity references of the master file. To illustrate, the master file could be partitioned into an "odd" DID portion comprised of those entity references having odd-valued DIDs and an "even" DID portion comprised of entity references having even-valued DIDs. Alternatively, the master file may be partitioned into three, four, five or more portions. For ease of illustration, the previous example of an "odd" DID portion and an "even" DID portion will be discussed.

At step 2704, the link techniques and/or association techniques, described above, may be performed by matching and/or associating the "odd" DID entity references to the "odd" DID entity references. Step 2704 then is repeated (step 2706) by matching and/or associating the "even" DID entity references to the "even" DID entity references. Step 2704 is repeated again (step 2706) by matching and/or associating the "even" DID entity references to the "odd" DID entity references. In a fourth iteration of step 2704 (step 2706), the "odd" DID entity references are matched and/or associated with the "even" DID entity references. The results of the four iterations of step 2704 are concatenated at step 2708 to generate a final results file that may be incorporated into the master file.

By separating the master file into two portions and conducting four separate match/association processes in sequence, the size of the intermediate file for each match/association process may be reduced by one-fourth (or to 10 GB in the previous example). As the degree of apportionment of the master file increases, the size of the intermediate file resulting from a match/association process should decrease roughly proportionately. It will be appreciated, however, that the number of match/association processes increases in proportion.

Other embodiments, uses, and advantages of the present invention will be apparent to those skilled in the art from consideration of the specification and practice of the present invention disclosed herein. The specification and drawings should be considered exemplary only, and the scope of the present invention is accordingly intended to be limited only by the following claims and equivalents thereof.

What is claimed is:

1. A method for linking an unlinked entity reference to a given entity, wherein the given entity consists of a collection of linked entity references, and wherein the unlinked entity reference is not initially linked to the given entity, using one or more constructed ghost entity references distinct from the unlinked entity reference and each of the collection of linked entity references, the method comprising the steps of:

constructing at least one ghost entity reference, distinct from a first entity reference and a second entity reference, comprising a first field value from the first entity reference linked to the given entity and a second field value from the second entity reference linked to the given entity, wherein the first entity reference differs from the second entity reference and the first field value differs from the second field value, wherein the at least one ghost entity reference represents at least one potential entity reference for the given entity; and linking the unlinked entity reference to the given entity as a result of a match probability between the unlinked entity reference and the at least one ghost entity reference being greater than a defined threshold.

2. The method as in claim 1, wherein the match probability between the unlinked entity reference and the ghost entity reference is based at least in part on a statistical significance of at least one field value common to both the given entity and the ghost entity reference, and where the statistical significance of a field value is inversely related to a number of occurrences of the field value occurring in some or all of the plurality of entity references.

3. The method as in claim 1, wherein the step of linking the unlinked entity reference to the given entity includes associating a Definitive identifier (DID) of the given entity with the unlinked entity reference.

4. The method as in claim 1, wherein the ghost entity reference includes a combination of field values selected from the common data fields of the entity references that are expected to change together.

5. The method as in claim 1, further comprising the step of eliminating duplicate ghost entity references.

6. The method as in claim 1, wherein the given entity includes one of a group consisting of: a person; a business entity; an organization; a motor vehicle; a merchant vessel; and real property.

7. The method as in claim 1, wherein the entity references are at least part of one or more databases.

8. The method as in claim 7, wherein the one or more databases includes one of a group consisting of: a medical records database; a criminal records database; a motor vehicles registration database; a voters registration database; a Uniform Commercial Code filings database; a corporations filing database; a Federal Aviations Administration database; a credit report database; an immigrations database; a bankruptcy filings database; a property deeds database; and a directory assistance database.

9. A computer readable medium comprising a set of executable instructions being adapted to manipulate a processor capable of linking an unlinked entity reference to a given entity to:

construct at least one ghost entity reference, distinct from a first entity reference and a second entity reference, comprising a first field value from the first entity reference linked to the given entity and a second field value from the second entity reference linked to the given entity, wherein the first entity reference differs from the second entity reference and the first field value differs from the second field value, wherein the at least one ghost entity reference represents at least one potential entity reference for the given entity; and link the unlinked entity reference to the given entity as a result of a match probability between the unlinked entity reference and the at least one ghost entity reference being greater than a defined threshold, wherein the given entity consists of a collection of linked entity references, and wherein the at least one ghost entity reference is distinct from the unlinked entity reference and each of the collection of linked entity references.

10. The computer readable medium as in claim 9, wherein the match probability between the unlinked entity reference and the ghost entity reference is based at least in part on a statistical significance of at least one field value common to both the given entity and the ghost entity reference, and where the statistical significance of a field value is inversely related to a number of occurrences of the field value occurring in some or all of the plurality of entity references.

11. The computer readable medium as in claim 9, wherein the set of executable instructions includes executable instructions adapted to manipulate the processor to associate a Definitive Identifier (DID) of the given entity with the at least one entity reference.

12. The computer readable medium as in claim 9, wherein the ghost entity reference includes a combination of field values selected from the common data fields of the entity references that are expected to change together.

13. A system for linking an unlinked entity reference to a given entity using one or more constructed ghost entity references, the system comprising:

memory;

a processor operably connected to the memory; and a set of executable instructions stored in the memory and being adapted to manipulate the processor to:

construct at least one ghost entity reference, distinct from a first entity reference and a second entity reference, comprising a first field value from the first entity reference linked to the given entity and a second field value from the second entity reference linked to the given entity, wherein the first entity reference differs from the second entity reference and the first field value differs from the second field value, wherein the at least one ghost entity reference represents at least one potential entity reference for the given entity; and link the unlinked entity reference to the given entity as a result of a match probability between the unlinked entity reference and the at least one ghost entity reference being greater than a defined threshold, wherein the given entity consists of a collection of linked entity references, and wherein the at least one ghost entity reference is distinct from the unlinked entity reference and each of the collection of linked entity references.

14. The system as in claim 13, wherein the match probability between the unlinked entity reference and the ghost entity reference is based at least in part on a statistical significance of at least one field value common to both the given entity and the ghost entity reference, and where the statistical significance of a field value is inversely related to a number of occurrences of the field value occurring in some or all of the plurality of entity references.

15. The system as in claim 13, wherein the set of executable instructions includes executable instructions adapted to manipulate the processor to associate a Definitive Identifier (DID) of the given entity with the at least one entity reference.

16. The system as in claim 13, wherein the ghost entity reference includes a combination of field values selected from the common data fields of the entity references that are expected to change together.

* * * * *